US010648995B2

(12) United States Patent
Accurso et al.

(10) Patent No.: US 10,648,995 B2
(45) Date of Patent: May 12, 2020

(54) SYSTEMS AND METHODS FOR AUTOMATED ANALYSIS

(71) Applicant: Abbott Laboratories, Abbott Park, IL (US)

(72) Inventors: Roger W. Accurso, Pleasanton, CA (US); Jiong Wu, Los Gatos, CA (US); Richard G. Kendall, Miami, FL (US); James A. Janik, Abbott Park, IL (US); Ronald J. Shanafelter, Fremont, CA (US); Robert Fahey, Elwood (AU); Svitlana Y. Berezhna, Los Gatos, CA (US); Trevor D. Shields, Berwick (AU); Mahmoud Janbakhsh, San Ramon, CA (US); Daryl Wong, Abbott Park, IL (US); Jorge Haro, Abbott Park, IL (US); Michael J. Kennedy, Los Gatos, CA (US)

(73) Assignee: Abbott Laboratories, Abbott park, IL (US)

(*) Notice: Subject to any disclaimer, the term of this patent is extended or adjusted under 35 U.S.C. 154(b) by 191 days.

(21) Appl. No.: 15/378,479

(22) Filed: Dec. 14, 2016

(65) Prior Publication Data
US 2017/0176481 A1   Jun. 22, 2017

Related U.S. Application Data

(60) Provisional application No. 62/269,535, filed on Dec. 18, 2015.

(51) Int. Cl.
*G01N 35/02* (2006.01)
*G01N 35/00* (2006.01)
(Continued)

(52) U.S. Cl.
CPC .......... *G01N 35/021* (2013.01); *G01D 5/342* (2013.01); *G01N 1/312* (2013.01); *G01N 21/13* (2013.01);
(Continued)

(58) Field of Classification Search
CPC .......... G01N 35/021; G01N 35/00029; G01N 35/00732; G01N 35/00871; G01N 35/04;
(Continued)

(56) References Cited

U.S. PATENT DOCUMENTS 9,011,773 B2   4/2015   Shoffner et al.
2005/0194333 A1   9/2005   Veiner et al.
(Continued)

FOREIGN PATENT DOCUMENTS

EP   1460428   9/2004
EP   2455762   5/2012
(Continued)

*Primary Examiner* — Benjamin R Whatley
(74) *Attorney, Agent, or Firm* — Edward J. Baba; Bozicevic, Field & Francis LLP

(57) ABSTRACT

Aspects of the present disclosure include systems and methods. According to certain embodiments, provided is an integrated analysis system that includes a first module including a sample analysis component and a first internal container conveyor system. The integrated analysis system further includes a second module including a second internal container conveyor system. The first and second modules are positioned adjacent each other such that the first and second internal container conveyor systems are aligned and adapted to transport containers from the first module to the second module. Also provided are methods of analyzing and preparing samples (e.g., blood and body fluid samples), as well as components that find use within the analysis systems of the present disclosure.

15 Claims, 63 Drawing Sheets

(51) Int. Cl.
*G01D 5/34* (2006.01)
*G01N 1/31* (2006.01)
*G01N 21/13* (2006.01)
*G01N 35/04* (2006.01)

(52) U.S. Cl.
CPC ... *G01N 35/00029* (2013.01); *G01N 35/0099* (2013.01); *G01N 35/00732* (2013.01); *G01N 35/00871* (2013.01); *G01N 35/04* (2013.01); *G01N 2035/00138* (2013.01); *G01N 2035/00326* (2013.01); *G01N 2035/00801* (2013.01); *G01N 2035/0412* (2013.01); *G01N 2035/0493* (2013.01); *G01N 2201/0438* (2013.01)

(58) Field of Classification Search
CPC .................. G01N 1/312; G01N 21/13; G01N 2035/00138; G01N 2035/00801; G01N 2035/0412; G01N 2035/0438; G01D 5/342
See application file for complete search history.

(56) References Cited

U.S. PATENT DOCUMENTS

| | | |
|---|---|---|
| 2006/0286619 A1 | 12/2006 | Ricci et al. |
| 2009/0003981 A1* | 1/2009 | Miller ................ B65G 1/04 414/267 |
| 2009/0142844 A1 | 6/2009 | Le Comte et al. |
| 2009/0223308 A1 | 9/2009 | Fukuma |
| 2010/0027868 A1 | 2/2010 | Kosaka et al. |
| 2011/0054800 A1 | 3/2011 | Mizumoto et al. |
| 2014/0263316 A1 | 9/2014 | Accurso |
| 2014/0374480 A1* | 12/2014 | Pollack .................. G01N 35/04 235/440 |
| 2015/0241457 A1* | 8/2015 | Miller ............. G01N 35/00732 348/143 |
| 2016/0018426 A1* | 1/2016 | Moriya .............. G01N 35/026 422/65 |
| 2016/0032358 A1* | 2/2016 | Buse .................. G01N 35/04 435/6.12 |
| 2016/0244269 A1* | 8/2016 | Akutsu .................. G01N 35/04 |

FOREIGN PATENT DOCUMENTS

| | | | |
|---|---|---|---|
| WO | 2008/123594 A2 | 10/2008 | |
| WO | WO-2013116661 A1 * | 8/2013 | ............ G01N 35/04 |
| WO | WO-2015064540 A1 * | 5/2015 | ............ G01N 35/04 |
| WO | 2015/083236 A1 | 6/2015 | |

\* cited by examiner

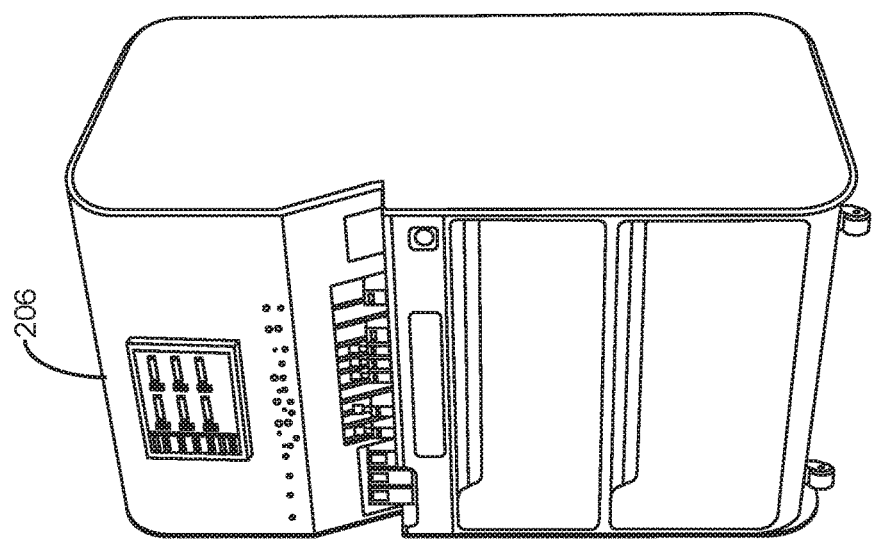
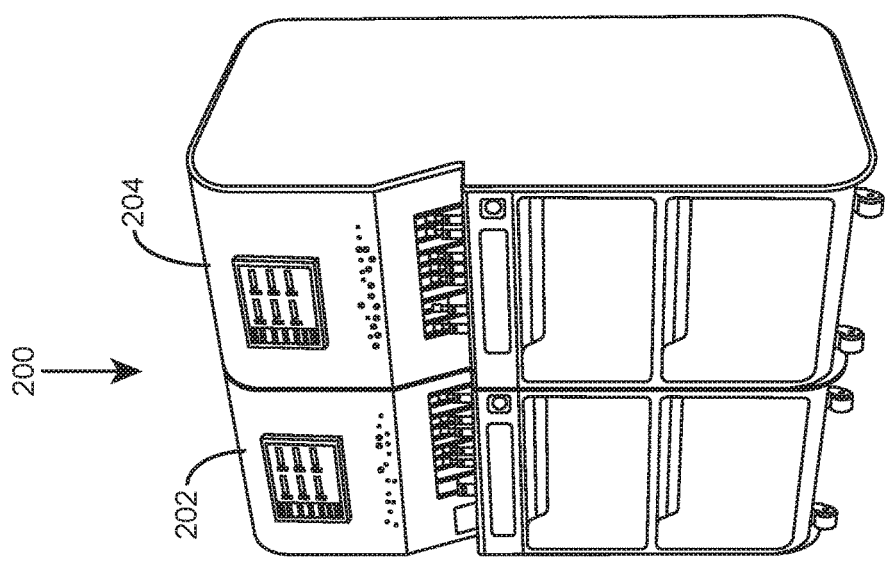
FIG. 2

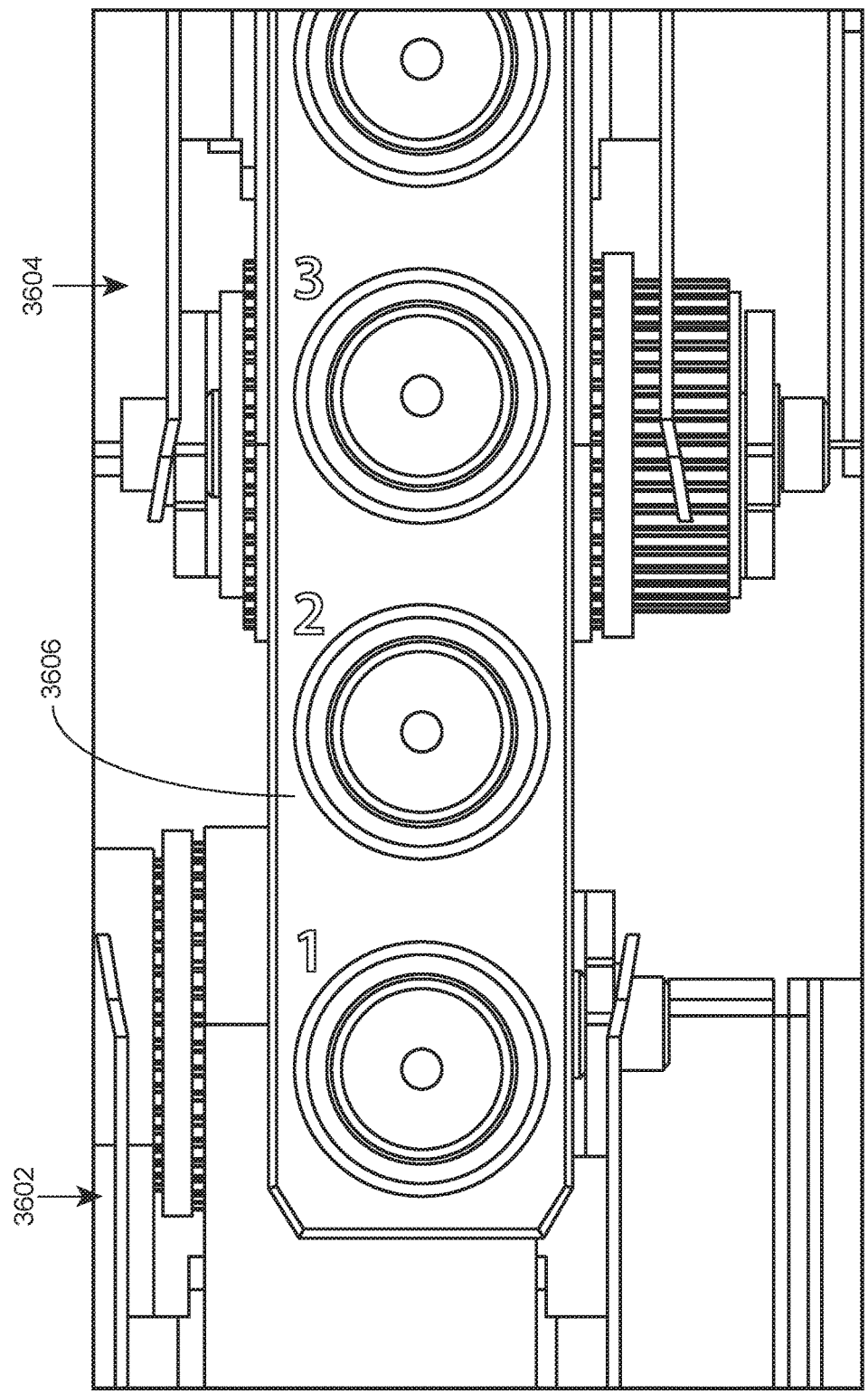

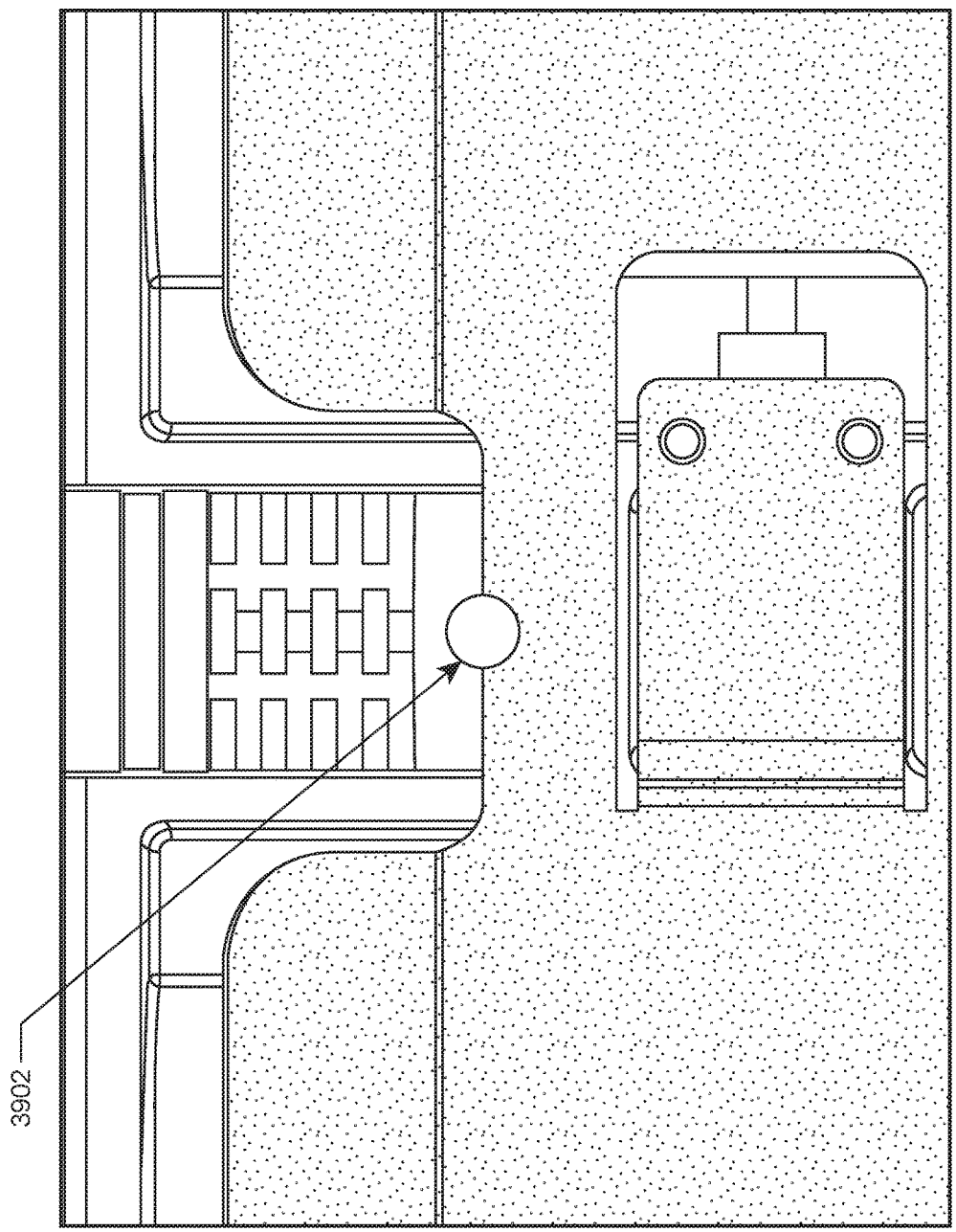

SYSTEMS AND METHODS FOR AUTOMATED ANALYSIS

CROSS-REFERENCE

This application claims the benefit of U.S. Provisional Patent Application No. 62/269,535 filed Dec. 18, 2015, which application is incorporated herein by reference in its entirety.

INTRODUCTION

A variety of methods are used for cellular analysis, including visual and/or automated inspection via light or fluorescent light microscopy. Cellular examinations and analyses of these types are commonly practiced in order to obtain information regarding cell lineage, maturational stage, and/or cell counts in a sample.

Automated hematology analyzers are instruments designed to completely automate the analysis of samples of blood. Typically, automated hematology analyzers are used to differentiate the individual blood cells in the samples, count the individual blood cells in the samples, and in some cases, estimate the size of the individual blood cells in the samples.

A blood smear is often used as a follow-up test based on results (e.g., abnormal complete blood count (CBC) results) obtained in a hematology analyzer to evaluate the different types of blood cells. It may be used to facilitate diagnose and/or monitor numerous conditions that affect blood cell populations. For the test, a drop of blood is spread thinly onto a glass slide and then stained. Traditionally, trained laboratory personnel have examined blood smears manually using a microscope. More recently, automated digital systems have become available to help analyze blood smears more efficiently. At one time, a blood smear was prepared on nearly everyone who had a CBC. With the development of more sophisticated, automated blood cell counting instruments, it has now become routine to provide an automated differential. If the results from an automated cell count and/or differential indicate the presence of abnormal white blood cells (WBCs), red blood cells (RBCs), and/or platelets or if there is reason to suspect that abnormal cells are present, then a blood smear may be performed.

A blood smear is often used to categorize and/or identify conditions that affect one or more type of blood cells and to monitor individuals undergoing treatment for these conditions. There are many diseases, disorders, and deficiencies that can affect the number and type of blood cells produced, their function, and their lifespan. Examples include anemia, myeloproliferative neoplasms, bone marrow disorders, and leukemia.

SUMMARY

Aspects of the present disclosure include systems and methods. According to certain embodiments, provided is an integrated analysis system that includes a first module including a sample analysis component and a first internal container conveyor system. The integrated analysis system further includes a second module including a second internal container conveyor system. The first and second modules are positioned adjacent each other such that the first and second internal container conveyor systems are aligned and adapted to transport containers from the first module to the second module. Also provided are methods of analyzing and preparing samples (e.g., blood and body fluid samples), as well as components that find use within the analysis systems of the present disclosure.

BRIEF DESCRIPTION OF THE FIGURES

FIG. 2 shows an integrated analysis system according to an embodiment of the present disclosure.

FIG. 36 shows a top view of a rack being transported between first and second modules of an integrated system via aligned internal conveyor systems of the first and second modules according to one embodiment.

FIG. 39 shows a central portion of a rack having an alignment feature according to an embodiment of the present disclosure.

DETAILED DESCRIPTION

Figure 1:
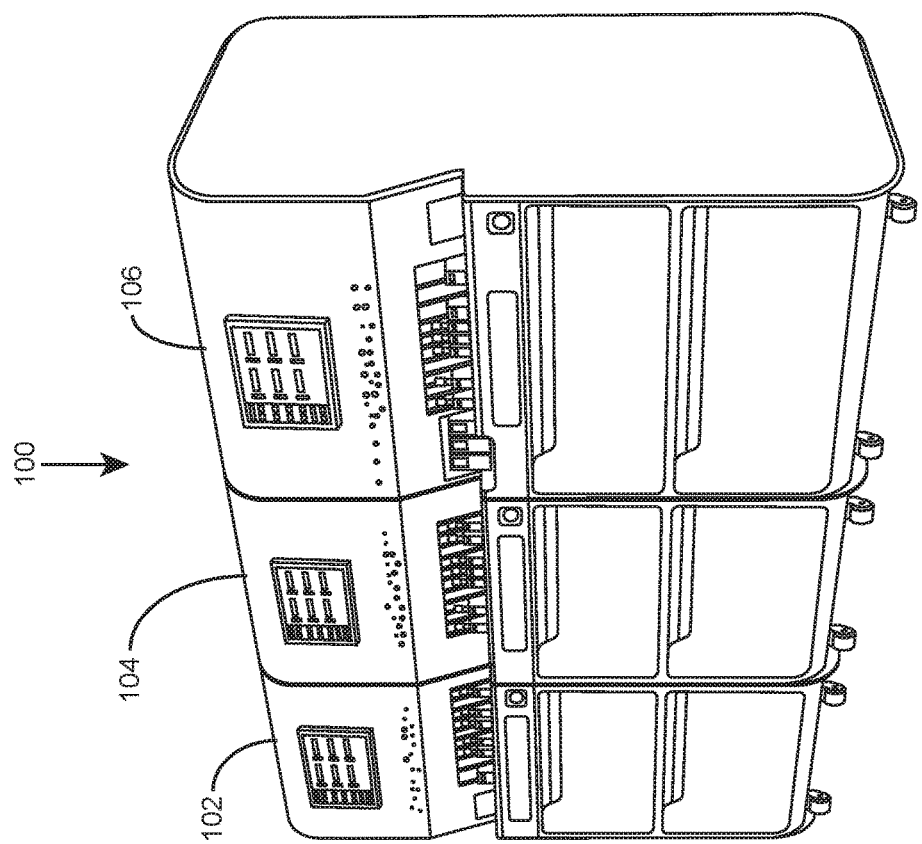
FIG. 1 shows an integrated analysis system according to an embodiment of the present disclosure.

Aspects of the present disclosure include analysis systems and methods. According to certain embodiments, provided is an integrated analysis system that includes a first module including a sample analysis component and a first internal container conveyor system. The integrated analysis system further includes a second module including a second internal container conveyor system. The first and second modules are positioned adjacent each other such that the first and second internal container conveyor systems are aligned and adapted to transport containers from the first module to the second module. Also provided are methods of analyzing and preparing samples (e.g., blood samples), as well as components that find use within the analysis systems of the present disclosure.

Before the present systems and methods are described in greater detail, it is to be understood that the present disclosure is not limited to particular embodiments described, as such may, of course, vary. It is also to be understood that the terminology used herein is for the purpose of describing particular embodiments only, and is not intended to be limiting.

Where a range of values is provided, it is understood that each intervening value, to the tenth of the unit of the lower limit unless the context clearly dictates otherwise, between the upper and lower limit of that range and any other stated or intervening value in that stated range, is encompassed within the present systems and methods. The upper and lower limits of these smaller ranges may independently be included in the smaller ranges and are also encompassed within the systems and methods, subject to any specifically excluded limit in the stated range. Where the stated range includes one or both of the limits, ranges excluding either or both of those included limits are also included in the systems and methods.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating un-recited number may be a number which, in the context in which it is presented, provides the substantial equivalent of the specifically recited number.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present invention, representative illustrative systems and methods are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present systems and methods. Any recited method can be carried out in the order of events recited or in any other order which is logically possible.

Systems

Aspects of the present disclosure include sample analysis systems. The analysis systems may be adapted to perform a variety of analyses of interest, including hematology analysis, slide preparation and cell morphology analysis, erythrocyte sedimentation rate (ESR) analysis, blood coagulation analysis, real-time nucleic acid amplification analysis, immunoassay analysis, clinical chemistry, and combinations thereof. In certain aspects, the analysis systems are automated, meaning that the system is capable of performing sample analysis and any necessary sample preparation steps without user intervention.

According to certain embodiments, the analysis system is an automated hematology analysis system. Aspects of automated hematology analysis systems according to embodiments of the present disclosure will now be described.

An automated hematology analysis system is designed to perform automated hematology tests. The system may be scalable and processes whole blood and body fluid specimens to produce a hematology result containing information on relevant parameters. The system may perform test of whole blood samples and body fluids to determine Red Blood Cell (RBC), Platelets (PLT) and White Blood Cell (WBC) counts, measure Hemoglobin (Hgb), count immature red blood cells, and any other blood or body fluid parameters of interest.

The system can function as a separate automated hematology analysis system, or function as part of an integrated system (e.g., configured in a workcell) with one or more other such automated hematology analysis systems, one or more slide maker stainers, or combinations thereof. When a slide maker stainer is present in an integrated system, the slide maker stainer optionally includes the functionality of performing automated digital cell morphology imaging analysis.

An integrated system according to one embodiment is shown in FIG. 1. In this example configuration, integrated system 100 includes two automated hematology analysis system modules (modules 102 and 104) and slide maker stainer module 106. The integrated system is adapted for automated transport of sample tubes (e.g., present in sample tube racks) between the modules of the integrated system. For example, a rack that includes one or more sample tubes present in module 102 may be transported to module 104 (and vice versa), e.g., to balance the workload between modules 102 and 104. Moreover, if, e.g., an abnormal result is obtained from a hematology analysis performed in module 102 or module 104, the system is adapted to transport the sample tube containing the sample associated with the abnormal result to slide maker stainer module 106 for the automated preparation and staining of a blood or body fluid smear of the sample (and optionally, automated digital cell morphology imaging analysis).

For sample tube transport within modules of an integrated system, each module includes an internal container conveyor system that includes a conveyor belt. The modules are positioned such that the conveyor belts of the internal conveyor systems of adjacent modules are aligned, permitting the transport of tube racks between modules. Details regarding internal container conveyor systems that find use in transporting containers between modules of an integrated analysis system are described in detail below.

A second example configuration of an integrated analysis system is shown in FIG. 2, in which integrated system 200 includes two automated hematology analysis system modules—modules 202 and 204. Internal container conveyor systems of modules 202 and 204 are aligned for automated transport of sample tubes (e.g., present in sample tube racks) between the modules. In this example, slide maker stainer module 206 is not part of the integrated system 200, but rather is present as a separate unit.

An automated hematology analysis system (which may be present alone or as a module of an integrated system) may be configured to include five major zones: a front sample loading area; a sample processing area; an electronics bay; reagent drawers, and a rear fluidics area. The layout places the sample loading area and, optionally, a local user interface (LUI) touch screen, in a convenient location for a user to add/remove sample racks and check system status as desired during operation. The electronics bay in the top of the analyzer is above all of the fluids in the systems to minimize risk, facilitate cooling, EMI/EMC protection and electrical safety. The sample processing area co-locates robotic specimen handling, sample aspiration/dispense, incubation, injection, flow cell and optics in a manner useful for system performance. The rear fluidics area contains supporting subsystems to provide pneumatic pressure, water, waste handling and diluent reconstitution.

Sample Loading Area

An automated hematology analysis system of the present disclosure includes a front sample loading area. The loading area may include a platform having lanes into which a user places sample tube racks. The lanes may be separated by lane dividers. The number of lanes may vary. In certain aspects, the loading area includes from 1 to 20 lanes, such as from 5 to 15 lanes (e.g., 12 lanes). According to certain embodiments, a closed sample tube rack is adapted to hold from 1 to 20 tubes, e.g., from 5 to 15 tubes. For example, the rack may hold 10 closed sample tubes. In certain aspects, the loading area has 12 lanes for accepting closed sample tube racks adapted to hold 10 closed sample tubes, such that the system has a 120 closed tube sample loading capacity.

According to certain embodiments, the sample loading area includes an indicator panel located above the lanes. The indicator panel includes lane indicator lights aligned with each lane to indicate to the user information including lane status, lane availability, and/or the like.

Figure 45:
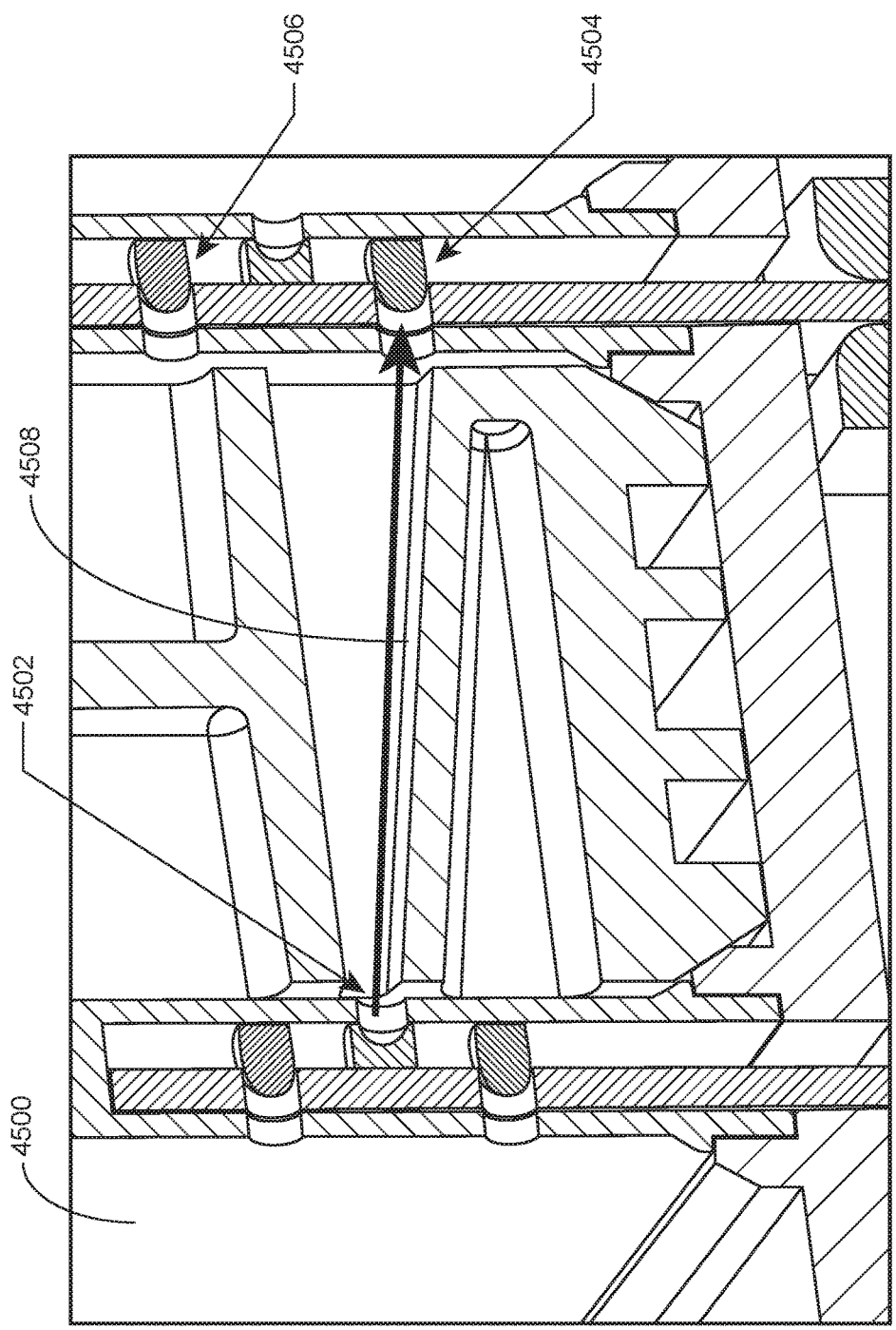
FIG. 45 shows lane and rack features for lane position sensing according to an embodiment of the present disclosure.

In certain aspects, the sample loading area includes a detection system for detecting the presence and/or position of a rack within lanes of the loading area. According to certain embodiments, such a detection system includes lane dividers having integral optical emitter/detector pairs for sensing the presence and/or position of a rack within a lane. Rack position sensors may be provided in the front and rear of the lane dividers for detecting whether a rack is partially inserted, fully inserted, or has been ejected by the system upon completion of sample analysis. For example, lane dividers may each contain a front and rear set of an optical emitter (e.g., an infrared LED emitter) and optical sensors, e.g., upper and lower sensors. The LEDs from one lane divider are sensed by the sensors on the adjacent lane divider. The front emitter and sensor trio are located so that the presence or absence of a rack can be determined. The system can detect whether a rack is partially inserted, ejected rack, etc. The combination of forward and rear emitter/sensor trios may be used to determine that a rack is fully inserted and thus ready to be processed. A sensing window may be located in the rack which allows only the lower rear sensor to see the rear LED when the rack is fully inserted. Sensing of a fully inserted rack according to this scheme is illustrated in FIG. 45. Shown is an end portion of fully inserted rack 4500, and a rear sensing trio that includes LED 4502, lower sensor 4504 and upper sensor 4506. In the fully inserted position, light emitted from LED 4502 passes through sensing window 4508 (in the direction of the arrow) and is detected by lower sensor 4504. In the fully inserted position, light emitted from LED 4502 is not detected by upper sensor 4506 due the absence of a sensing window between LED 4502 and upper sensor 4506. The combination of light detection by lower sensor 4504 and no light detection by upper sensor 4506 is indicative that the rack is fully inserted. When there is no rack present in the lane, both upper and lower sensors in the forward and rear trios will detect light from the LEDs. When a tube rack is partially inserted, the rack prevents light emitted from the LED from reaching both the upper and lower sensors.

Figure 44:
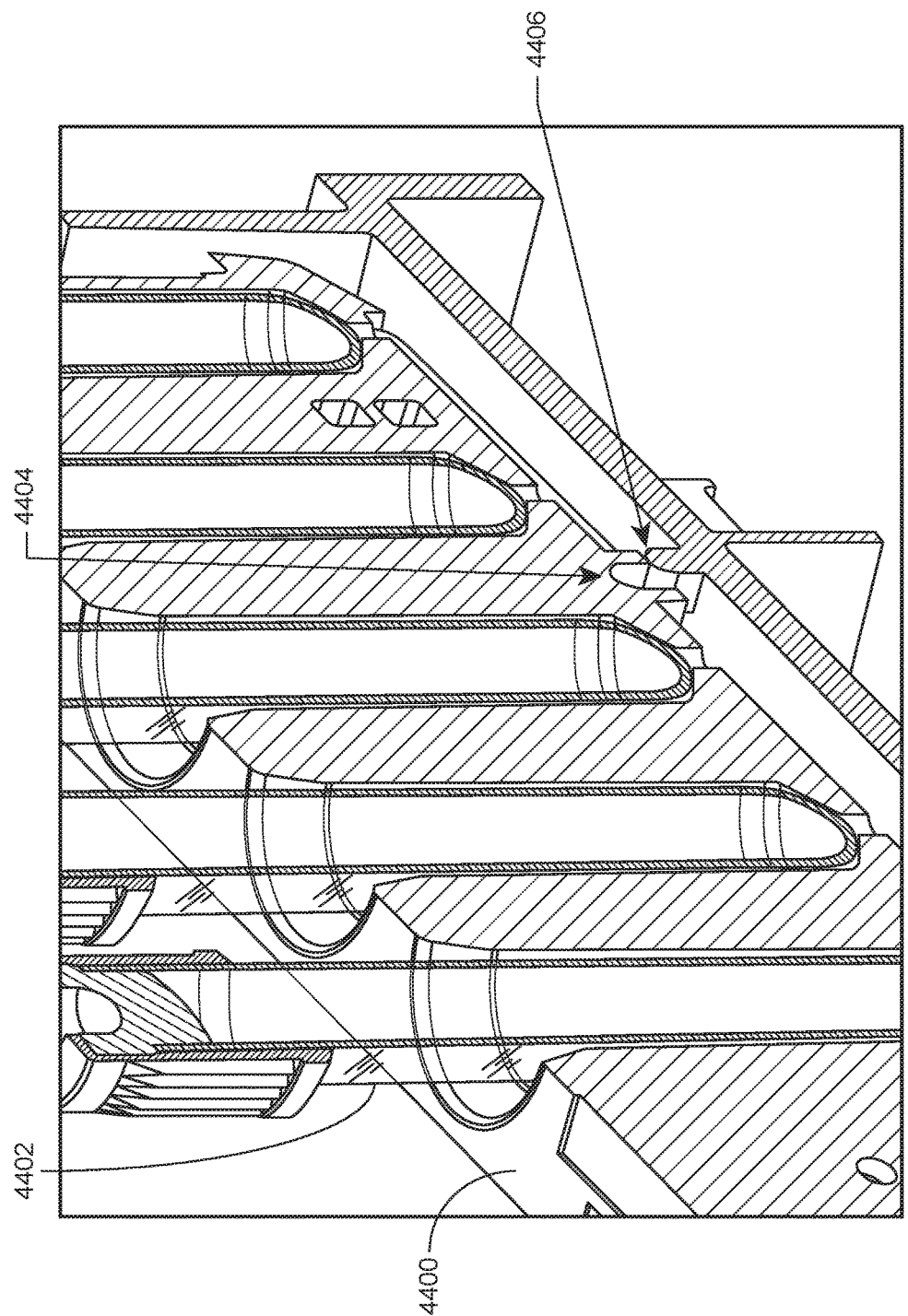
FIG. 44 shows a sample tube rack fixing mechanism according to an embodiment of the present disclosure.

According to certain embodiments, when a rack is fully inserted into a lane, the rack is fixed into place by a fixing mechanism. For example, the rack may be fixed into place by a locking rib present on the surface of a lane that mates with a notch present on the underside of the rack. Reversible fixing of the rack upon full insertion deters the user from removing an in-process rack, while still allowing removal in case of, e.g., loss of power to the system. An example fixing mechanism is illustrated in FIG. 44. Shown is a cutaway view of sample tube rack 4400 adapted to hold blood sample tubes (e.g., sample tube 4402) and having notch 4404 on the underside of rack 4400 that mates with locking rib 4406 present on the surface of a lane when the rack is fully inserted into the lane.

Figure 53:
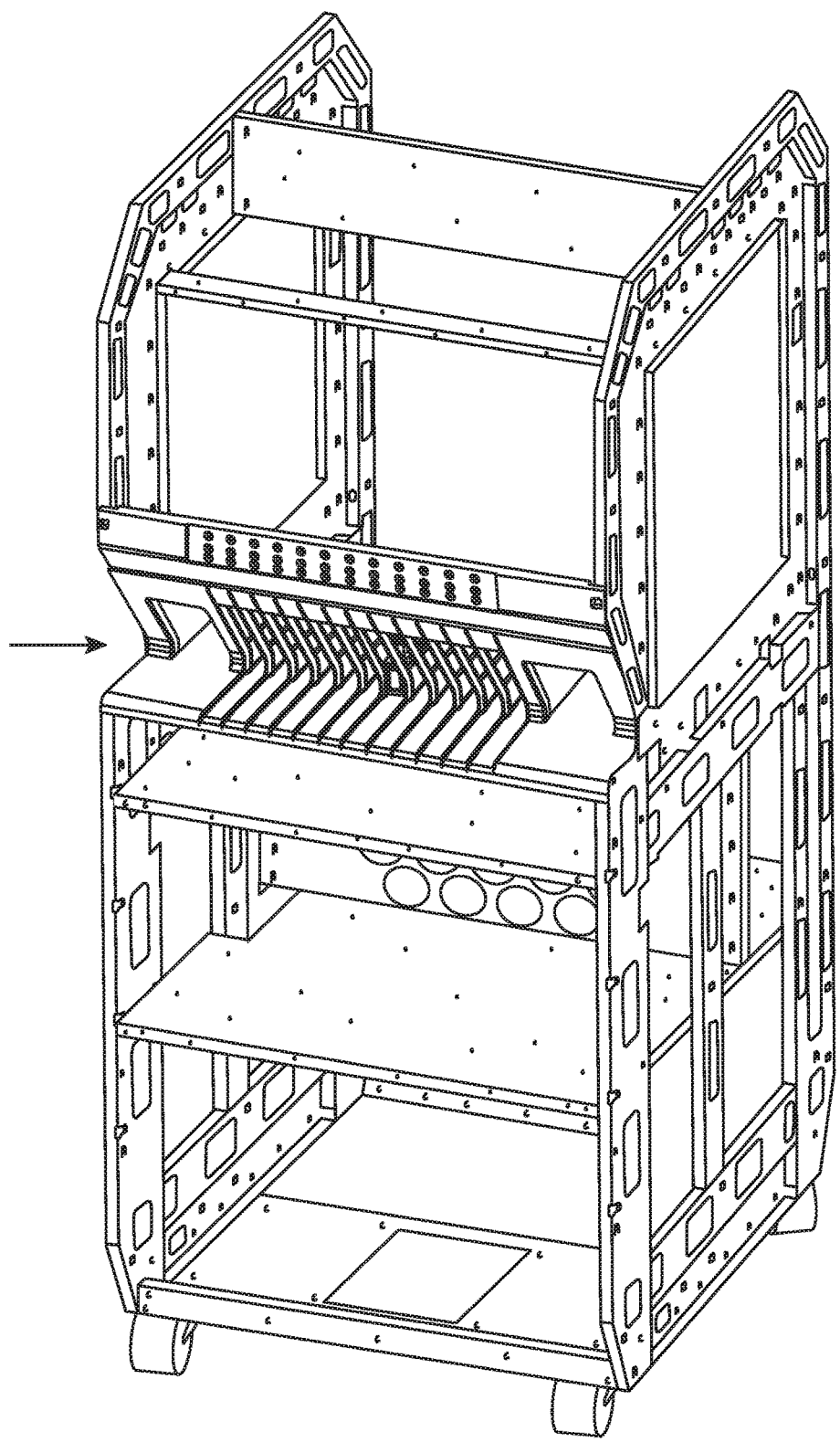
FIG. 53 shows a chassis of an automated hematology analysis system according to one embodiment.

A chassis of an automated hematology analysis system according to one embodiment is illustrated in FIG. 53. The front loading area of the system is indicated by the arrow.

Figure 54:
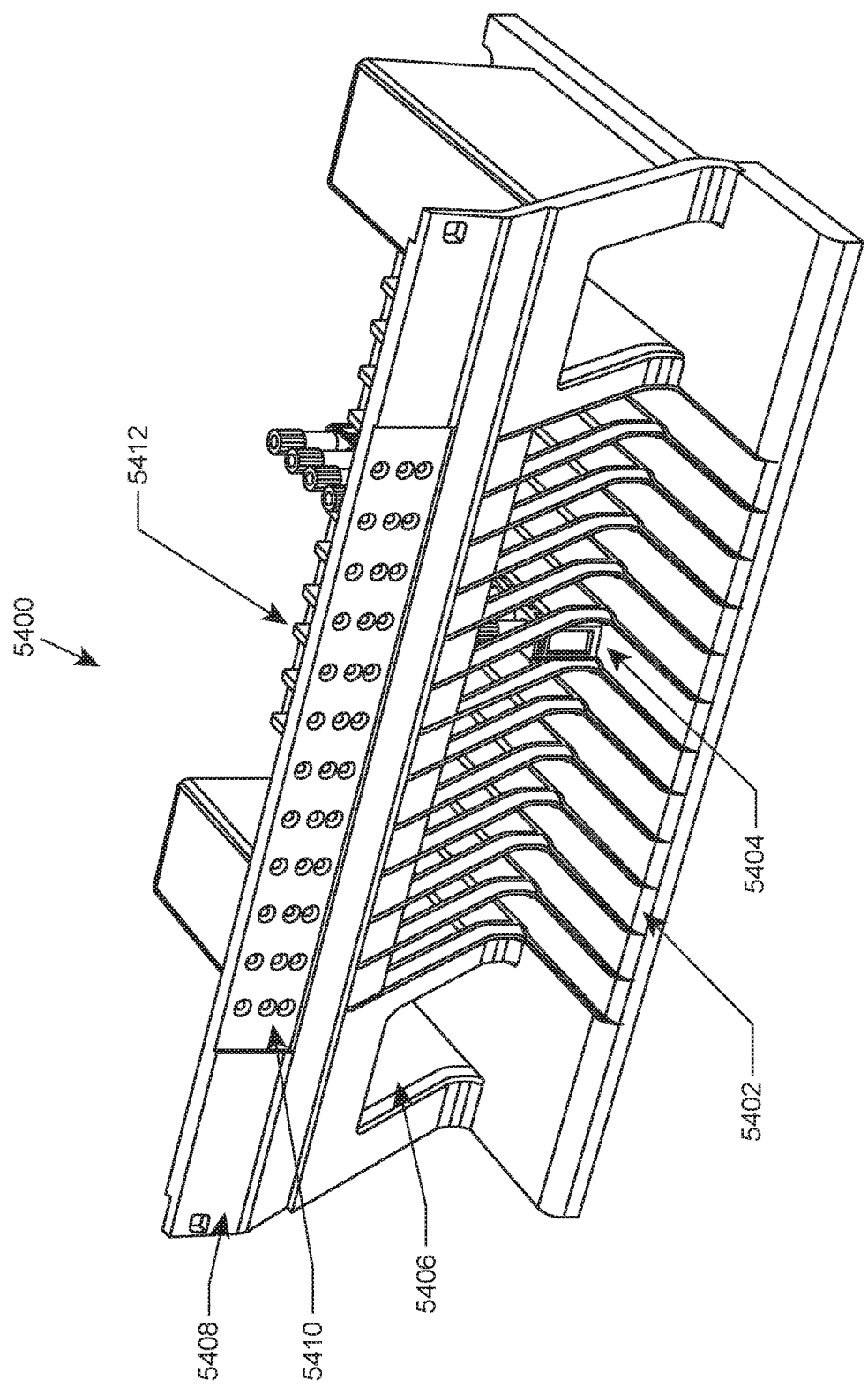
FIG. 54 shows an illustration of a sample tube rack loading area of an automated hematology analysis system according to an embodiment of the present disclosure.

FIG. 54 provides an illustration of an isolated sample tube rack loading area of an automated hematology analysis system according to an embodiment of the present disclosure. In this example, loading area 5400 includes 12 lanes (including lane 5402) into which sample tube racks (e.g., rack 5404) may be inserted. The loading area further includes 2 cubby holes (e.g., cubby hole 5406) which allow the user to temporarily store racks on either side of the sample tube rack lanes. Also included in this example is upper section 5408 of loading area 5400 which includes an indicator panel that includes indicator lights (e.g., lights 5410) above each lane for indicating to the user the status, availability, and/or the like for each lane in the loading area. Also shown is an internal portion of lane divider 5412. Such dividers may include an LED and optical sensors for determining the presence and position of a rack inserted into lanes of the loading area, as described in detail elsewhere herein.

Figure 16:
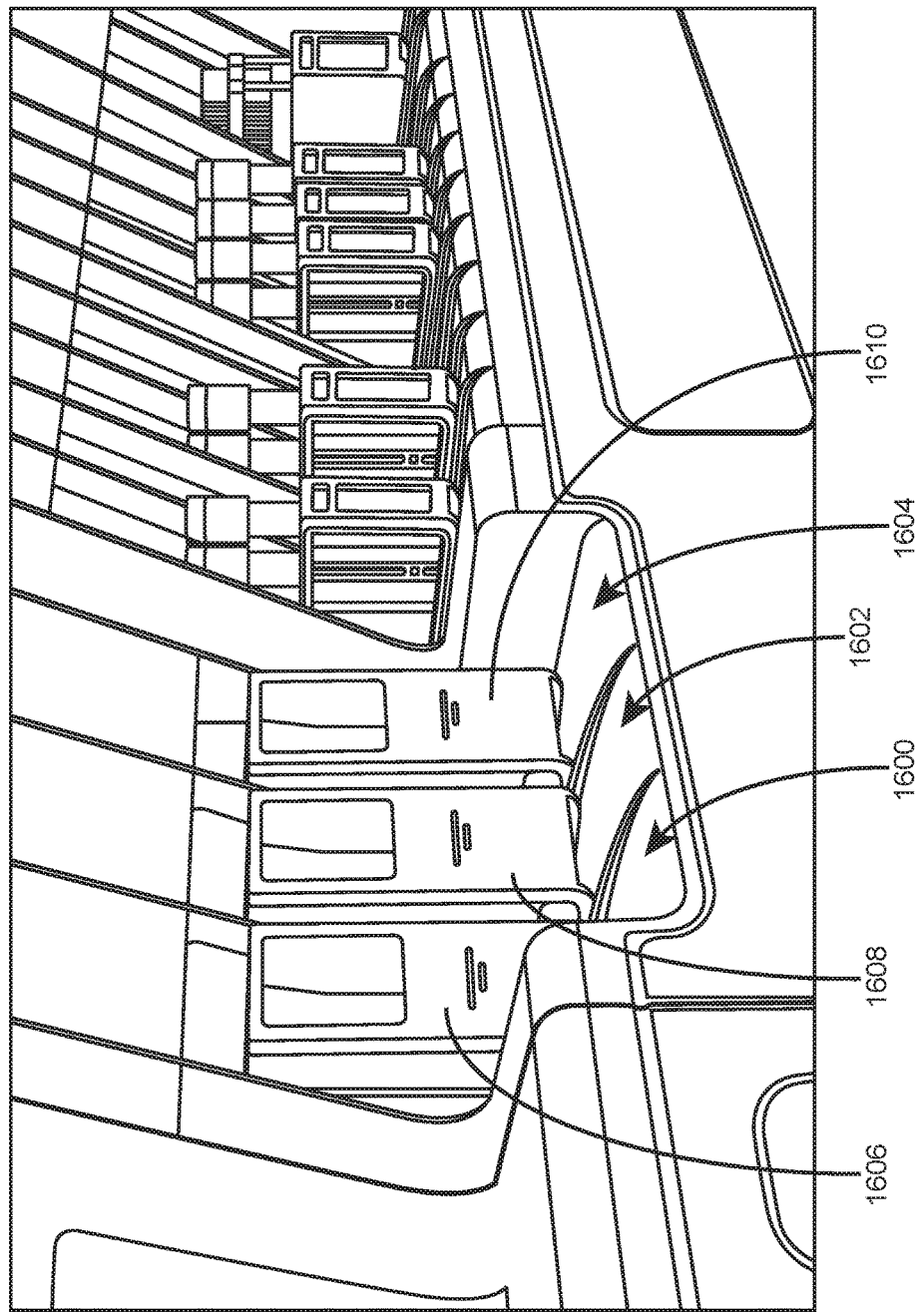
FIG. 16 shows a slide input caddy loading area of a slide maker stainer according to an embodiment of the present disclosure.
Figure 52:
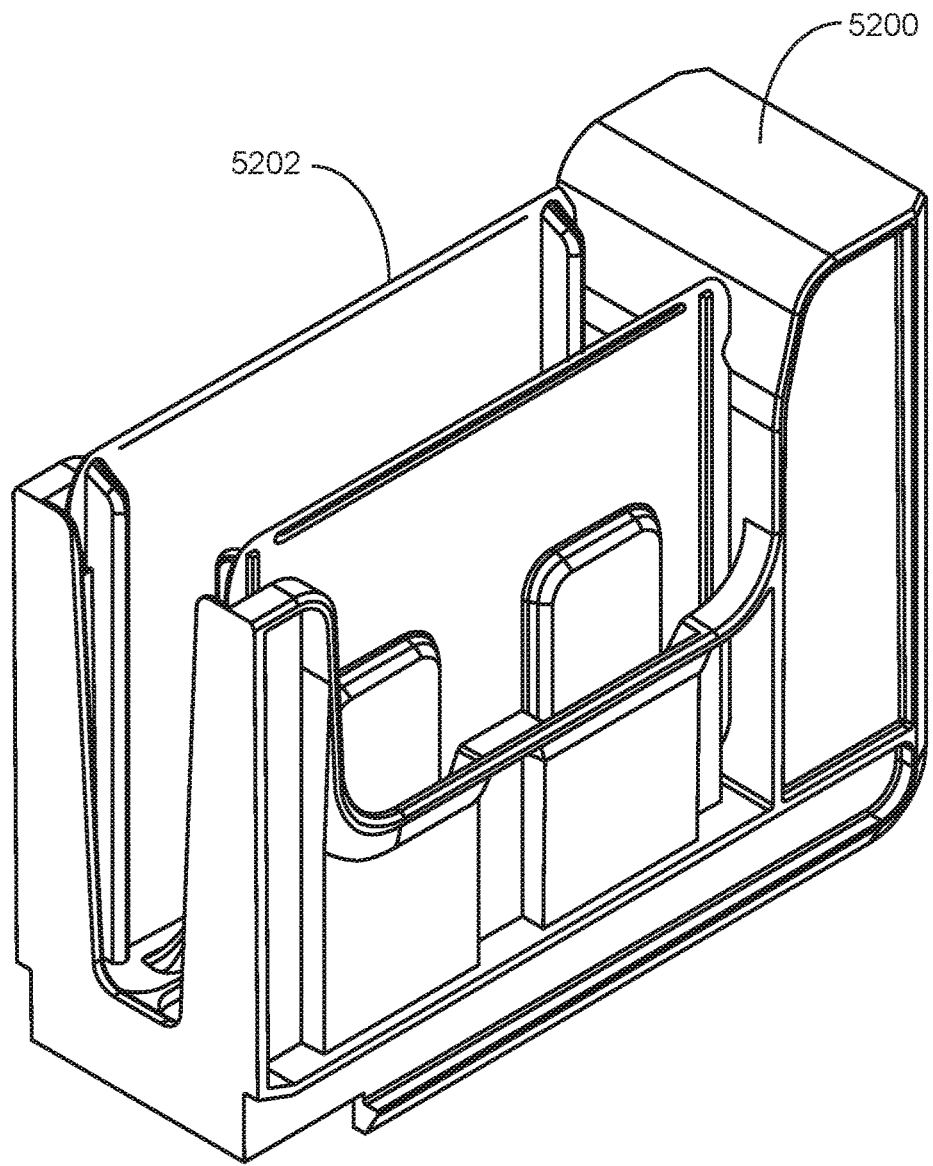
FIG. 52 shows a slide input caddy with installed slide pack according to one embodiment of the present disclosure.

A slide maker stainer system of the present disclosure also includes a sample loading area. The sample loading area includes one or more lanes for loading blank microscope slides into the slide maker stainer system. For example, the system may include lanes for loading slide input caddies into the system, where each caddy is adapted to hold a blank slide pack from which blank slides are taken by the system to prepare new slides (e.g., blood smears). An embodiment of a slide maker stainer system loading area having lanes for loading slide input caddies into the system is shown in FIG. 16. Shown is a portion of the front of a slide maker stainer system having slide input caddy lanes 1600, 1602 and 1604 into which slide input caddies 1606, 1608 and 1610 have been inserted by a user, respectively. To the right of the slide input caddy lanes are lanes into which sample tube racks are inserted by a user. A slide input caddy according to one embodiment is shown in FIG. 52. Shown is slide input caddy 5200 with slide pack 5202 installed (blank slides are not shown).

The sample loading area of the slide maker stainer system may also include one or more lanes into which sample tube racks may be loaded into the system. The lanes and sample tube racks may be of the same or similar type as described above with reference to an automated hematology analysis system.

Figure 48:
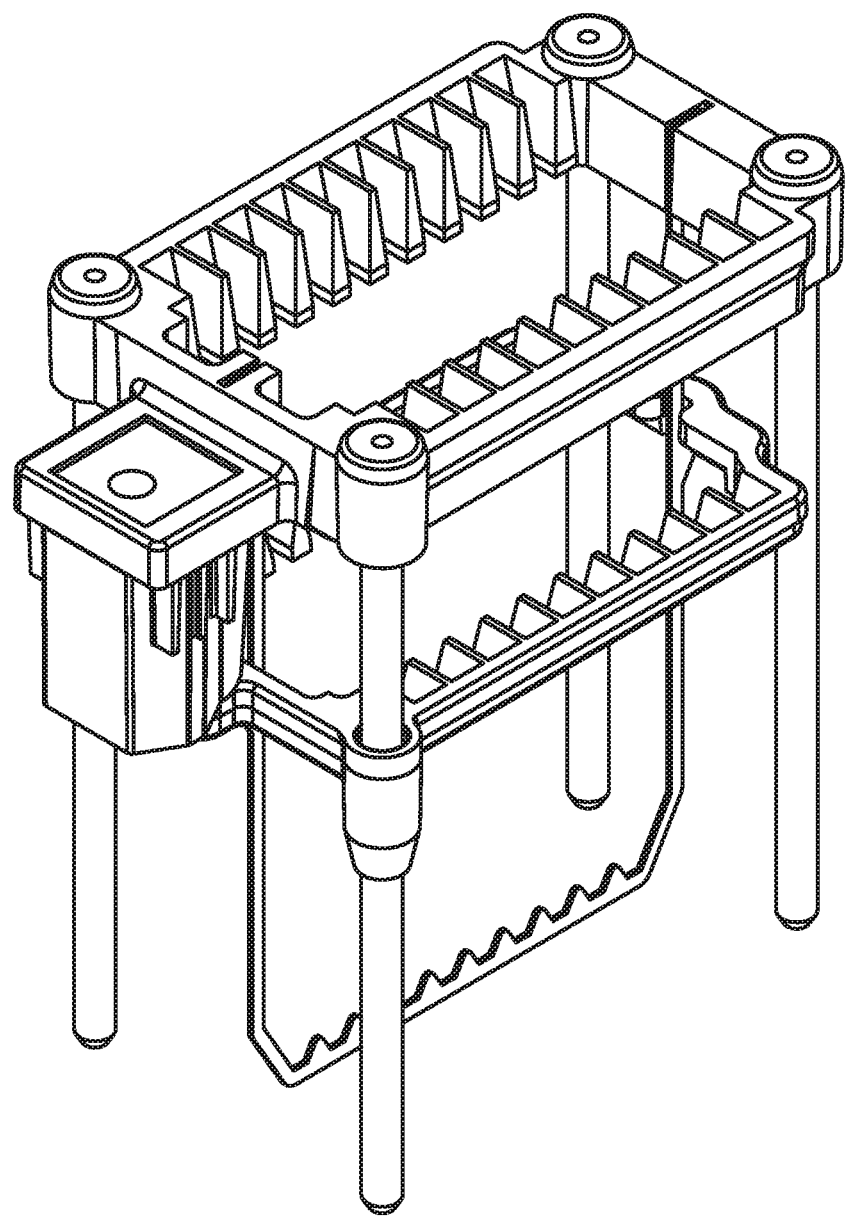
FIG. 48 shows a slide carrier according to an embodiment of the present disclosure.
Figure 49:
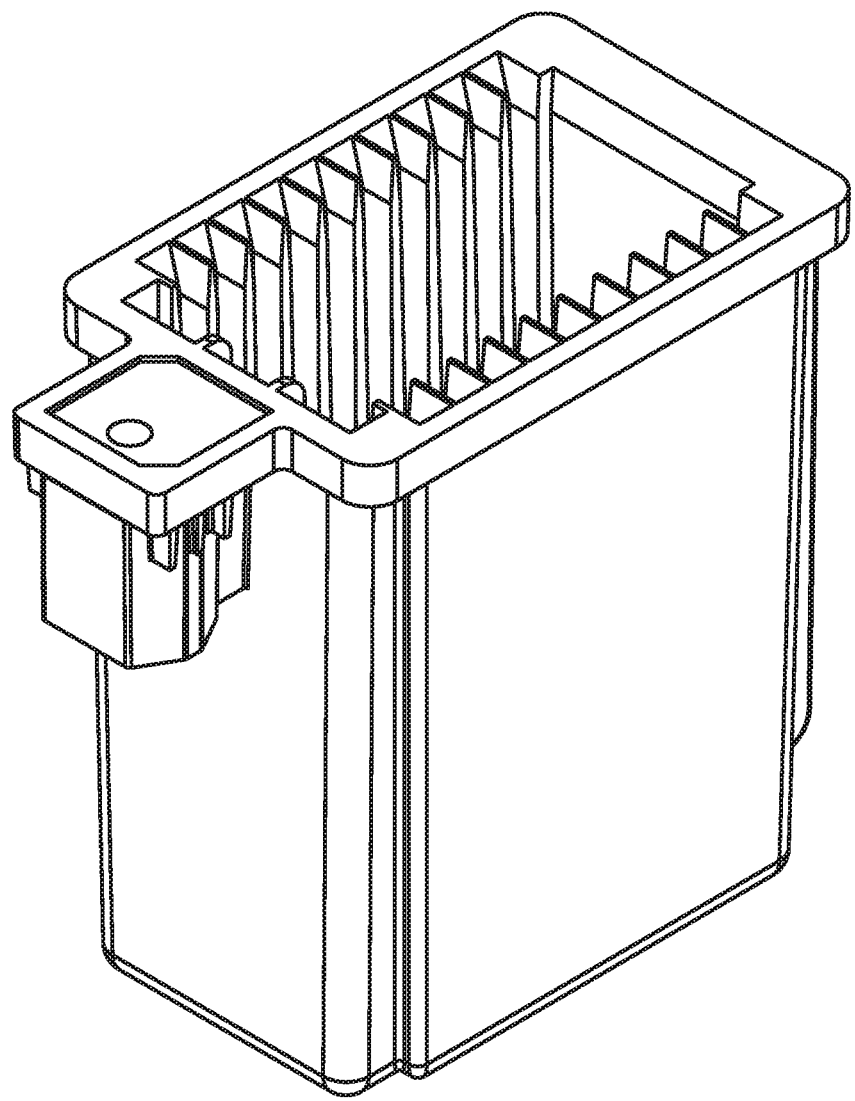
FIG. 49 shows a slide carrier according to an embodiment of the present disclosure.

The sample loading area of the slide maker stainer system may also include one or more lanes for slide input/output racks. The slide input/output rack is adapted to hold one or more slide carriers for the system to accept externally prepared slides and/or for outputting slides that have been prepared and processed (and optionally, analyzed) by the system to the user. The slide carriers hold prepared slides (e.g., blood smear slides) during processing (e.g., staining, washing, etc.) and facilitate transport of slides within the system. A slide carrier according to one embodiment is shown in FIG. 48. In this example, the carrier is adapted to hold 10 slides in a vertical orientation. A slide carrier according to another embodiment is shown in FIG. 49. In this example, the carrier is adapted to hold 10 slides in a vertical orientation, and is enclosed around the sides and bottom to provide containment for any liquid reagents present on the slide. For example, such a slide carrier finds use for holding slides that include immersion oil added to the slides for digital morphology analysis at high magnification.

Figure 50:
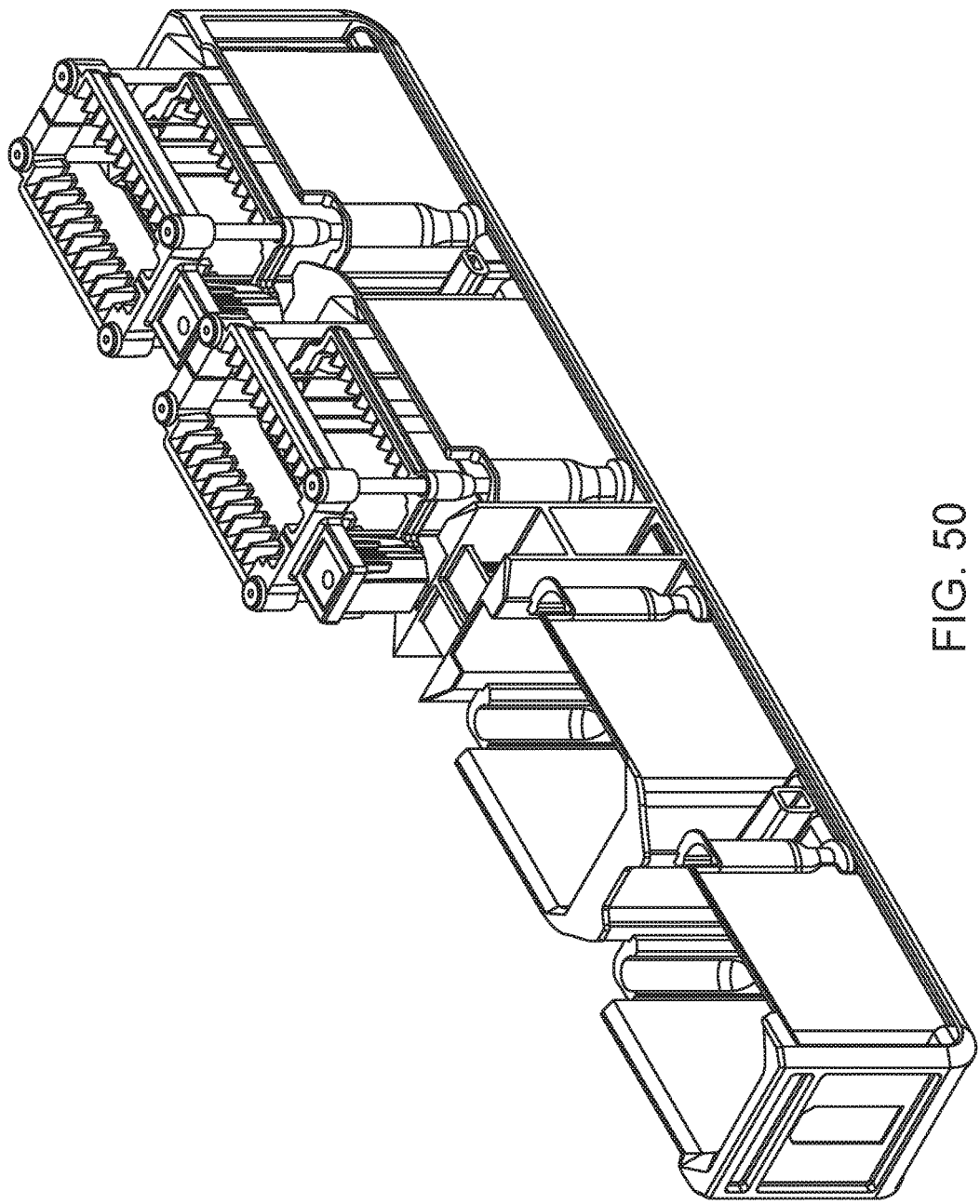
FIG. 50 shows a slide input/output rack according to an embodiment of the present disclosure.
Figure 51:
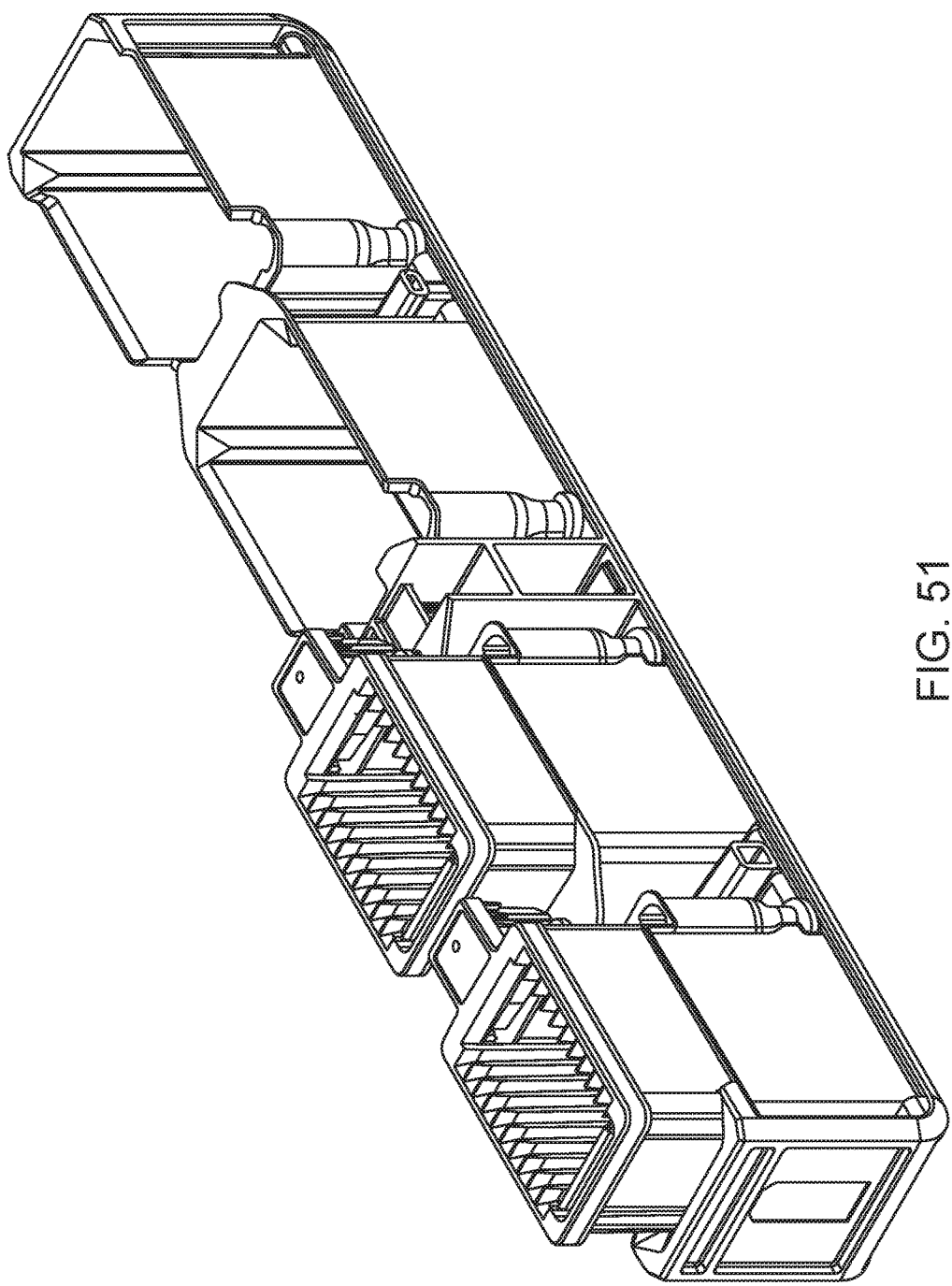
FIG. 51 shows a slide input/output rack according to an embodiment of the present disclosure.

A slide input/output rack according to one embodiment is shown in FIG. 50. In this example, the rack includes four slots, each slot adapted to hold a slide carrier. Shown is an input/output rack in which two of the slots are occupied by slide carriers of the same or similar type to the slide carrier shown in FIG. 48. FIG. 51 is an illustration of a slide input rack in which two of the slots are occupied by slide carriers of the same or similar type to the "closed" slide carrier shown in FIG. 49.

According to certain embodiments, a slide input/output rack includes holes for inserting slide carriers, pass-through windows for presence and position sensing in the loading area, a feature to mate with the loading area so that the rack is positively located into the lane and held in place until the system ejects it, and features for a robotic gripper to pick up the rack for ejecting it from the lane.

Figure 56:
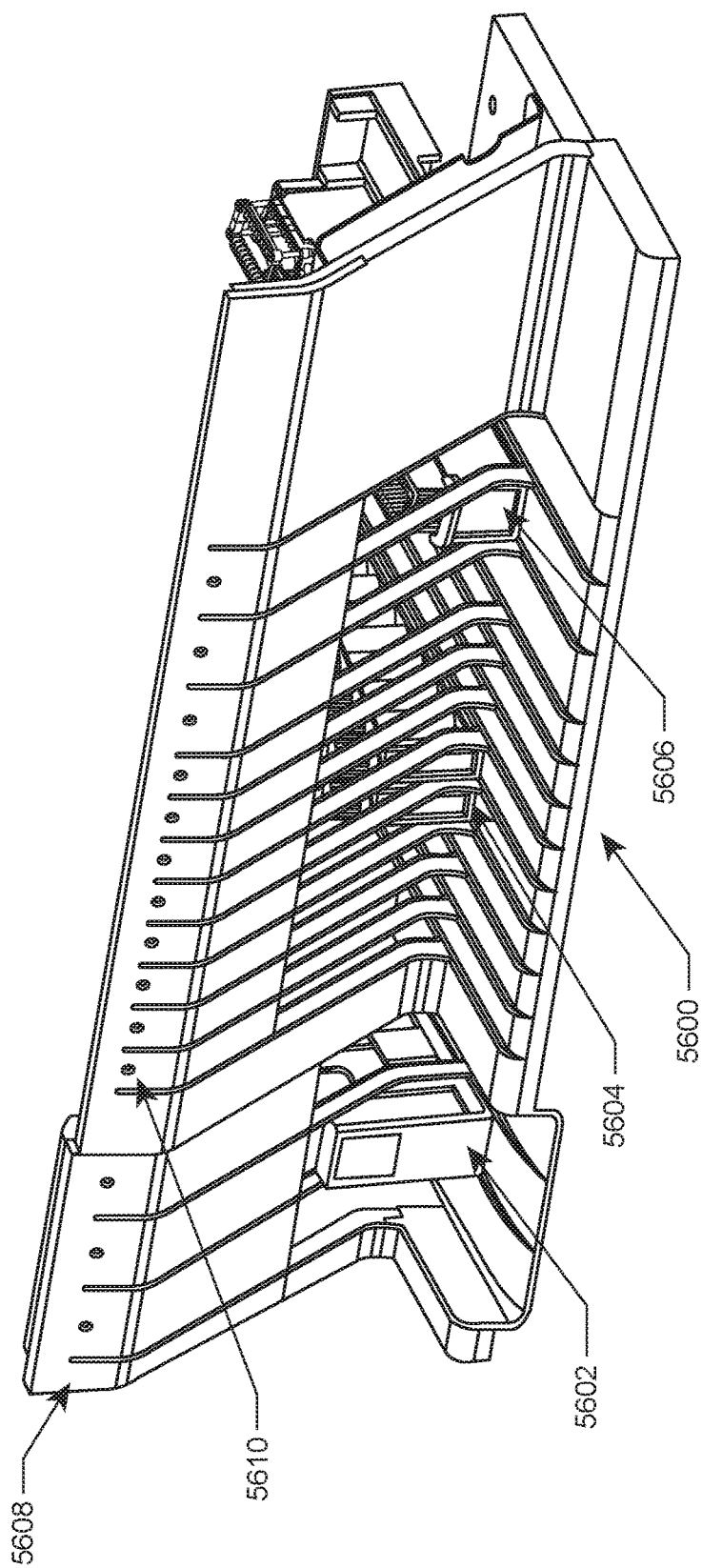
FIG. 56 shows a front loading area of a slide maker stainer system according to one embodiment.

A front loading area of a slide maker stainer system according to one embodiment is illustrated in FIG. 56. In this example, slide maker stainer system front loading area 5600 includes lanes for slide input caddies (e.g., slide input caddy 5602), lanes for sample tube racks (e.g., sample tube rack 5604) and lanes for slide input/output racks, e.g., slide input/output rack 5606. Also included is upper panel 5608 that includes indicator lights (e.g., indicator light 5610) for indicating to a user the status of each lane, the availability of each lane, and/or the like.

Beneath the lanes of a sample loading area, a retractable shelf may be included to provide a workspace for the user without increasing the footprint of the system. Such a workspace is useful when loading samples, running open tube samples, and/or the like.

Figure 3:
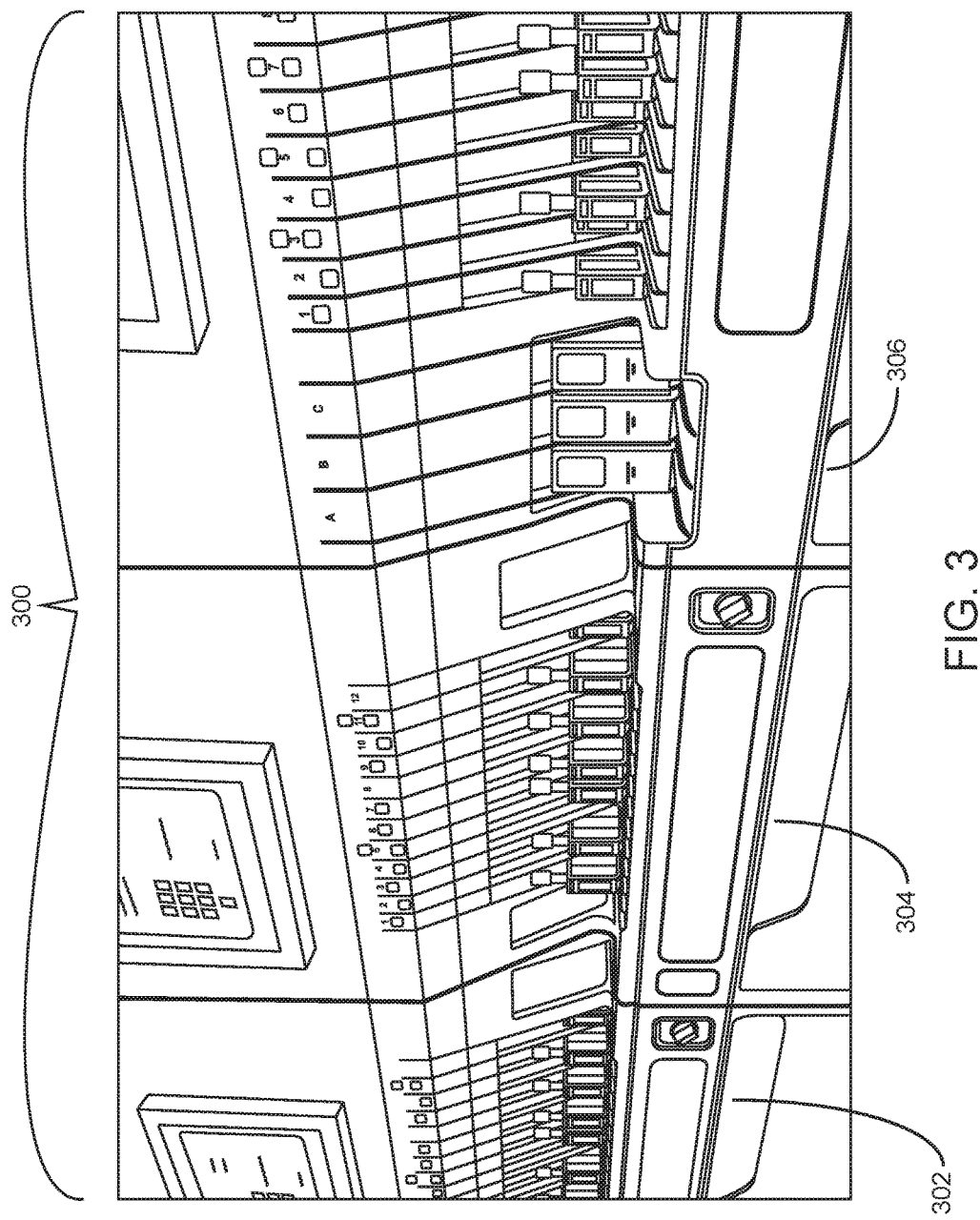
FIG. 3 shows loading areas of an integrated analysis system according to an embodiment of the present disclosure.

Sample loading areas of an integrated system according to an embodiment of the present disclosure are shown in FIG. 3. This example involves integrated analysis system 300 that includes two automated hematology analysis system modules (modules 302 and 304) and automated slide maker stainer module 306. Modules 302 and 304 each include a sample loading area that includes 12 lanes. Each lane is adapted to hold a sample tube rack, e.g., a closed sample tube rack or an open mode sample tube rack. The loading area of automated slide maker stainer module 306 according to this embodiment includes 3 slide input caddy lanes, 8 sample tube rack lanes (only 7 of which are shown) and 3 lanes for slide input/output racks (not shown).

Sample Tube Racks

Aspects of the present disclosure include racks for holding sample tubes, which racks find use, e.g., in the automated hematology analysis systems and slide maker stainer systems of the present disclosure. Racks of the present disclosure include closed tube racks and open tube racks. Closed tube racks are "standard" tube racks generally designed to hold regular/routine blood sample tubes that include pierceable caps. Open tube racks are designed to hold, e.g., tubes containing low volume samples. In open tube mode, the tube may be resuspended manually, the cap is removed and the tube is placed in a special open tube rack. The instrument recognizes the open tube rack and moves it to a designated open tube location for aspiration.

Tube racks of the present disclosure include holes for inserting sample tubes, and may additionally include one or any combination of: a rack ID barcode label on the top of the rack; a human-readable rack ID label on one or both ends of the rack; optical pass-through windows for presence and position sensing in the loading area; a pass-through window for locating the rack in a pick-up zone of an internal conveyor within the system; a feature to mate with a lane in the loading area so that the rack is positively located into the lane and held in place until the system ejects it; one or more features for a robotic gripper of the system to pick up the rack to move it to an internal conveyor, to move it to an open tube processing area, or for ejecting the rack from the lane; and an alignment hole to mate with alignment notches in an internal conveyor rail for initial alignment of the rack in the conveyor.

Figure 42:
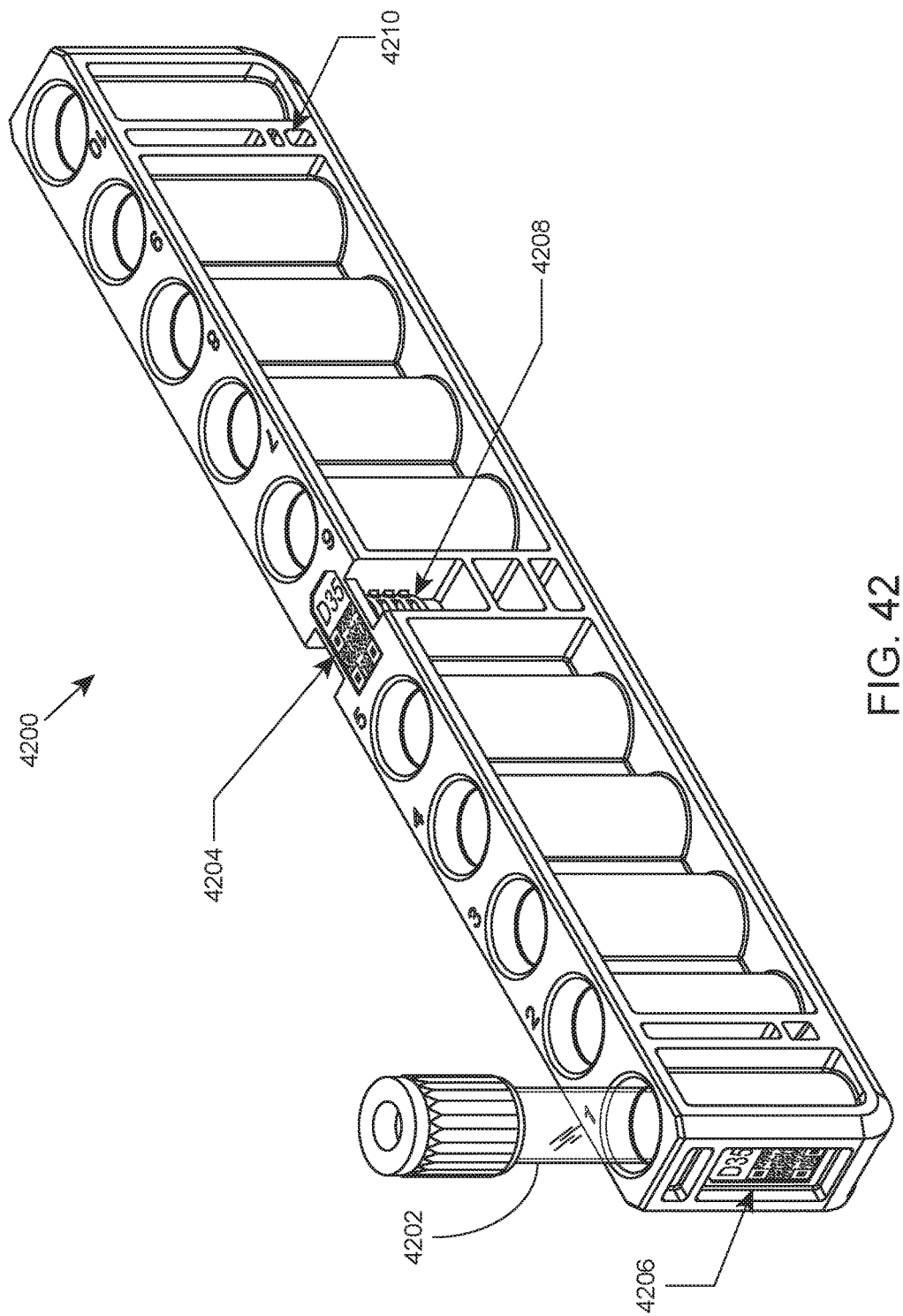
FIG. 42 shows features of a closed tube rack according to one embodiment of the present disclosure.
Figure 43:
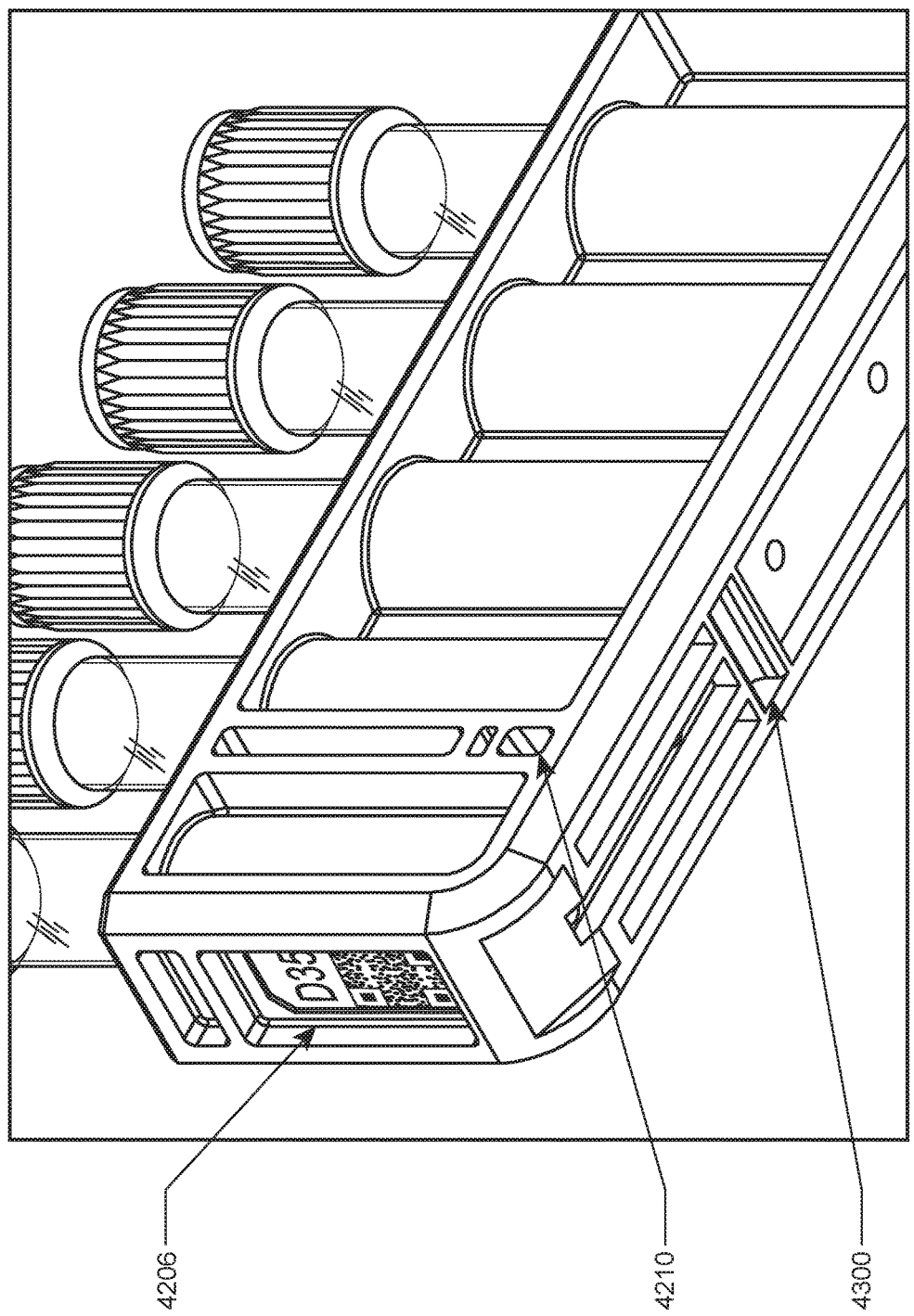
FIG. 43 shows features of a closed tube rack according to one embodiment of the present disclosure.

An illustration of a closed tube rack according to one embodiment of the present disclosure is provided in FIG. 42. Shown in this example is closed tube rack 4200 having a 10 closed tube capacity. Closed tube 4202 is shown in position 1 of rack 4200. In this embodiment, closed tube rack 4200 includes rack ID barcode label 4204 on the top of the rack, rack ID label 4206 on an end of the rack, robot gripping feature 4208 in a central location of the rack, and lane position sensing windows (e.g., sensing window 4210) at both ends. FIG. 43 provides an illustration of a portion of the underside of the closed tube rack shown in FIG. 42. Shown in this view is notch 4300 for mating with a feature (e.g., a locking rib) present on the surface of a lane for reversibly fixing the rack in the lane when the rack is fully inserted into the lane. A cutaway view of the rack showing this feature is provided in FIG. 44. Also shown in FIG. 43 is rack ID label 4206 and lane position sensing window 4210.

Figure 46:
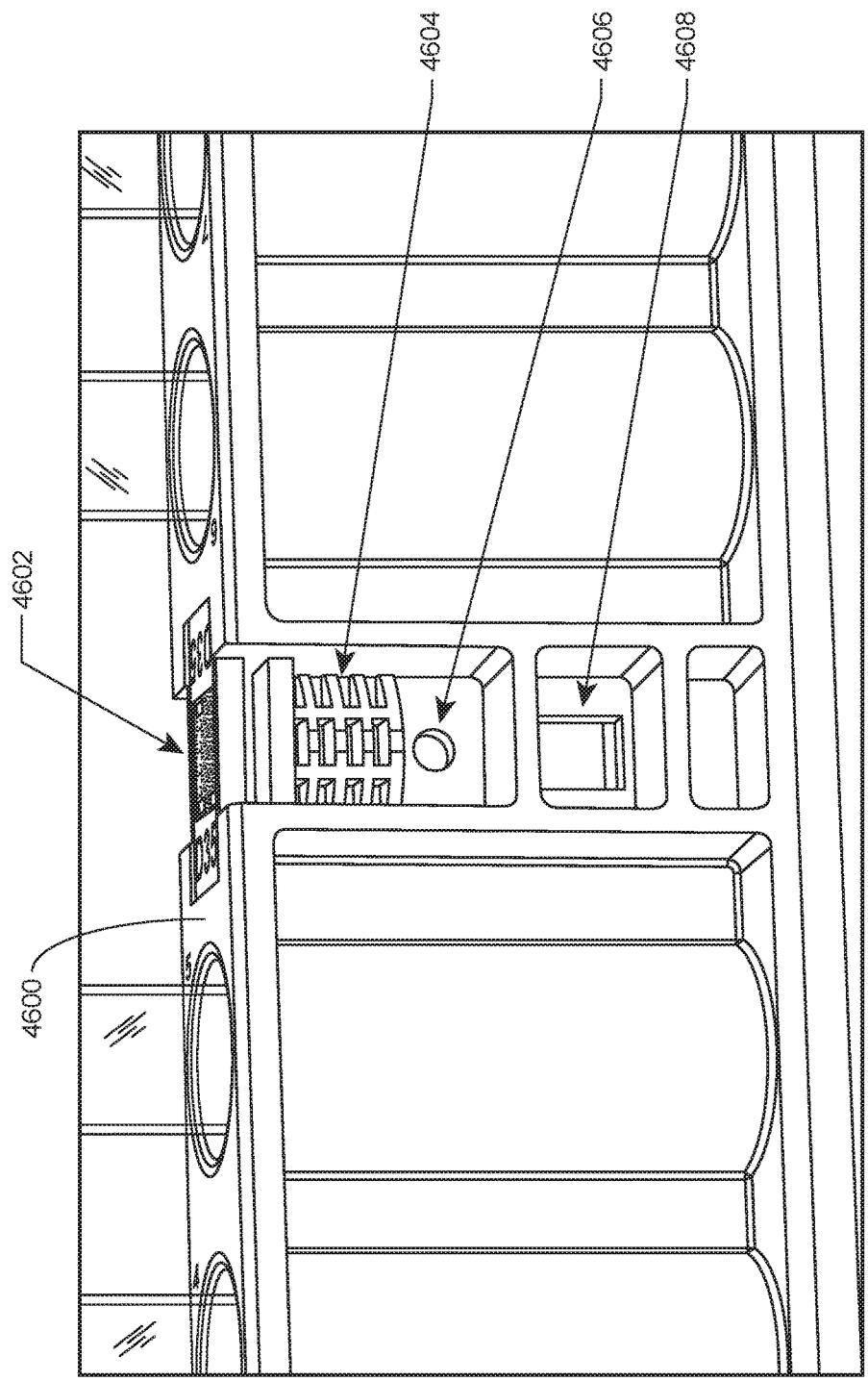
FIG. 46 shows features of a closed tube rack according to an embodiment of the present disclosure.

An illustration of a portion of a closed tube rack according to one embodiment of the present disclosure is provided in FIG. 46. In this example, closed tube rack includes rack ID barcode label 4602 on the top of the rack, robot gripping feature 4604, conveyor alignment hole 4606, and conveyor position sensing window 4608. Alignment hole 4606 facilitates alignment (e.g., initial alignment) of the rack in an internal conveyor by mating with an alignment notch in a rail of the internal conveyor. Sensing window 4608 facilitates detection and tracking of the rack within an internal conveyor system of the automated hematology analysis or slide maker stainer system.

Open tube racks are used to accommodate tubes that must be processed without caps, including but not limited to, pediatric "bullet" tubes without pierceable caps and other non-standard size tubes. The user selects the appropriate open tube rack based on the diameter of the open tube to be processed. A recess may be provided in the rack (e.g., on the top of the rack) to temporarily store removed caps during processing. This allows the cap to be easily returned to its original tube after processing. According to certain embodiments, an open tube rack contains two holes for sample tubes. The diameters of the two holes may be the same or different. When the diameters are different, the user selects the appropriate hole for the type of tube to be processed, and inserts the end holding the tube first into the loading area. Other features that may be provided in an open tube rack include a cap retention feature to hold tethered caps out of the way, slots for tube label "flags" to be inserted, and/or the like.

In certain aspects, open tube racks are picked up by a robotic gripper and placed into an open tube processing area for sample aspiration. For the robot gripper to clear the aspiration assembly and gain enough reach, the gripping feature on the open tube racks may be located at an offset (rather than a center) position on the rack. So that the racks may be inserted either direction, two offset gripping features may be provided on the open tube racks. A center gripping feature may also be included to allow the open tube racks to be ejected by a robotic gripper in the same manner as the standard (closed) tube rack.

Figure 47:
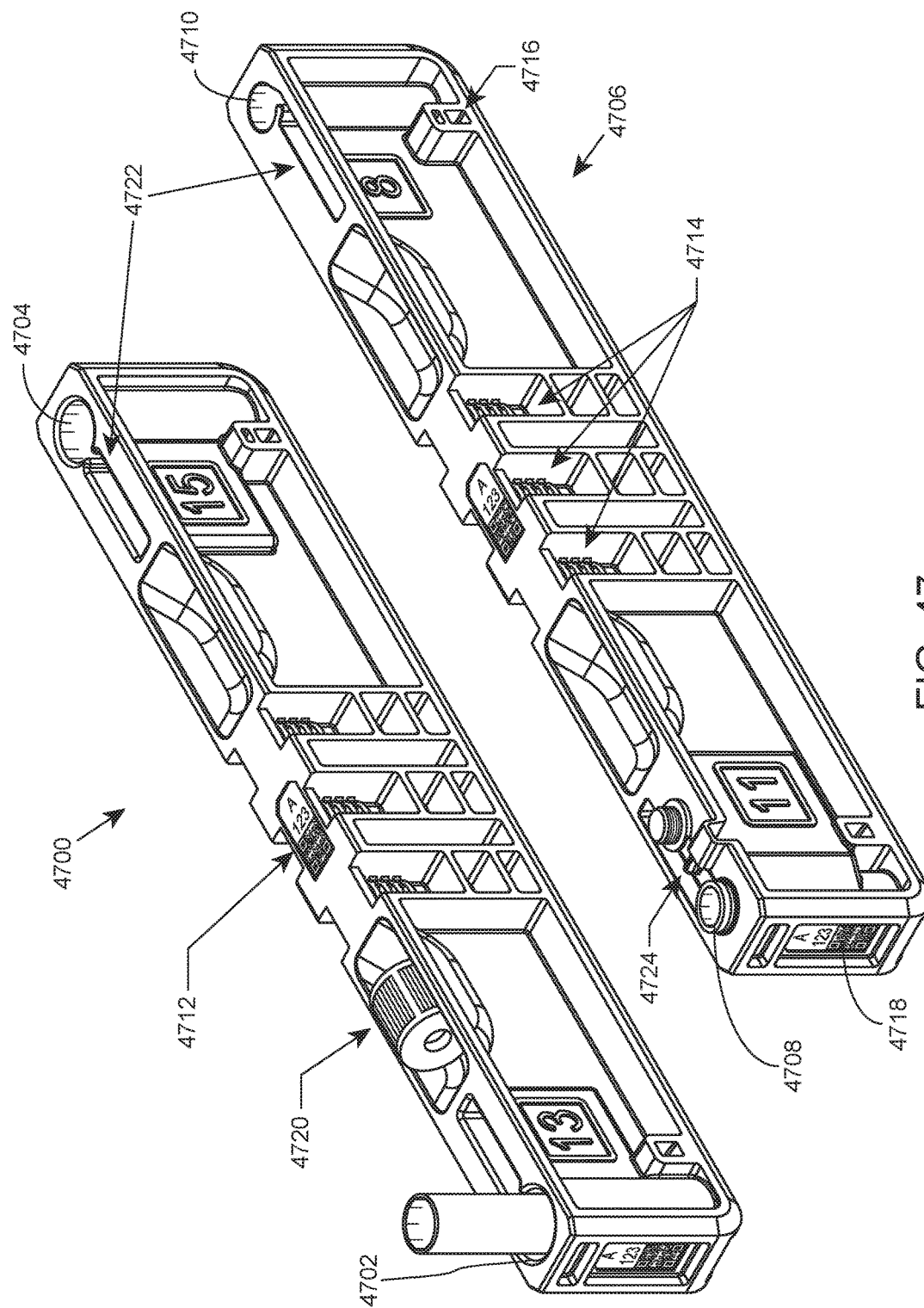
FIG. 47 shows two examples of open tube racks according to certain embodiments of the present disclosure.

Two example open tube racks of the present disclosure are shown in FIG. 47. Open tube rack 4700 has open tube hole 4702 at one end and open tube hole 4704 at the other end. Holes 4702 and 4704 in this example have different diameters for accommodating different open tube sizes (here, 13 mm for 4702 and 15 mm for 4704). Similarly, open tube rack 4706 has open tube hole 4708 at one end and open tube hole 4710 at the other end. Holes 4708 and 4710 have different diameters for accommodating different open tube sizes (here, 11 mm for 4708 and 13 mm for 4710). Each of racks 4700 and 4706 include a rack ID barcode label on the top of the rack (see label 4712 on the top of rack 4700), three robot gripping features (see set 4714 of three robot gripping features on rack 4706), lane position sensing windows at each end (see lane position sensing window 4716 of rack 4706), and rack ID labels at each end (see rack ID label 4718 of rack 4706). In addition, racks 4700 and 4706 include storage pockets for a holding a cap removed from an open tube (see cap storage pocket 4720 of rack 4700 having a cap stored therein). Slots for tube label "flags" are also provided (see tube label flag slots 4722). As shown, the slots may be centered with the tube hole, or may be tangential relative to the tube hole. Rack 4706 includes flip cap retention feature 4724 for holding a tethered cap out of the way, e.g., during open tube sample aspiration.

Sample Processing for Hematology Analysis

Figure 57:
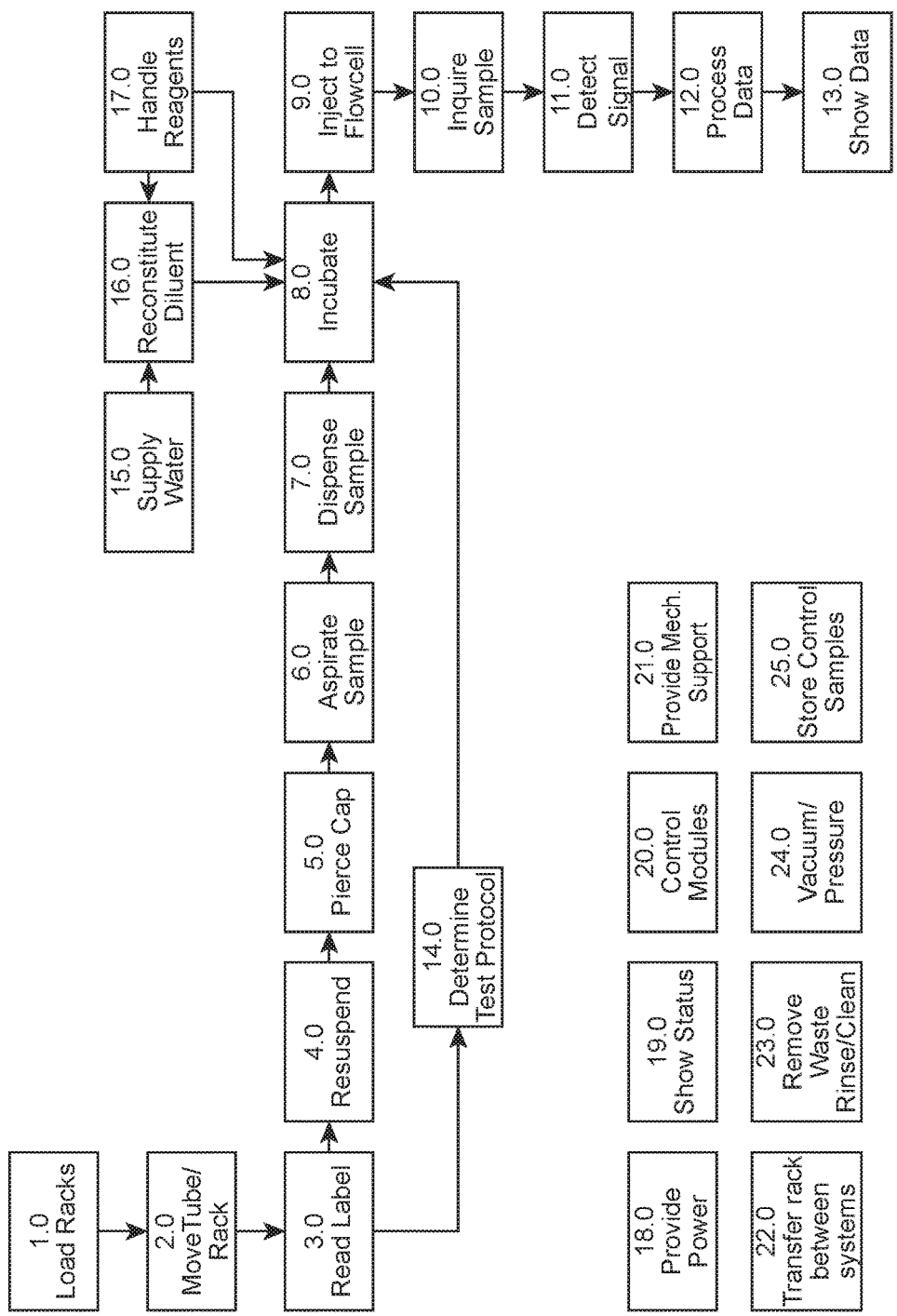
FIG. 57 shows a flow diagram of an example workflow which may be carried out by an automated hematology analysis system according to an embodiment of the present disclosure.

Automated hematology analysis systems of the present disclosure are adapted for automated processing of blood and body fluids samples for hematology analysis. For example, a system may be adapted to carry out a work flow as illustrated in the flow diagram of FIG. 57. Upon loading of a sample tube rack by a user into the system, the system automatically retrieves a sample tube from the rack and reads a label (e.g., a barcode printed on a label) of the sample tube. The sample within the tube is resuspended (e.g., by inversion mixing) and transported to an aspiration/dispense area of the system. A cap of the sample tube is pierced, an aliquot of the sample is aspirated from the tube, dispensed into a diluent and incubated for a duration suitable for a determined test protocol. The diluted sample is then injected into a flowcell for hematology analysis using an optical excitation/detection system. The collected data is processed and results are displayed to the user. Aspects of this work flow according to embodiments of the present disclosure will now be described in greater detail.

Figure 4:
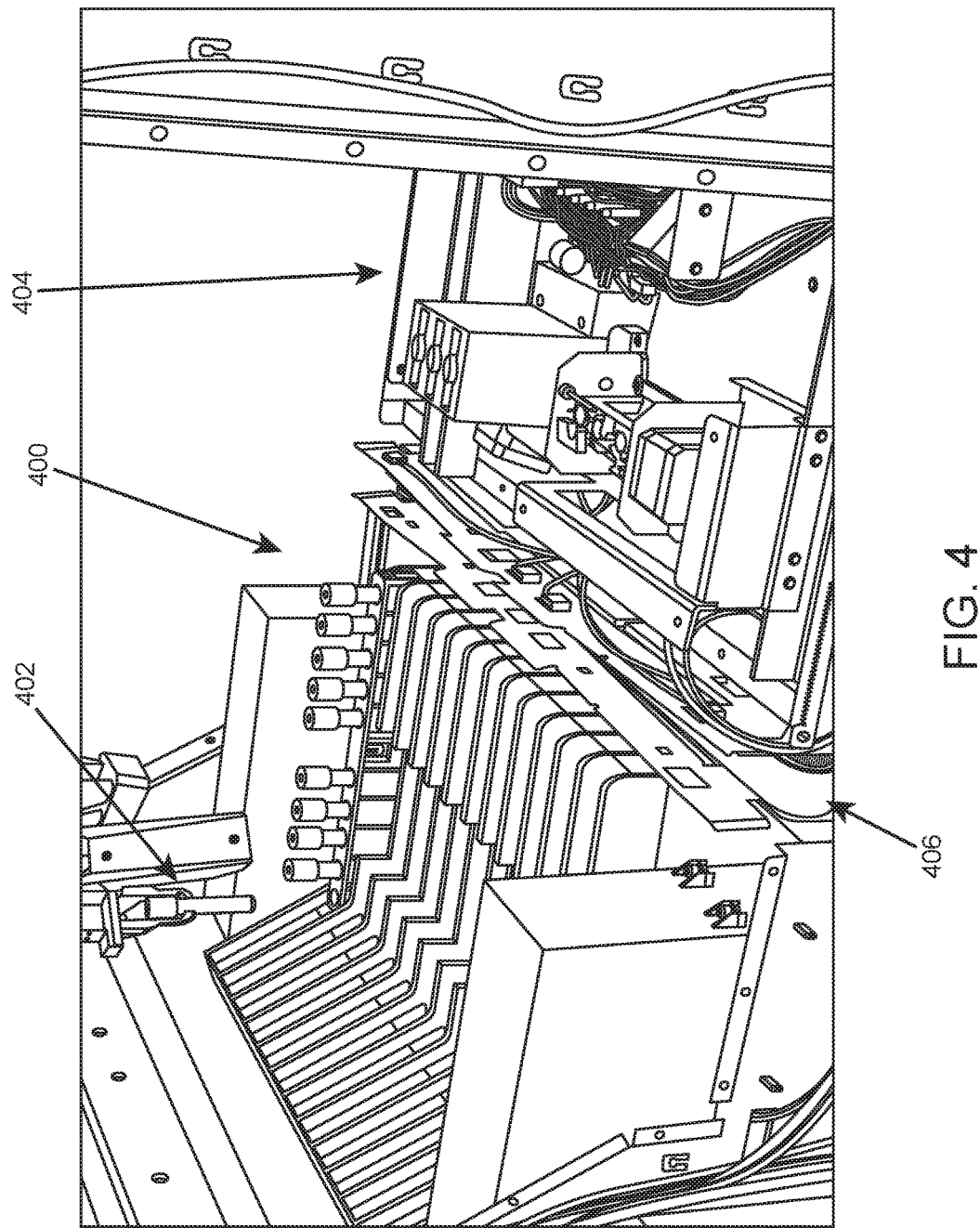
FIG. 4 shows an internal view of an automated hematology analysis system according to an embodiment of the present disclosure.

Once inside the system, movement of sample tubes is managed by a robotic gripper which has freedom to move throughout the system. Shown in FIG. 4 is an internal view of a system according to one embodiment. On the left is an internal portion of sample loading area 400 in which a sample tube rack is present in the farthest lane. On the right is sample processing area 404. Internal conveyor system 406 is positioned between loading area 400 and processing area 404. The system includes machine vision for detecting the presence of tubes in racks. As shown, robotic gripper 402 has picked up a sample tube from the sample tube rack.

Figure 5:
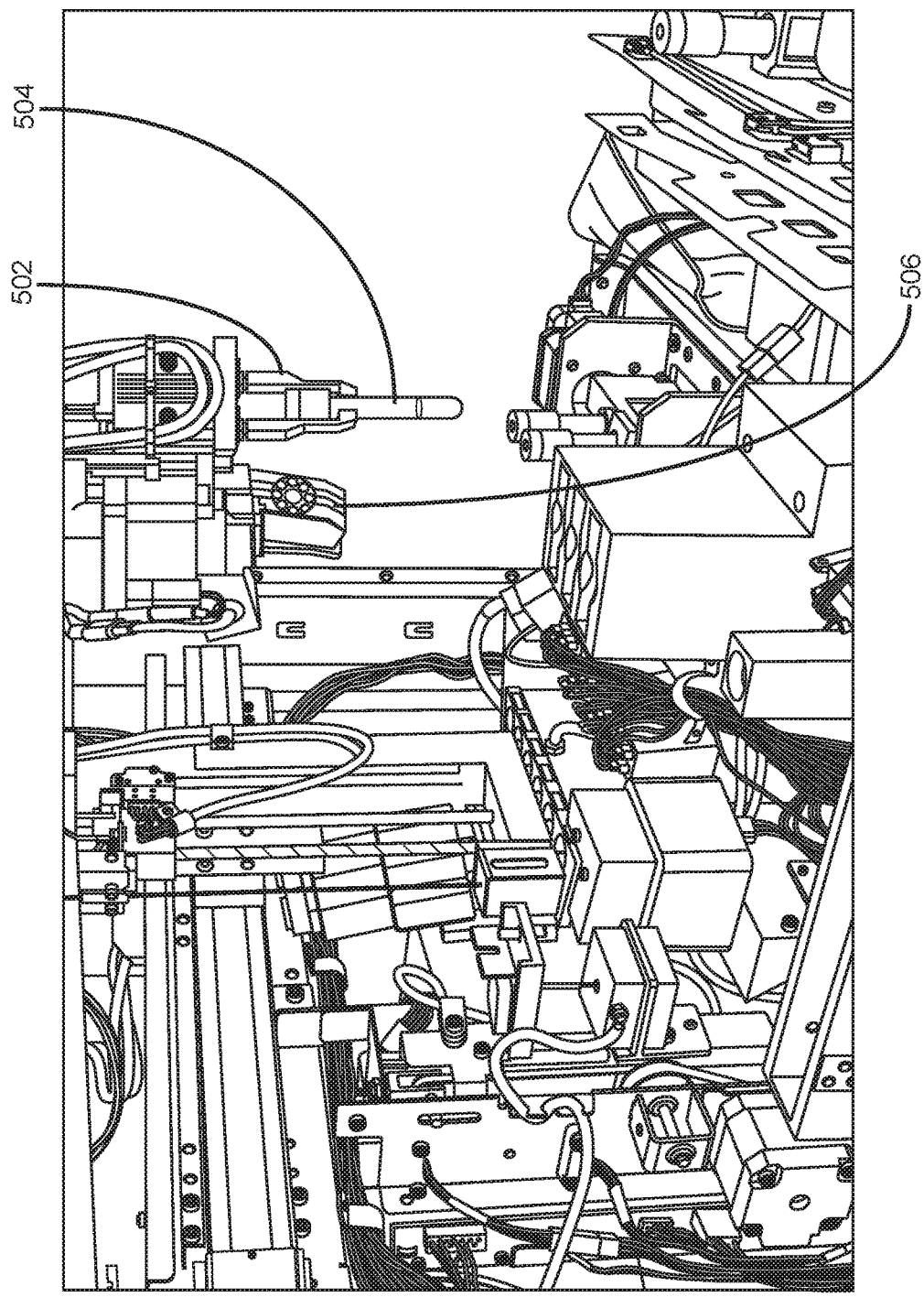
FIG. 5 shows components for capturing an image of a barcode present on a sample tube according to an embodiment of the present disclosure.

Before sample aspiration, a sample tube may be identified using a digital imaging barcode camera. In certain aspects, the robotic gripper is adapted to spin the sample tube, and a digital imaging barcode camera captures a 360 degree image of the barcode on the sample tube as the robotic gripper spins the sample tube. This embodiment is shown in FIG. 5. As shown, robotic gripper 502 has retrieved sample tube 504 from the loading area. Robotic gripper 502 spins sample tube 504 as digital imaging barcode camera 506 captures a 360 degree image of a barcode on sample tube 504 as robotic gripper 502 spins the sample tube.

Figure 60:
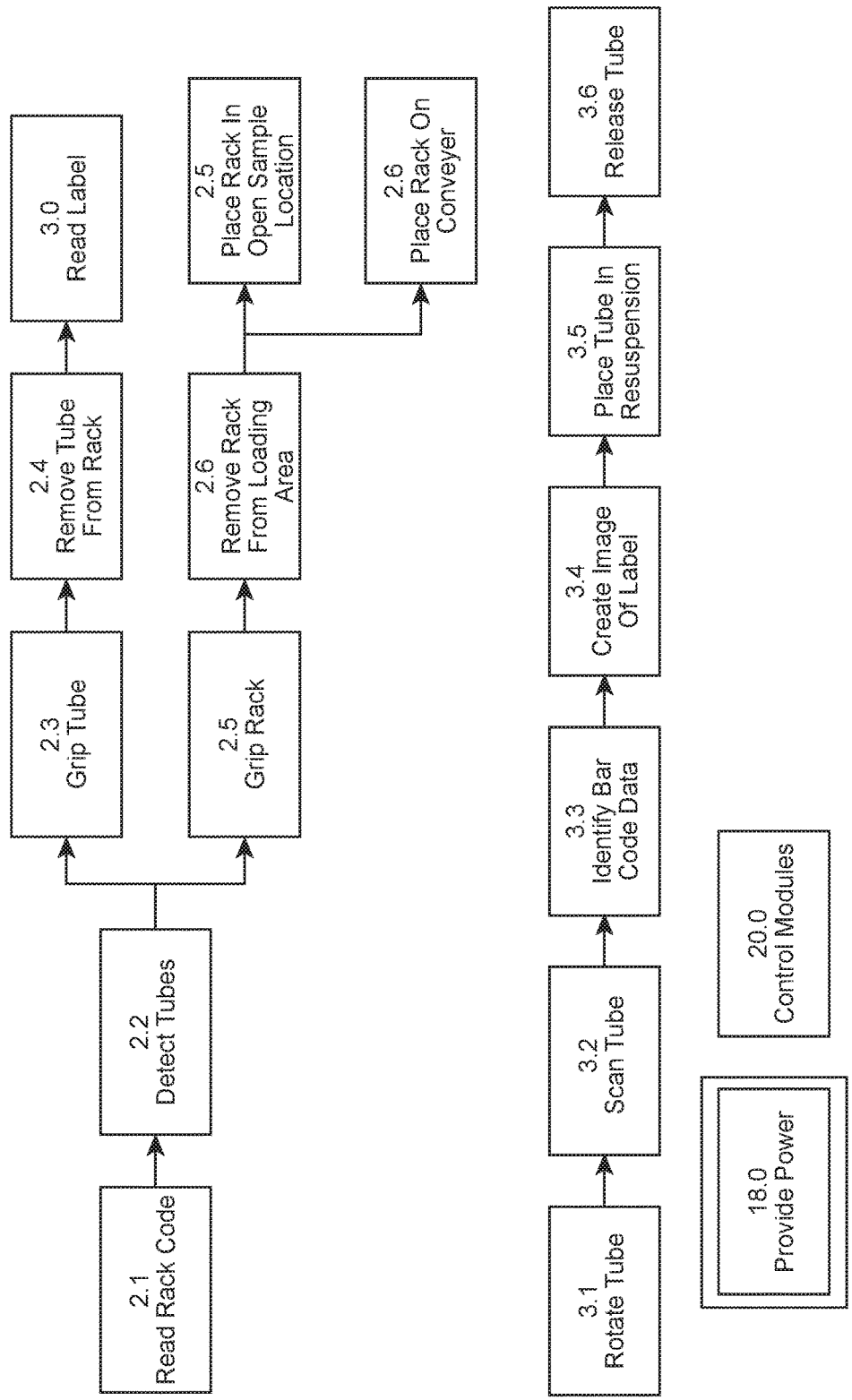
FIG. 60 shows a flow diagram of an example workflow relating to a robot, gripper, and camera subsystem according to an embodiment of the present disclosure.
Figure 61:
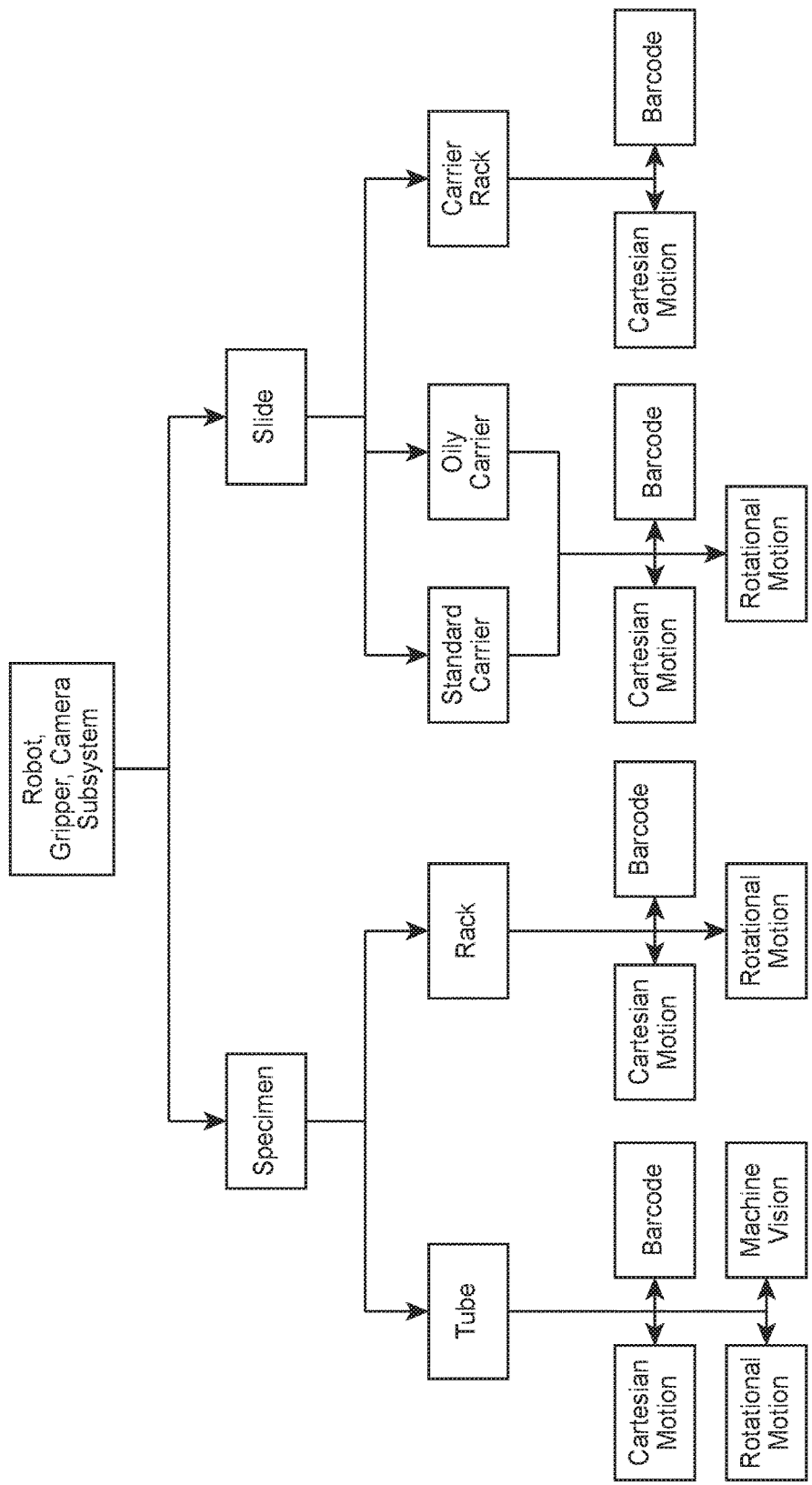
FIG. 61 shows a flow diagram of an example workflow relating to a robot, gripper, and camera subsystem according to an embodiment of the present disclosure.

The robotic gripper and digital imaging barcode camera may be part of a robot, gripper, and camera subsystem capable of automated movement and vision functions for tubes, tube racks, slide carriers, or slide carrier racks (the latter two being applicable when present in a slide maker stainer). The motion function may be segregated into Cartesian and rotational motion tasks, while the vision function may be segregated into barcode decoding and machine vision tasks. A flow diagram showing an example workflow relating to a robot, gripper, and camera subsystem according to an embodiment of the present disclosure is shown in FIG. 60. A flow diagram showing a further example workflow relating to a robot, gripper, and camera subsystem according to an embodiment of the present disclosure is shown in FIG. 61.

Figure 6:
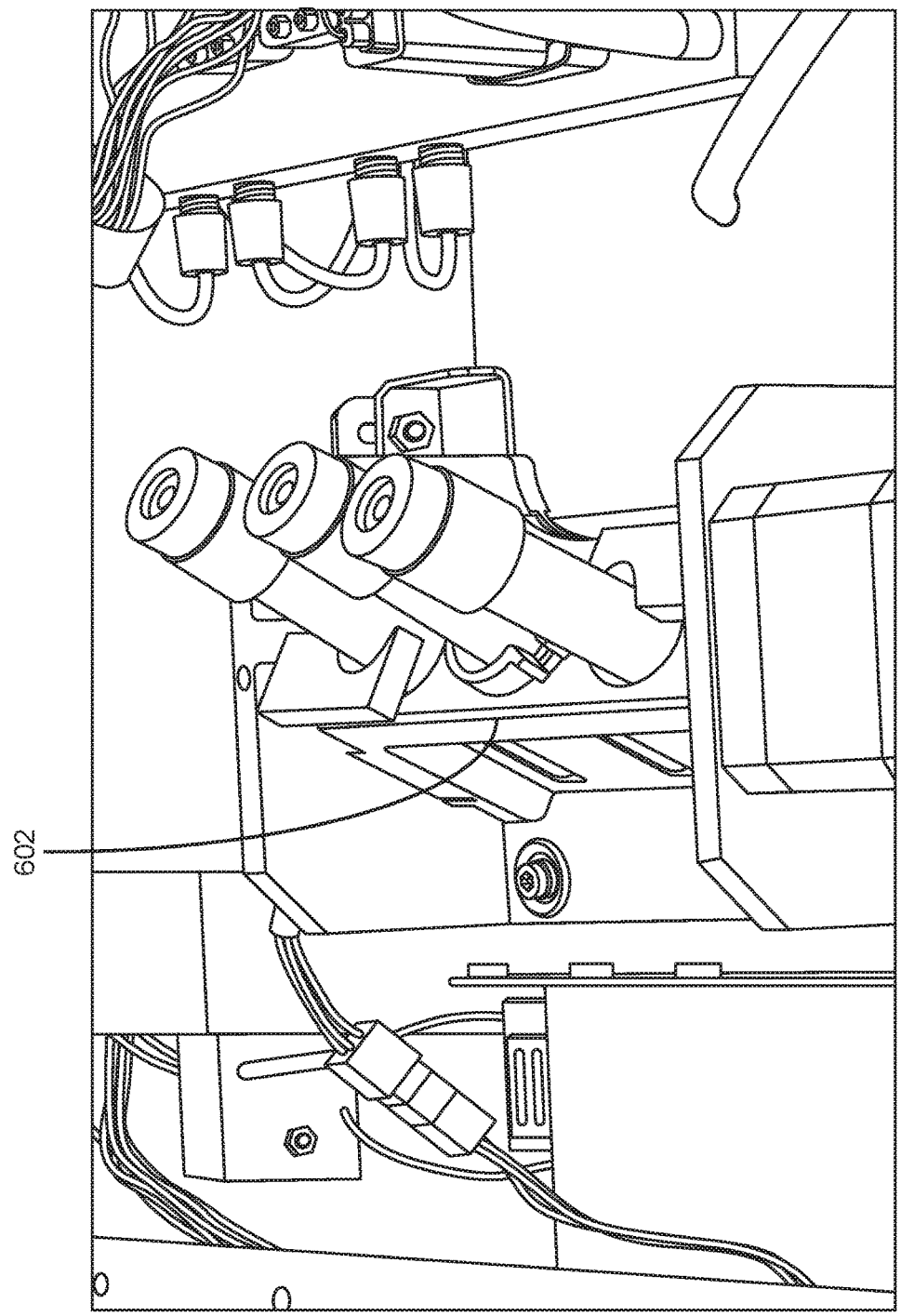
FIG. 6 shows an on-board inversion mixer according to an embodiment of the present disclosure.

Upon identification of the sample tube, the sample is resuspended. In certain aspects, the robotic gripper moves the sample tube to an on-board inversion mixer that inverts the sample tube to resuspend the sample. Shown in FIG. 6 is on-board inversion mixer 602 having a multi-tube capacity (in this example, a 3 tube capacity).

Figure 12:
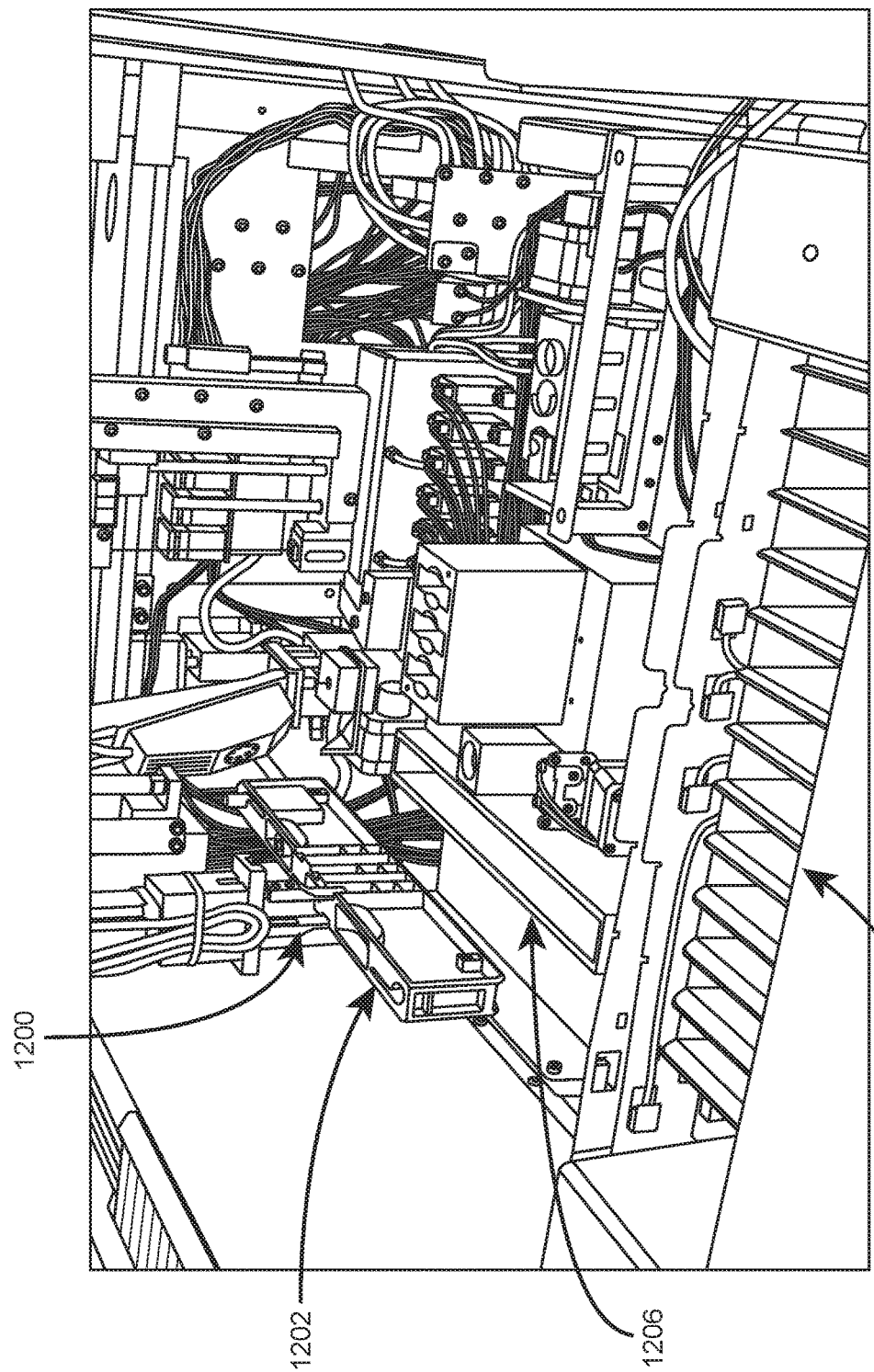
FIG. 12 shows the transport of an open tube rack from a sample loading area to a dedicated open mode processing area by a robotic gripper according to an embodiment of the present disclosure.
Figure 13:
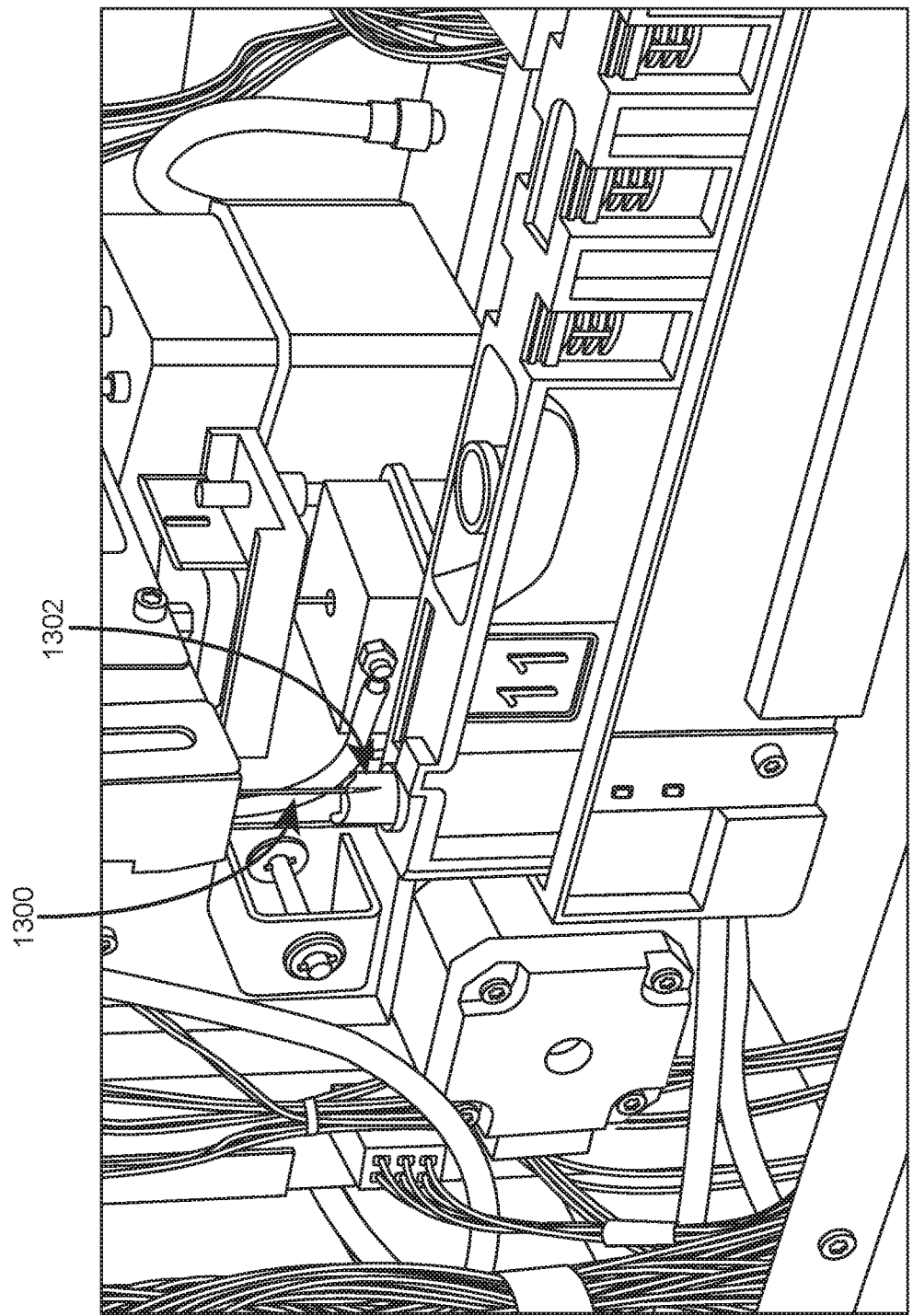
FIG. 13 shows an aspiration probe of an example aspiration/dispense subsystem inserted into an open sample tube at a dedicated open mode processing area.

Upon sample resuspension, the sample tube is moved by the robotic gripper to an aspiration/dispense subsystem. The aspiration/dispense subsystem is adapted to aspirate sample from sample tubes either in open or closed tube sampling mode. Closed tube sampling is carried out at a piercing station. Open tube sampling may be carried out in an open tube rack which has been moved to a dedicated open mode processing area by the robotic gripper, as shown in FIG. 12 which shows an internal view of an example automated hematology analysis system. In this example, robotic gripper 1200 retrieves open tube rack 1202 from sample loading area 1204 and transports rack 1202 to dedicated open mode processing area 1206. Shown in FIG. 13 is aspiration probe 1300 of an example aspiration/dispense subsystem inserted into open sample tube 1302 at a dedicated open mode processing area.

The aspiration/dispense subsystem may be further adapted to dispense sample into the incubation cups (e.g., waster, RBC, WBC, Hgb, and/or the like). A probe is used for sample aspiration and dispense. According to certain embodiments, a Nitinol probe is used. Nitinol material has super elastic properties and is compatible with reagents used in the analyzer. In certain aspects, a stepper motor is used to ascend/descend the probe. The aspiration/dispense subsystem may be equipped with optical sensors for tube bottom sensing and homing the probe carriage. A linear encoder may be included to verify probe position. The subsystem may include a wash block to wash the outside surface of the probe. Diluent reagent may be used to wash the internal probe surface. A robot may be included (e.g., on a rail) to transport the subsystem to piercer, incubation assembly and open mode locations. According to certain embodiments the subsystem is adapted to be used in conjunction with the incubation subsystem and pressure sensor for short sample and clot detections.

Figure 7:
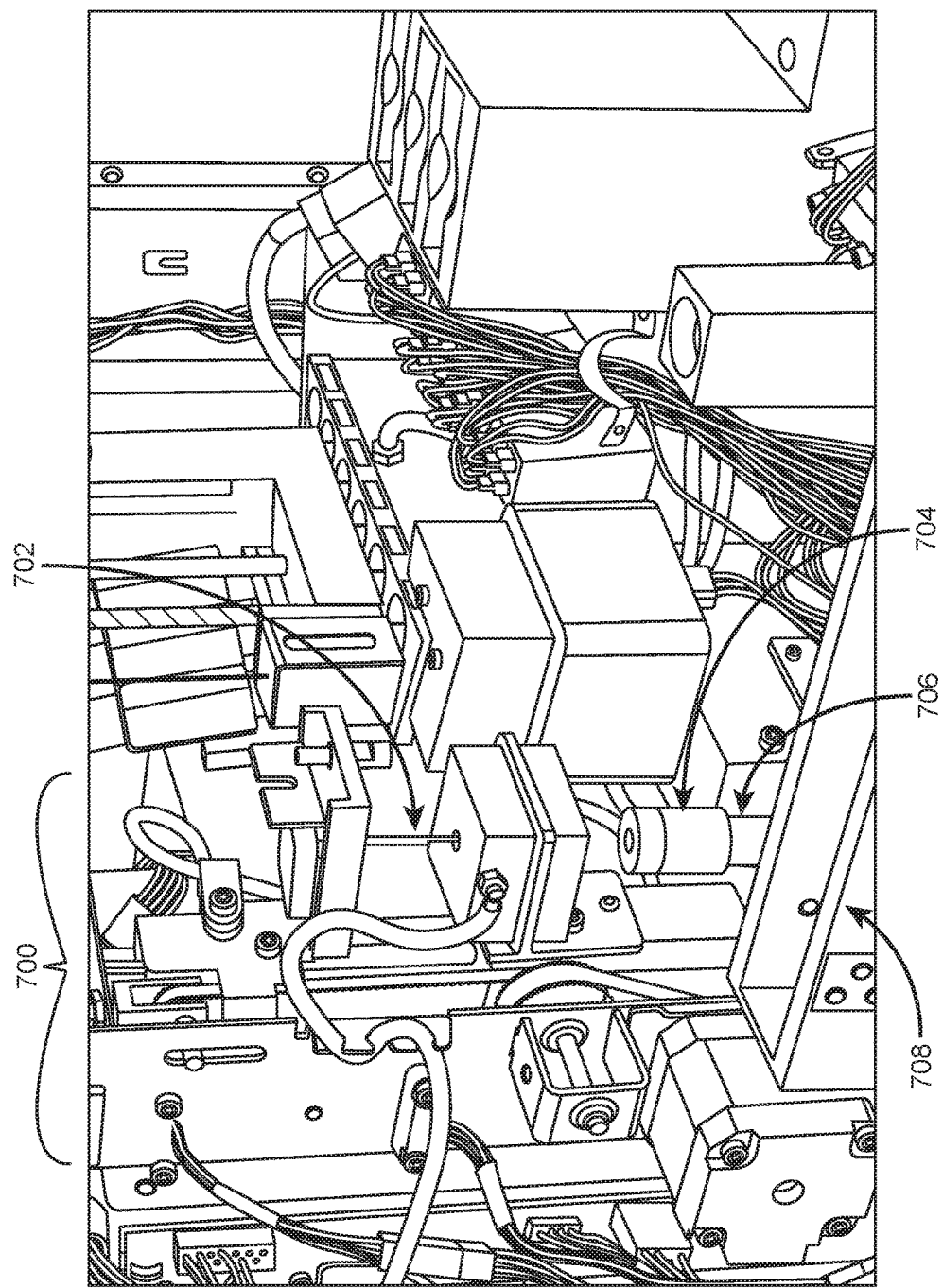
FIG. 7 shows an aspiration/dispense subsystem according to an embodiment of the present disclosure.

An aspiration/dispense subsystem according to an embodiment of the present disclosure is shown in FIG. 7. Aspiration/dispense subsystem 700 includes probe 702 adapted to pierce cap 704 of closed tube 706. For open tube processing, an open tube rack that includes an open tube may be moved to open mode processing area 708. A motor is capable of moving aspiration/dispense subsystem from the closed tube aspiration/dispense position to open mode processing area 708.

For sample incubation and injection into a flow cytometer, the automated hematology analysis system may include an incubation and injection subsystem adapted for preparation of sample (e.g., homogeneous mixing of biological sample and reagent, and incubation of the mixture) and delivery of the prepared sample to an optical flowcell for RBC/RETC, WBC samples and to Hgb flowcell for Hgb sample for analysis. According to certain embodiments, the design allows for rinsing of the sample path with diluent (RBC path) and water (WBC and Hgb) flow passages as well as the incubation cups to minimize carry over.

Figure 8:
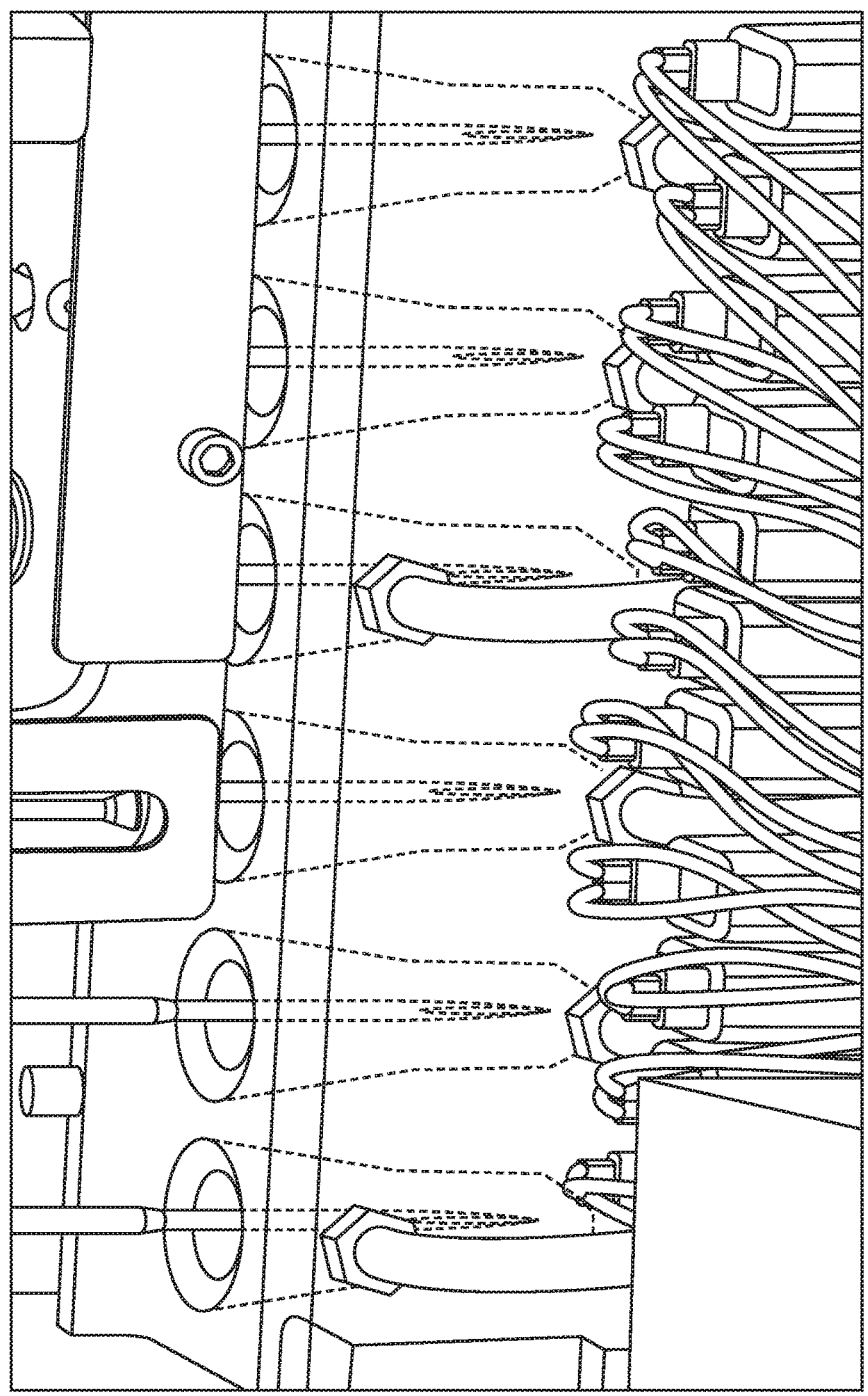
FIG. 8 shows an incubation cup block according to an embodiment of the present disclosure.

The system may include an incubation subsystem that includes an incubation cup block, a paddle mixer, an incubation valve manifold, one or more de-bubblers, reagent pumps, heaters (e.g., for RETC and WBC reagents), bubble detection sensors, and pressure sensors. An incubation cup block may have an arrangement of two blocks, each block having incubation cups, e.g., an RBC cup that will handle RBC, PLT and RETC reactions; a WBC cup; and a Hgb cup. An example incubation cup block having this arrangement is shown in FIG. 8.

Appropriate reagent of fixed volume is added first in each of the cups, followed by sample. The sample (such as whole blood or body fluid) and reagent are mixed in the incubation cups. A known amount of the prepared sample is aspirated from the cup for analysis into the staging line. Each cup is drained and rinsed and the wash fluid is drained after the rising process, to minimize carry over. Each incubation cup may be provided with separate ports for drain, reagent fill, bubble mixing and an overflow port.

Mixing may be carried out via piezoelectric paddles, air bubble mixing, and/or the like. Paddle mixing may be performed during the entire duration of incubation. For bubble mixing, pressurized air (e.g., 5 psi) enters the cup through a bubble injection port. The pressurized air may be routed via an orifice restrictor. In certain aspects, air is injected into the RBC and WBC cups for 100 ms twice during the incubation period. For the Hgb cup, air injection may be for 100 ms and done four times during the incubation period.

Short sample/bubble detection may include monitoring of the first deposition in a waste cup following sample aspiration from the sample tube. An LED and photo-diode may be positioned, e.g., 105 degrees from each other, around the waste cup. As the aspiration dispense probe descends and discards sample into the waste cup, the LED is turned on. If desired blood sample volume is not fully aspirated, there will be air in the trailing edge of the probe. Thus, air bubble will be detected during the first deposition in the waste cup by the photo-diode. The bubble signal may then be flagged as a possible short sample.

Short sample/clot detection is motoring of vacuum in the probe at sample aspiration. A gel-isolated piezo resistive transducer may be used to monitor vacuum during sample aspiration. If any occlusion occurs in the probe, a significant increase of vacuum will be detected by the pressure transducer, and may be flagged as a possible short sample.

An injection subsystem may be adapted to select a sample from an incubation cup, transfer prepared sample into a staging line, provide sheath flow into an optical flow cell, inject samples (e.g., RBC/RETC and WBC samples) into the optical flowcell, transfer Hgb samples to an Hgb flow cell, rinse the sample path and flowcell, and the like. RBC/RETC and WBC samples may be injected into the optical flowcell using positive displacement pumps.

For optical analysis in the flow cell, the system includes an optics subsystem. The optics subsystem may be adapted to take a processed whole blood or body fluid sample, hydro-dynamically focused through a flow cell, pass a laser beam across individual cells in a stream, detect optical scattering and fluorescence of individual blood cells, and output electrical signals that can be used to determine the size and type of cell.

The optics subsystem interrogates the sample to count the cells and generates data that can be used to classify each cell. The flow-cell creates a thin core stream, where individual cells are separated, by forcing the sample into a high velocity sheath flow. A laser beam is passed through the core stream and scattered light is measured, e.g., at 8 locations. The subsystem may include an enclosure assembly that includes beam shaping optics, the flow cell, a forward scatter block, a side scatter block, and a fluorescence block. A beam shaping optics unit may include an internal single-mode polarization-preserving fiber, a collimating lens, a cylindrical horizontal focusing lens, and a cylindrical vertical focusing lens. Laser light from the beam shaping optics passes through a flow cell (e.g., a fused silica flow cell) with a 90° side scatter/fluorescence collection lens. Concentric nozzles may be provided underneath to bring in the hydro-dynamically focused sample stream and the surrounding carrier sheath fluid (e.g., DI water) into the flow channel. Fluid waste may be exhausted out of a top port.

A forward scatter collection/detection block may include a plano-convex spherical lens, an X-mask with a pin hole and a 5-channel ring segmented photo detector enabling IAS0, IAS1, IAS2 and IAS3 (Intermediate Angle Scatters) and ALL (Axial Light Loss) cell-by-cell scatter detection. A 90° side scatter block may include a circular mask, a 45° spectral beam splitter, a polarizing beam splitter, a DSS (spell out) mask, band pass filters (e.g., two 488 nm band pass filters), focusing lenses (e.g., 2 focusing lenses) and photo diodes (e.g., two Avalanche Photo Diodes (APDs)) enabling cell-by-cell PSS and DSS scatter detection. A fluorescence block may include a circular opening mask, a 45° spectral beam splitter, followed by a spatial filter made up of two plano-convex spherical lenses, two FL1 (505-545 nm) band-pass filters, a 125 μm slit and a Photomultiplier Tube (PMT). In certain aspects, the laser is a CLASS III 488 nm solid state laser adapted to deliver up to 20 mW of laser light through a single mode polarization preserving fiber.

The optics subsystem may include external printed circuit boards (PCBs). For example, the optics subsystem may include 2 external PCB's: DDC (Digital Data Capture) and OB1 (Analog Signals). These PCBs process the electrical signals from the optics bench to create a list mode data file. The data contains the magnitude of the 8 sensors readings for each event detected in the flow cell.

Figure 23:
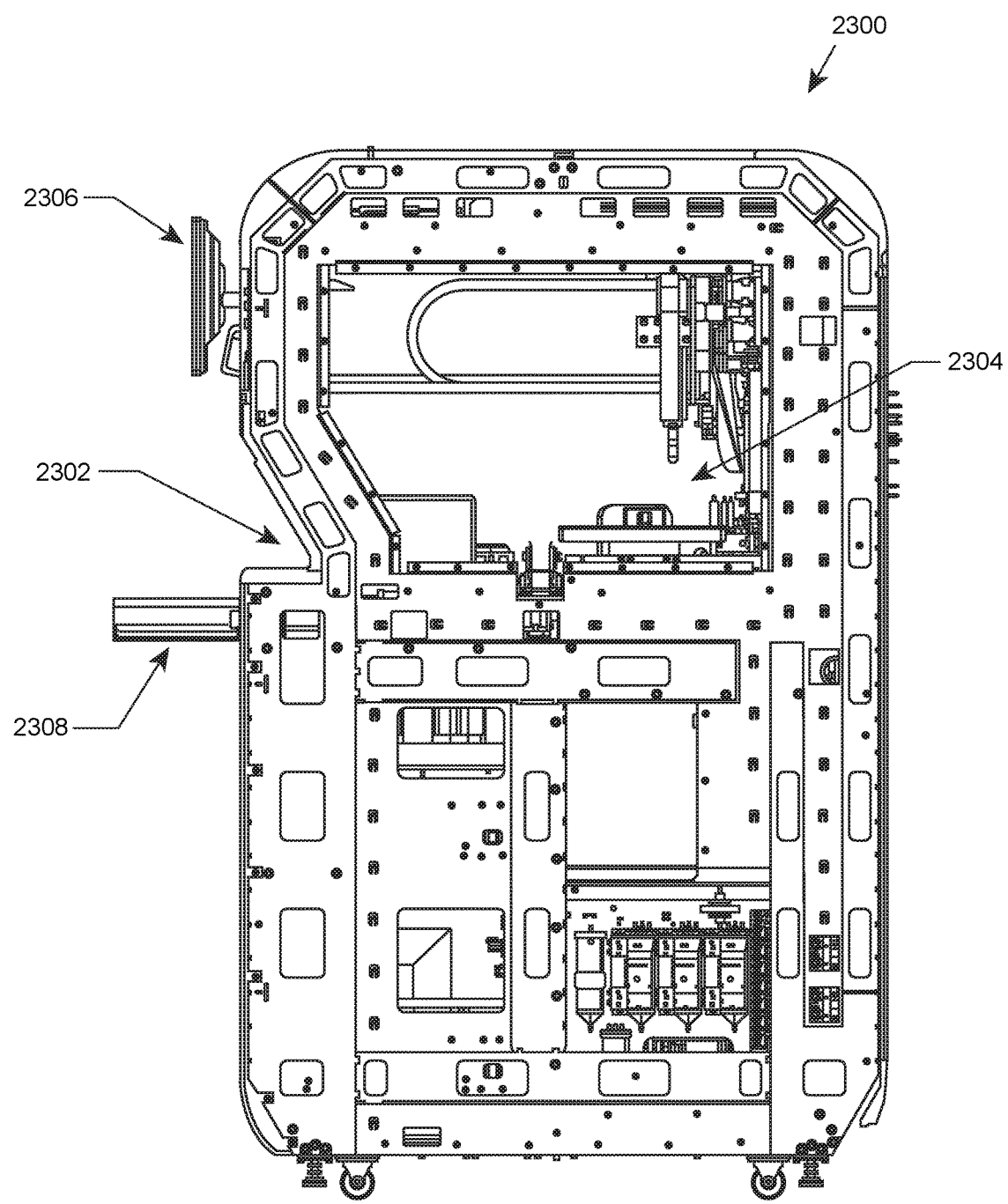
FIG. 23 shows a side view of an automated hematology analysis system according to an embodiment of the present disclosure.

A side view of an automated hematology analysis system according to an embodiment of the present disclosure is illustrated in FIG. 23. Shown in this embodiment is automated hematology analysis system 2300 having, inter alia, front loading area 2302, sample processing and hematology analysis area 2304, local user interface (LUI) 2306, and retractable shelf 2308.

Figure 24:
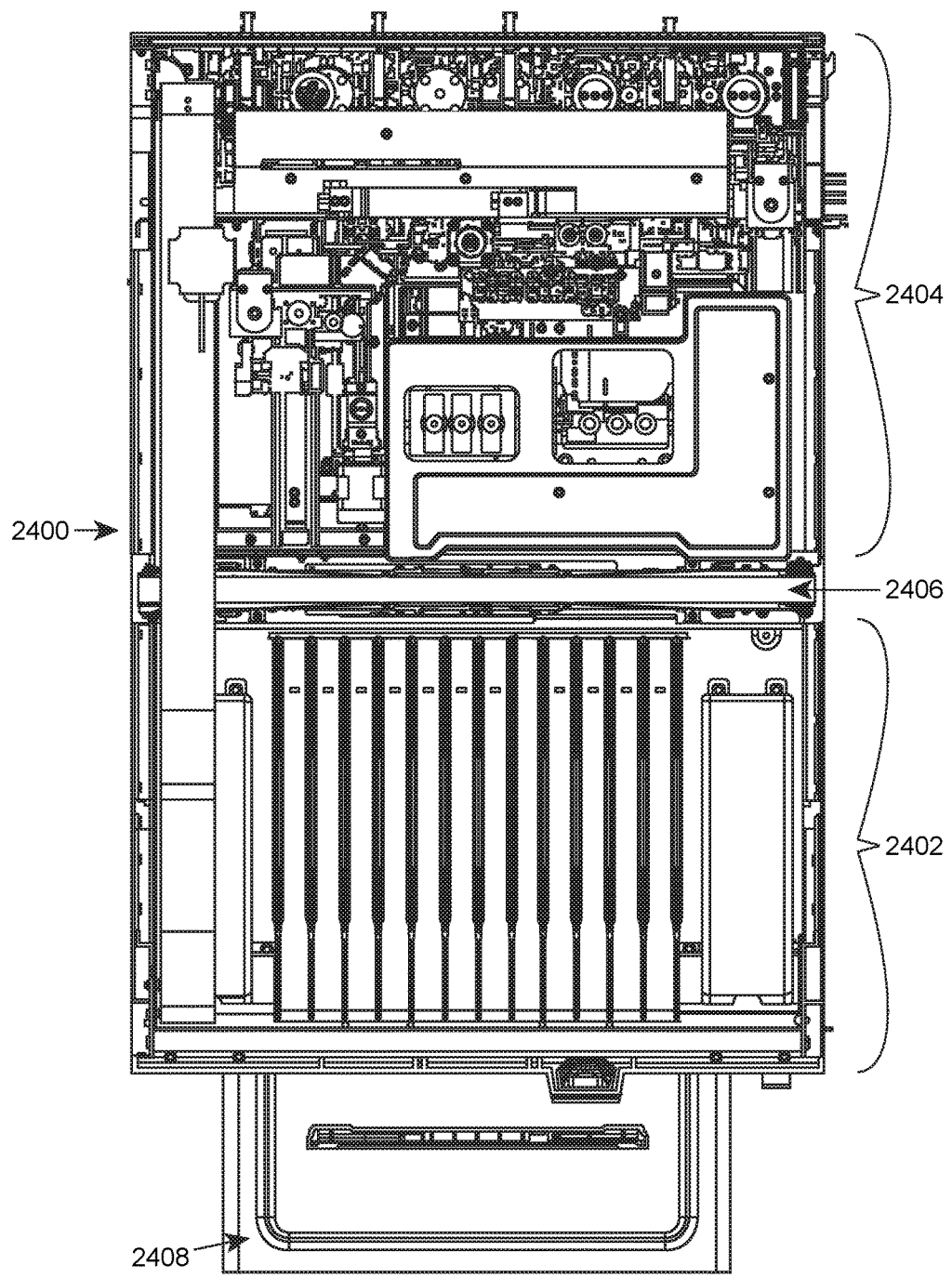
FIG. 24 shows a top view of a level of an automated hematology analysis system according to an embodiment of the present disclosure.

A top view of an automated hematology analysis system according to an embodiment of the present disclosure is illustrated in FIG. 24. As shown, the automated hematology analysis system includes, inter alia, front loading area 2402, sample processing and hematology analysis area 2404, internal conveyor system 2406, and retractable shelf 2408.

User access for cleaning and maintenance may be provided in the front of the analysis system. A door on the front, above the loading area may be provided for access to sample tube racks for cleaning, removing racks, recovering tubes, and/or the like.

Electronics may be distributed throughout the instrument to operate the hardware subsystems. The distributed electronics utilize a common architecture of peripheral boards (e.g., operating with 24 VDC power) and a bus interface (e.g., a CAN bus interface) for communication. Within a subsystem, any sensors, valves, motors, pumps, and/or the like may be powered, monitored and controlled from the peripheral board. This approach enables testable, stand-alone subsystems to be created and simplifies the instrument wire harnesses.

Power may be distributed from a Power Distribution System (PDS) (e.g., through 5 amp channels) to the subsystems. A computer subsystem utilizes AC power at the facility voltage and frequency. Power conversion to the required computer voltages is accomplished with a separate power supply. An Uninterruptable Power Supply (UPS) is provided for energy storage, enabling the system to after a facility power outage (e.g., for 5 minutes or more). The UPS provides the capability to complete analysis of samples in process, store test results, and configure the instrument for an orderly shutdown.

Heat generated by the electrical subsystems and moisture may be removed by ventilating the chassis with cooling fans. Such ventilation fans may be adapted to maintain the temperature inside the chassis at a maximum of 5° C. above laboratory ambient temperature conditions (e.g., from 15 to 33° C.). A thermal subsystem may be adapted to maintain the temperature within the reagent drawer at a maximum of 3° C. above ambient to maximize reagent open bottle life.

A fluidics subsystem controls the liquids and pneumatics in the analysis system, including dispensing reagents, sample aspiration, sample incubation, flow cell operation, washing between samples, collecting waste and periodic cleaning. Water and diluent are pumped throughout the instrument using pneumatic pressure and vacuum. The reagents, sample aspiration/dispense, and injection into the flowcell require fluid metering to ensure system accuracy. Piston pumps (e.g., high precision IDEX piston pumps) are used to control the fluid flow for these applications. Level sensors and pressure sensors provide feedback to the fluidics controls to maintain proper function.

Figure 58:
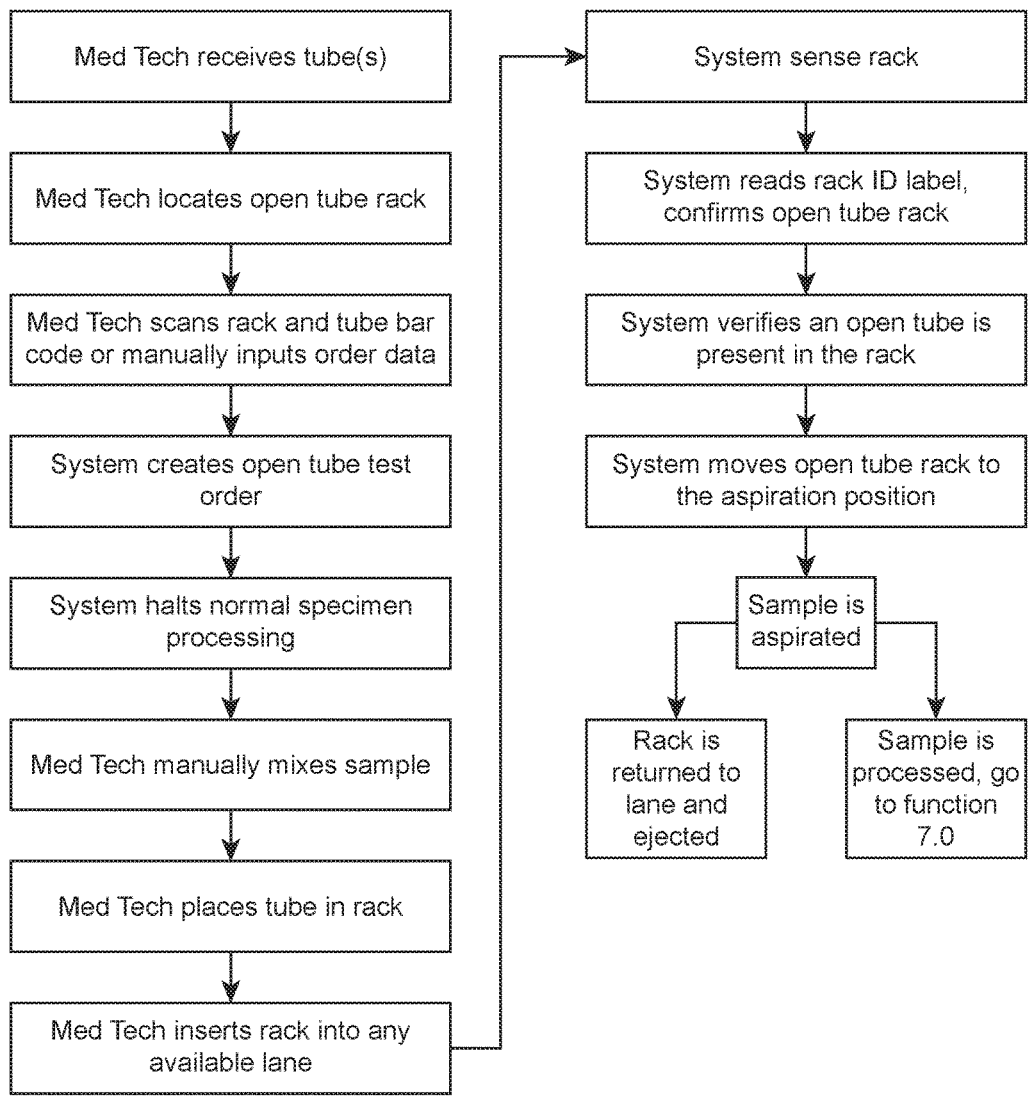
FIG. 58 shows a flow diagram of an open tube workflow which may be implemented according to one embodiment.

Blood and/or body fluid sample tubes are introduced to the system in sample tube racks and through open tube racks which hold a single tube. Tubes are generally handled with an automated tube handling subsystem, which utilizes robotics to grab a tube, read a bar code present on the tube, and move the tube through the processing steps in the system. The automated tube handling subsystem processes closed tubes with a limited range of diameters, heights and cap configurations. A wider range of tube configurations can be used in the open tube mode. In open tube mode, the tube is resuspended manually, the cap is removed and the tube is placed in a special open tube rack. The instrument recognizes the open tube rack and moves it to a special location for aspiration. A flow diagram providing an open tube workflow which may be implemented according to embodiments of the present disclosure is shown in FIG. 58.

Reagents are stored in bottles (e.g., 1 liter bottles) in a drawer on the front of the analysis system. Two or more bottles of the Hgb, WBC and Diluent may be provided to allow an empty bottle to be changed while the system continues operation. The RETIC reagent may be a single bottle when it has a limited life at ambient temperature and is used less frequently. Diluent may be stored as a concentrate (e.g., a 20× concentrate) and reconstituted on the instrument using ultrapure water from an external water system (e.g., an ELGA water system) or using boxed water stored internally.

Figure 14:
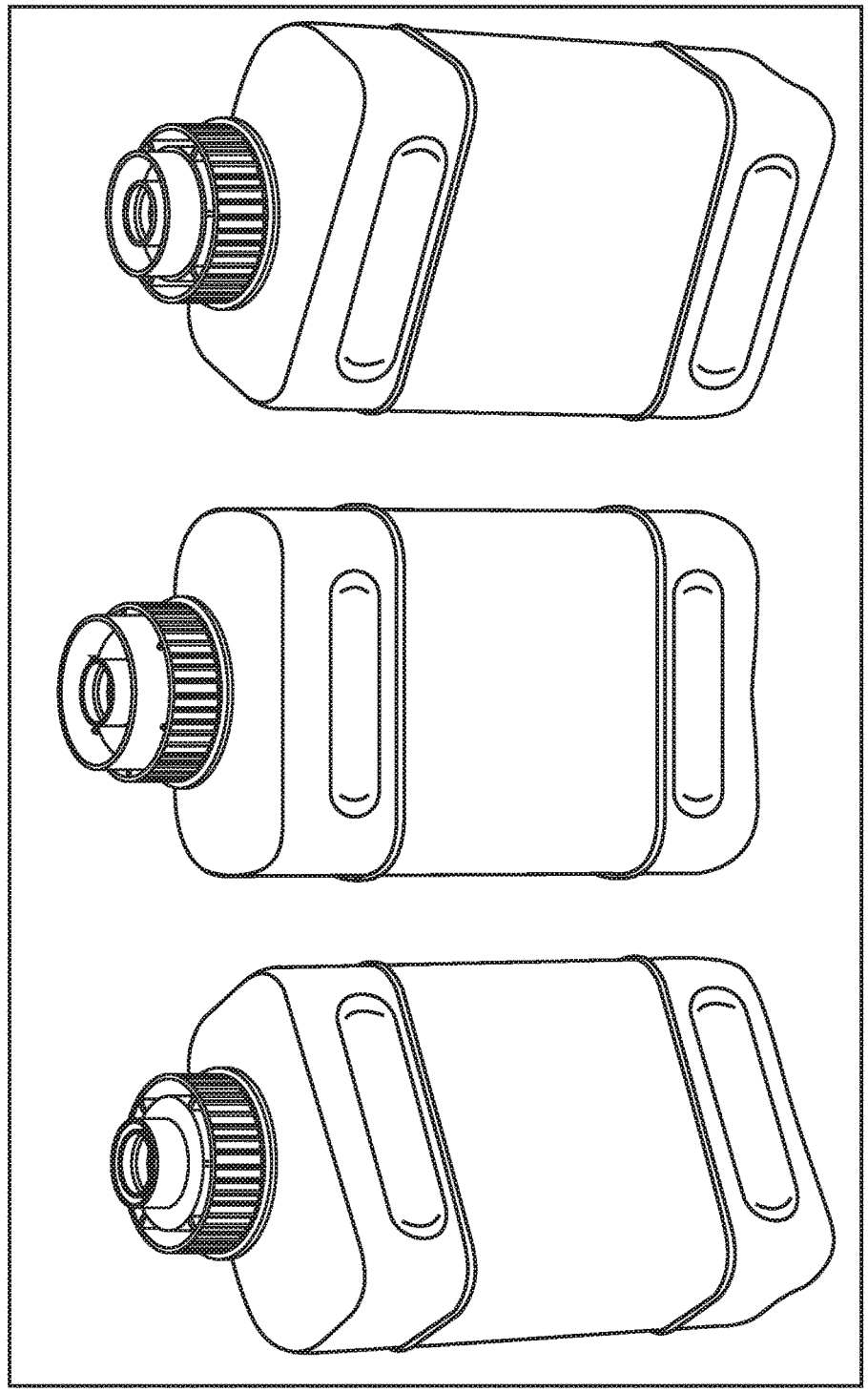
FIG. 14 shows reagent bottles of an automated hematology analysis system according to an embodiment of the present disclosure.
Figure 15:
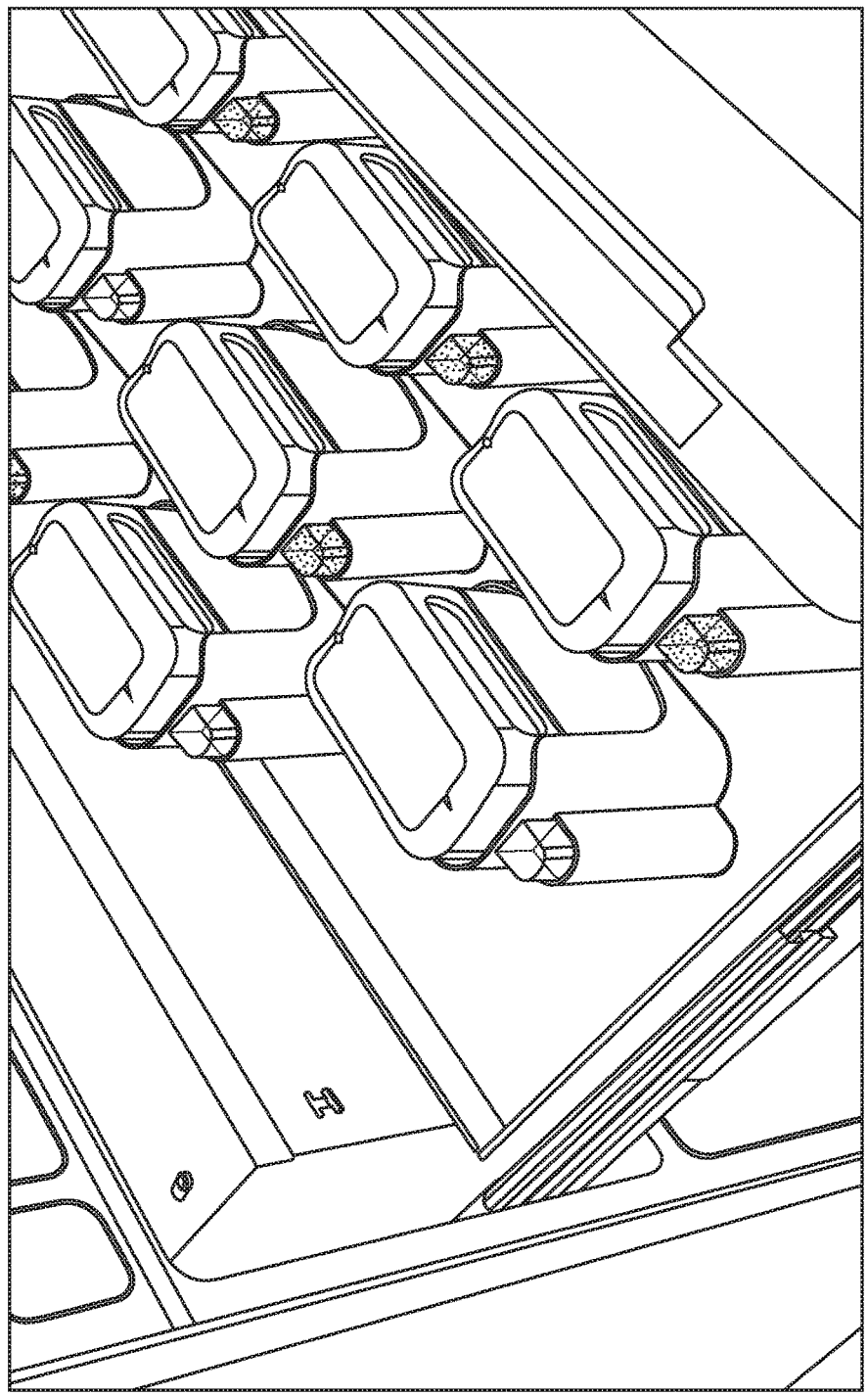
FIG. 15 shows reagent bottles present in a drawer of an automated hematology analysis system according to an embodiment of the present disclosure.

According to certain embodiments, one or more reagents of the system are provided in bottles that include a keyed cap. The keyed cap may include a keying element with at least one annular ring protrusion. The one or more annular rings provide a specific configuration of rings and spaces defined by the rings. The specific configuration created by the one or more annular rings functions as a "key" that requires a corresponding configuration on a receiving device (e.g., an automated hematology analysis system, a slide maker stainer system, etc.) to enable the keying element on the cap to be received. For example, the corresponding keying element on the receiving device will be shaped and sized to properly align and receive the one or more annular rings of the keyed cap. For instance, the keying element on the receiving device may include one or more annular grooves or wells that are positioned appropriately to align with the one or more annular rings on the keyed cap. Furthermore, the keyed element on the receiving device may include one or more annular rings that are positioned appropriately to align with one more spaces on the keying element on the keyed cap that are defined by the one or more annular rings on the keyed cap. Further details regarding keyed caps useful for reagent bottles of the systems of the present disclosure may be found in U.S. Patent Application Publication No. 2014/0263316. Example reagent bottles having keyed caps are shown in FIG. 14. A reagent drawer of an automated hematology analysis system in which inverted reagent bottles having keyed caps are aligned and inserted into corresponding receiving devices is shown in FIG. 15.

Hematology analysis methods that may be performed using the systems of the present disclosure are also provided. In certain aspects, provided is a method that includes positioning a sample tube rack including one or more blood or body fluid sample tubes in a sample loading area of an automated hematology analysis system, transporting (using a robotic gripper) a blood or body fluid sample tube from the sample loading area to a sample mixing device within the automated hematology analysis system, and mixing the blood sample. The method further includes transporting the mixed blood sample, using the robotic gripper, from the blood sample mixing device to a sample aspiration device within the automated hematology analysis system, and aspirating a portion of the sample using the sample aspiration device. The method further includes diluting the portion of the sample by dispensing the portion of the sample into a diluent cup present in the automated hematology analysis system. The method further includes flowing the diluted sample through a flow cell present in the automated hematology analysis system, and optically analyzing the sample in the flow cell. The method may include reading a bar code on the sample tube as the robotic gripper spins the sample tube. The reading may include capturing an image (e.g., a 360 degree image) of the bar code as the robotic gripper spins the sample tube. In certain aspects, the method further includes conveying the blood or body fluid sample tube in a sample tube rack from the automated hematology analysis system to a slide preparation system (e.g., a slide maker stainer of the present disclosure as described elsewhere herein). According to certain embodiments, the automated hematology analysis system and the slide preparation system include first and second internal sample tube rack conveyor systems, respectively, operably coupled to one another, and the conveying is performed by the first and second internal sample tube rack conveyor systems. The method may include tracking the sample tube rack during the conveying, e.g., using a tracking approach described elsewhere herein, which may employ optical emitter/detector pairs disposed along the internal conveyor systems, apertures adapted to permit optical communication between an optical emitter/detector pair when the container rack is positioned between the optical emitter/detector pair, etc. The method may further include preparing a slide including a blood or body fluid smear in the slide preparation system. The slide preparation system may be a slide preparation and cell morphology imaging system. For example, the method may include preparing slides in an upper level of the system and performing digital cell morphology imaging in a lower level of the system. In certain aspects, slides prepared on the upper level are transported to the lower level using an elevator assembly. During transport using the elevator assembly, the slides may be rotated from a vertical orientation to a horizontal orientation. According to certain embodiments, the method includes imaging the morphology of cells present in the blood or body fluid smear using a cell morphology imaging system of the automated slide preparation and cell morphology imaging system.

On-Board Quality Control Material Storage

Hematology analyzers typically utilize blood-like control materials ("QC materials" or "controls") for daily verification of the calibration and operation of the instruments. These controls may be stored in vacutainer-type vials and are refrigerated in a refrigerator separate from the hematology analyzer. The normal procedure for using controls is to remove the tubes from the refrigerator and let them equilibrate to room temperature naturally. The operator then typically mixes the tubes by inverting them by hand for some predetermined number of inversions to ensure the material is completely mixed. Since the cells in the material may be fragile, the mixing action cannot be aggressive. In the case of controls, the material may be much more viscous than normal blood (e.g., high level control) and therefore may require more inversions than normal blood. The time required for the controls to warm to room temperature, plus the extra inversions required to thoroughly mix them, prevent controls from being processed as quickly and efficiently as normal blood specimens.

According to certain embodiments, a system of the present disclosure includes an on-board device for storage of one or more quality control ("QC") materials.

In certain aspects, provided is an automated hematology analysis system that includes a quality control material storage device. The device may be a refrigerated QC material storage device. The QC material storage device may be adapted to resuspend the QC material. For example, the device may include an inversion mixer that inverts a tube that includes QC material repeatedly for a period of time for sufficient resuspension of the quality control material, or periodically to maintain the QC material in a resuspended state.

The automated hematology analysis system that includes the quality control material storage device may include a robotic handling system adapted to receive a container including quality control material (e.g., present at a loading area of the system) and deliver the quality control material to the quality control material storage device. The robotic handling system may include a barcode reader adapted to read a barcode on the container that includes the quality control material.

According to certain embodiments, the automated hematology analysis system that includes the QC material storage device includes a memory including a QC testing schedule executed by a computing device that causes the system to automatically retrieve a container including QC material from the QC material storage device, perform a QC measurement using the QC material, and return the container including the QC material to the QC material storage device. The memory may further include instructions that cause the system to periodically inversion mix the QC material to maintain the QC material in a suspended state. If the QC material is not maintained in a suspended state, the memory may include instructions that cause the system to resuspend the QC material present in the container (e.g., by inversion mixing) prior to performing the QC measurement. An inversion mixer may be part of, or separate from, the QC material storage device. For example, inversion mixing may be carried out using an inversion mixer that is also used to resuspend samples (e.g., blood or body fluid samples) to be analyzed by the automated hematology analysis system.

Controls have traditionally been equilibrated to room temperature prior to use, primarily because warming to room temperature allows the more viscous controls to thin somewhat to improve mixing. According to aspects of the present disclosure, a refrigerated on-board quality control (QC) material storage device periodically inversion mixes the QC material in the refrigerated state, preventing packing of QC particles (e.g., cells) by gravity, obviating the need to warm the QC material prior to running a QC assay in the system.

Methods associated with the QC material storage device are also provided. In certain aspects, provided by the present disclosure is an automated method of performing a quality control assay in an automated hematology analysis system. The methods may include transporting, using a robotic gripper, a QC material container from an on-board QC material storage device to an on-board mixing device, and mixing the QC material present in the QC material container. The methods may further include transporting, using the robotic gripper, the QC material container from the mixing device to an on-board aspiration device, and aspirating QC material from the QC material container and dispensing the QC material into a diluent to produce a diluted QC material sample. The methods may further include performing a QC assay on the diluted QC material sample in the automated hematology analysis system.

Figure 11:
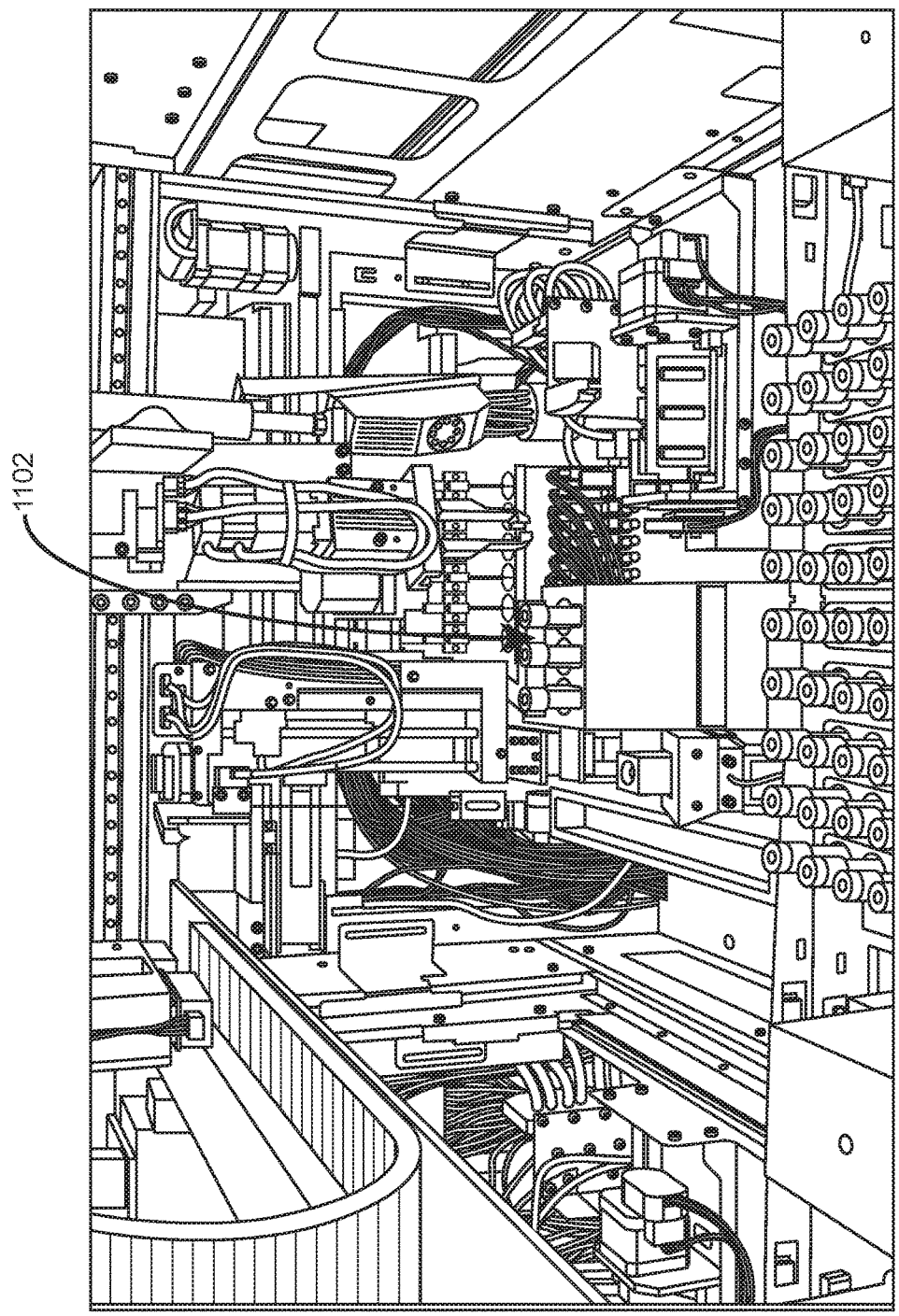
FIG. 11 shows an internal view of an automated hematology analysis system that includes an on-board quality control material storage device according to one embodiment.

A quality control material storage device according to one embodiment is shown in FIG. 11. Shown is an internal view of an automated hematology analysis system having onboard QC material storage device 1102. In this example, device 1102 is refrigerated and has the capacity to store three QC tubes as shown.

Internal Container Conveyor Systems

As summarized above, aspects of the present disclosure include internal container conveyor systems. According to one embodiment, provided is an analysis system that includes an internal container conveyor system adapted to transport containers from a first location within the analysis system to a second location within the analysis system. By "internal container conveyor system" is meant a conveyor system suitable for transporting containers (e.g., sample tubes, reagent tubes, quality control material tubes, etc.) and/or racks including such tubes within a system (e.g., an automated hematology analysis system, a slide maker stainer system, etc.), where the conveyor system is contained wholly within the system in which it is situated (e.g., does not extend beyond the chassis of the system in which it is situated). In the context of an integrated analysis system that includes two or more modules each having an internal conveyor system, the integrated analysis system may be adapted to transport containers (e.g., present in racks) between modules via the internal conveyor systems of the modules.

Figure 9:
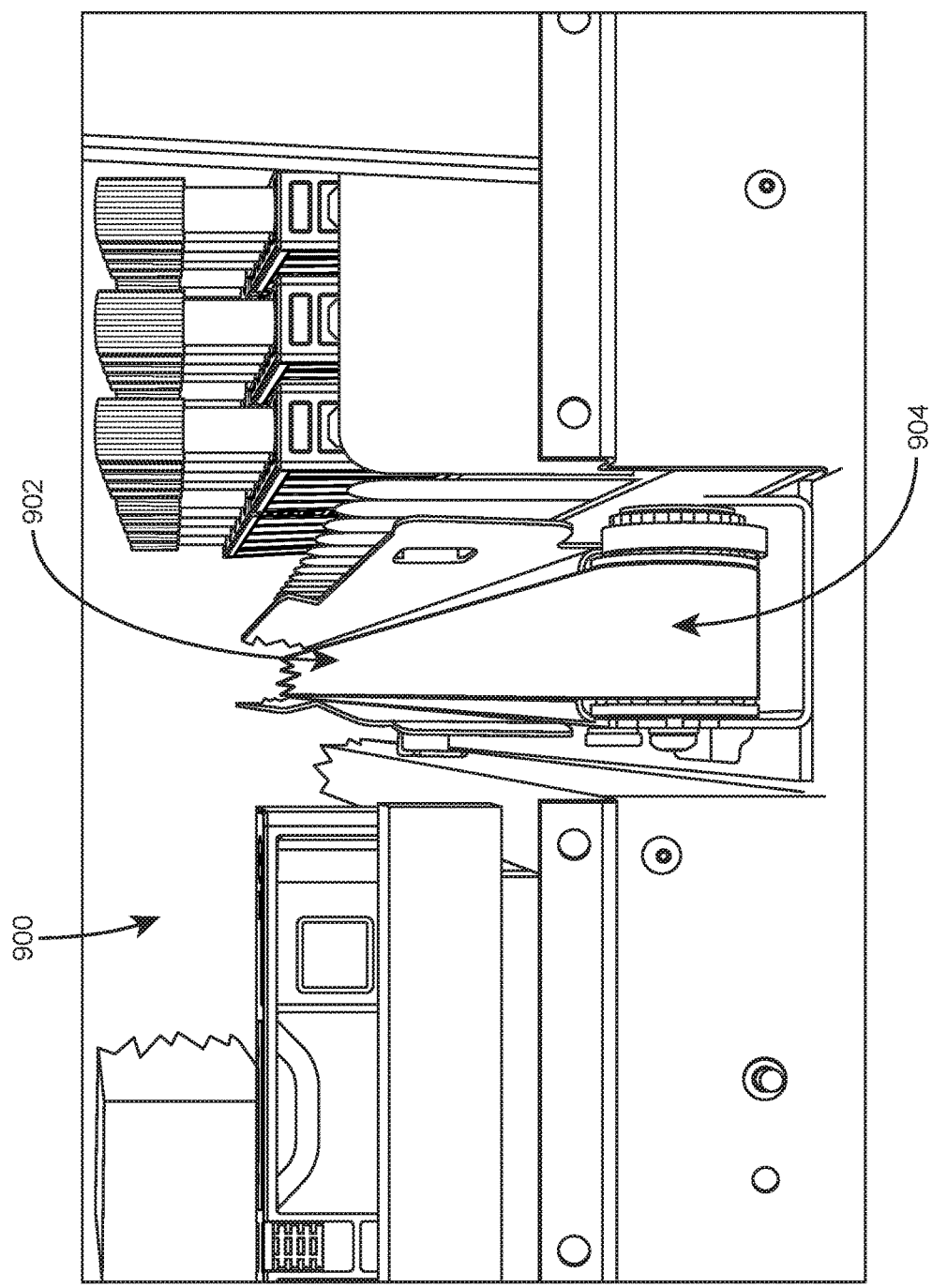
FIG. 9 shows an internal conveyor system according to an embodiment of the present disclosure.

According to certain embodiments, the internal container conveyor system includes a conveyor belt. FIG. 9 shows a portion of a system 900 that includes an example internal container conveyor system 902 that includes conveyor belt 904. In certain aspects, a conveyor belt of an internal container conveyor system is a toothed belt.

Figure 10:
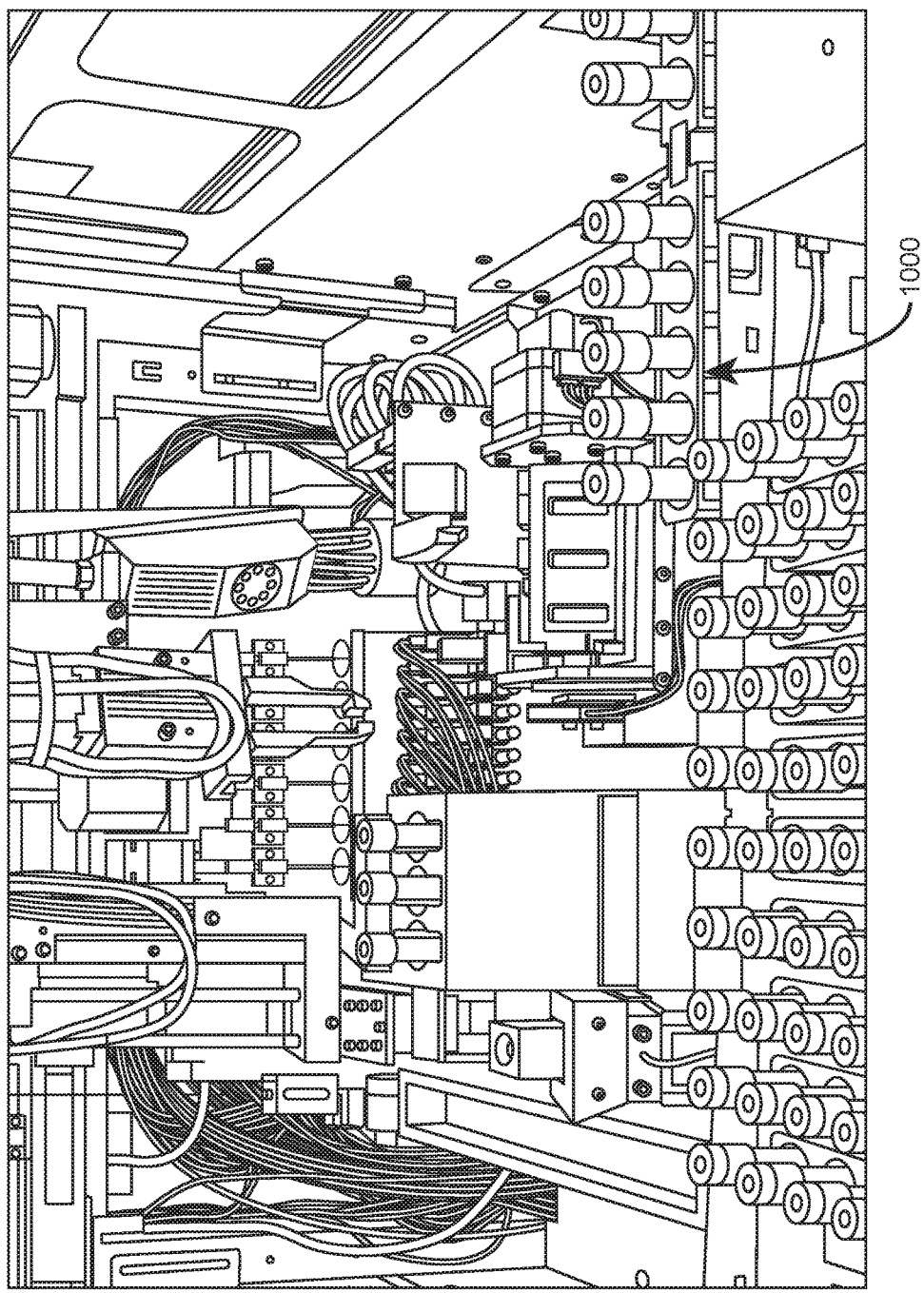
FIG. 10 shows a sample tube rack exiting a first module of an integrated analysis system via aligned internal conveyor systems of the first module and an adjacent second module according to one embodiment.

In certain aspects, the internal container conveyor system is adapted to transport container racks (e.g., sample tube racks, reagent tube racks, quality control material tube racks, slide racks, and the like) within the system, and optionally between modules of an integrated analysis system. Shown in FIG. 10 by way of example is an internal view of an automated hematology analysis system in which closed sample tube rack 1000 is exiting the system to the right via conveyor belts of aligned internal container conveyor systems of adjacent modules within an integrated analysis system.

Figure 59:
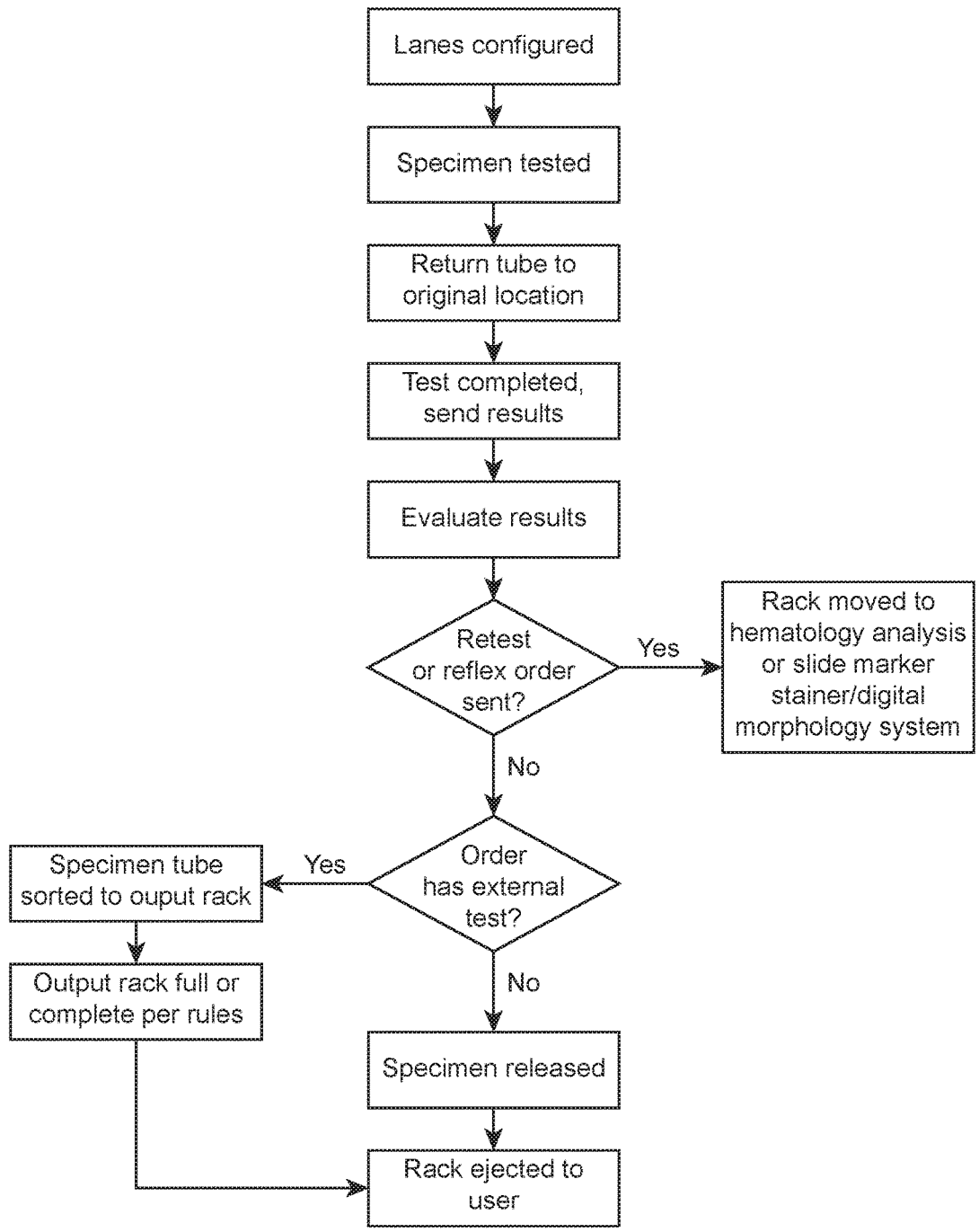
FIG. 59 shows a flow diagram of an example workflow in which transport of a sample via internal conveyor systems from a first module to a second module and downstream further analysis is based on a hematology analysis result.

A rack that includes one or more tubes (e.g., closed or open mode sample tubes) present in a first module of an integrated system may be transported to a second module of the integrated system, e.g., to balance the workload between modules. Moreover, if, e.g., an abnormal result is obtained from a hematology analysis performed in automated hematology analysis system module, an integrated system that includes a slide maker stainer module may be adapted to transport a rack including the sample tube containing the sample associated with the abnormal result to the slide maker stainer module for the automated preparation and staining of a blood or body fluid smear of the sample (and optionally, automated digital cell morphology imaging analysis). A flow diagram showing an example workflow in which transport of a sample via internal conveyor systems from a first module to a second module and downstream further analysis is based on a hematology analysis result is shown in FIG. 59.

Figure 29:
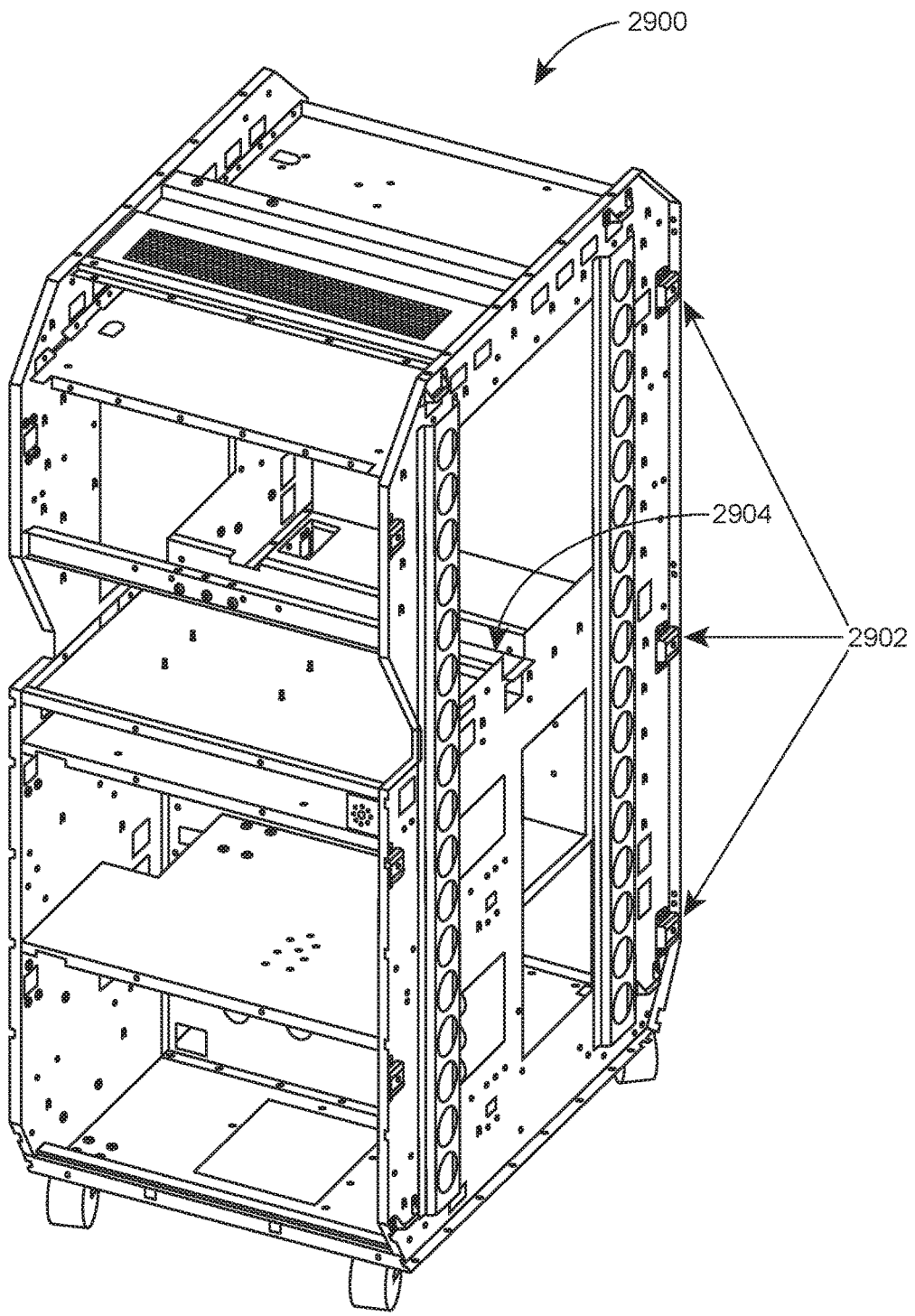
FIG. 29 shows a chassis of a system, in which the chassis includes attachment points and alignment features for aligning internal conveyor systems of adjacent modules of an integrated analysis system, according to an embodiment of the present disclosure.
Figure 30:
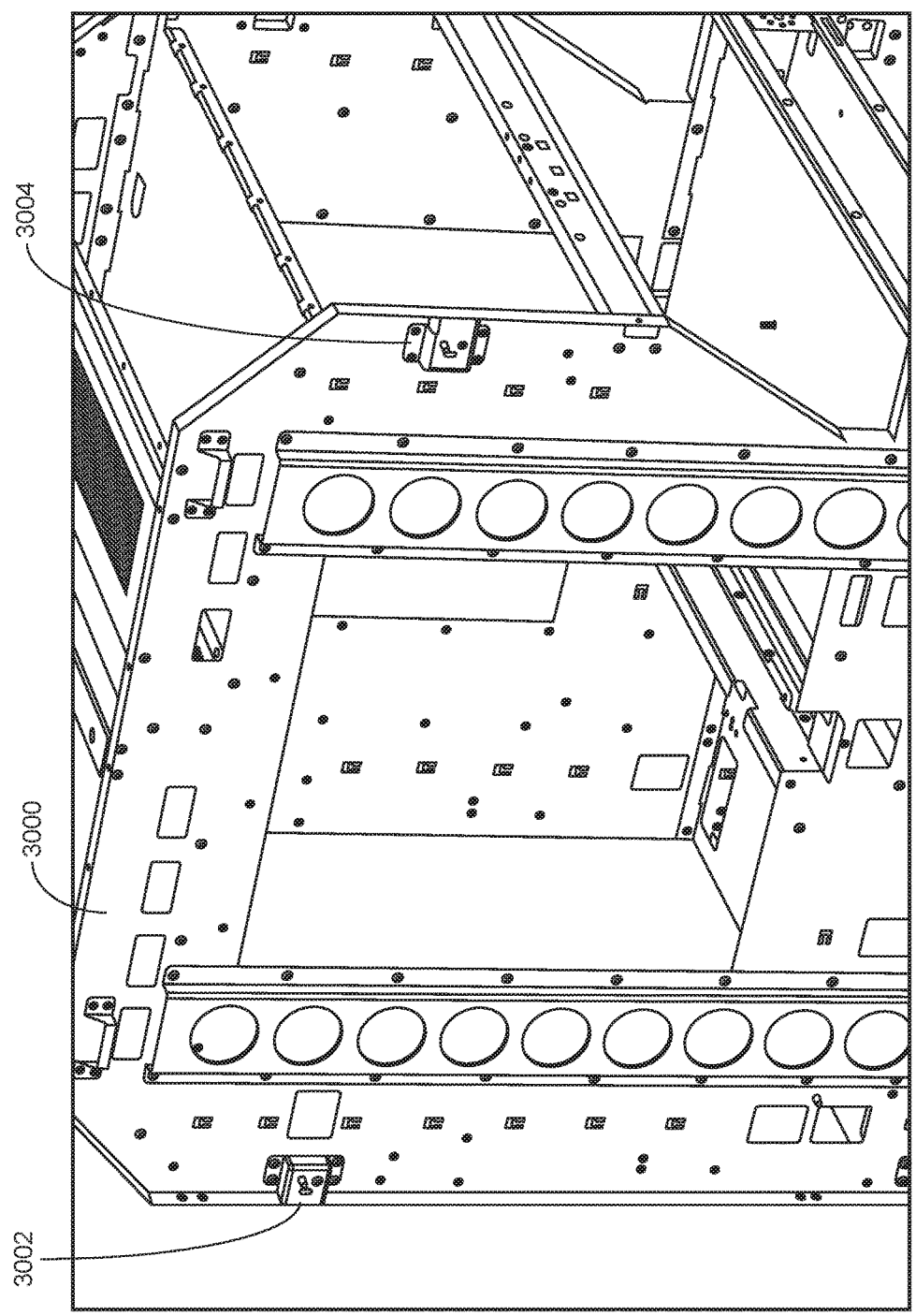
FIG. 30 shows a chassis of a system, in which the chassis includes attachment points and alignment features for aligning internal conveyor systems of adjacent modules of an integrated analysis system, according to an embodiment of the present disclosure.

Accordingly, in certain aspects, the present disclosure provides integrated analysis systems that include: a first module including a sample analysis component (e.g., a hematology analysis component) and a first internal container conveyor system; and a second module including a second internal container conveyor system. The first and second modules are positioned adjacent each other such that the first and second internal container conveyor systems are aligned and adapted to transport containers and/or container racks from the first module to the second module. According to certain embodiments, the first and second modules are connected to each other via a mechanical interface. In certain aspects, a mechanical interface includes attachment points, alignment features, or both. According to certain embodiments, both attachment points and alignment features are provided, where the attachment points are screws and the alignment features are tabs and slots. A chassis of an example system is shown in FIG. 29. As shown, chassis 2900 includes attachment points and alignment features (e.g., attachment points and alignment features 2902) to provide alignment of internal conveyor system 2904 with an internal conveyor system of an adjacent module. A closer view of an example system chassis is illustrated in FIG. 30, in which chassis 3000 includes attachment point and alignment feature 3002 and attachment point and alignment feature 3004, which points and features facilitate alignment of internal conveyor systems of adjacent modules of an integrated analysis system.

According to certain embodiments, the integrated analysis system further includes a third module including a third internal container conveyor system. The third module is positioned adjacent the second module such that the internal container conveyor systems of the second and third modules are aligned and adapted to transport containers from the second module to the third module. The internal container conveyor systems of the second and third modules may further be adapted to transport containers from the third module to the second module.

Methods involving internal container conveyor systems are also provided. For example, in certain aspects, provided is a method that includes analyzing a sample in a first module that includes a sample analysis component and a first internal container conveyor system, conveying the sample in a sample container from the first module to a second module that includes a second internal container conveyor system, where the first and second internal container conveyor systems are aligned and adapted to transport containers from the first module to the second module. According to certain embodiments, analyzing a sample in the first module includes performing an analysis selected from a red blood cell (RBC) analysis; a platelet (PLT) analysis; a hemoglobin (HGB) analysis; a white blood cell (WBC) analysis; a mean corpuscular volume (MCV) analysis; a mean platelet volume (MPV) analysis; a white blood cell differential (WBC diff) analysis; a nucleated red blood cell (NRBC) analysis; a reticulocyte (RETC) analysis; a coagulation analysis; a nucleic acid analysis; an immunoassay; and any combination thereof. Conveying the sample to the second module is based on the analysis of the sample in the first module. In certain aspects, a sample preparation process, a type of sample analysis, or both, in the second module is based on the analysis of the sample in the first sample analysis module. The sample may be present in a sample container (e.g., a sample tube), and conveying the sample may include conveying the sample container in a container rack. The conveying may include tracking the container rack during the conveying, e.g., using any of the tracking approaches of the present disclosure described elsewhere herein (such as the use of optical emitter/detector pairs and sensing windows in the racks, etc.).

In certain aspects, an integrated analysis system of the present disclosure includes a tracking system for determining the presence and/or location of a container rack within the first and second internal container conveyor systems. The tracking system may include one or more optical emitters and one or more optical detectors for detecting the position of the container rack. In one example, racks within the system include a window that permits optical communication between an emitter/detector pair when the rack is between the emitter/detector pair and at a particular location within the conveyor system, and blocks optical communication between an emitter/detector pair when the rack is not at that particular location within the conveyor system (because the window is not aligned with the emitter/detector pair). That is, the presence or absence of optical communication between an emitter/detector pair, or combinations of such pairs, may be utilized to determine the location of a container rack within a single or integrated system.

Figure 31:
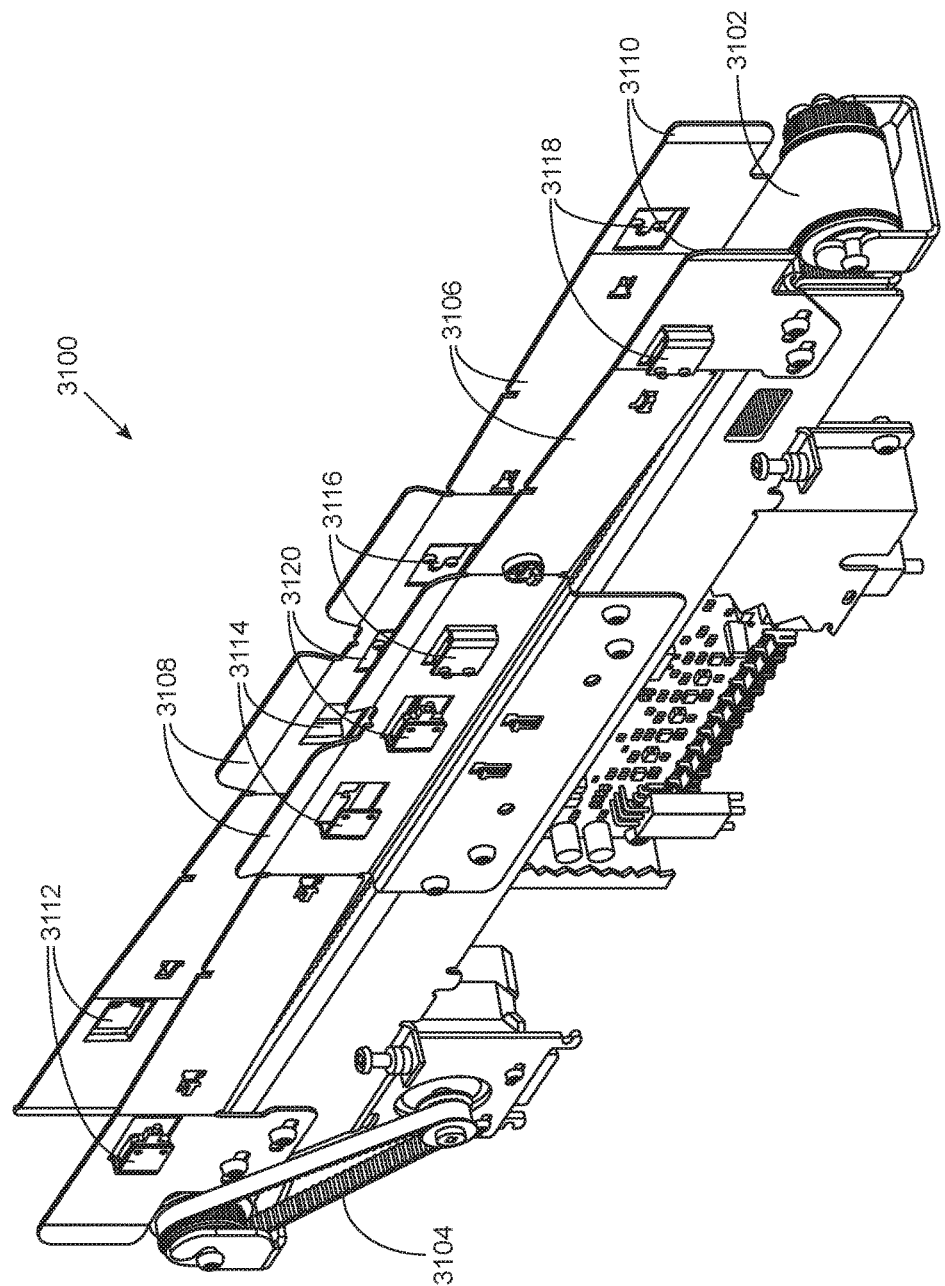
FIG. 31 shows an internal container conveyor system according to one embodiment.

An internal container conveyor system according to one embodiment is shown in FIG. 31. In this example, internal conveyor system 3100 includes conveyor belt 3102, drive belt 3104 with associated motor and pulley assembly.

System 3100 includes guide rails 3106. The guide rails may include lead-in bends (e.g., lead-in bends 3106) to guide the tube rack into the conveyor upon loading of the rack into the conveyor system by the robotic gripper. Also included in this example are lead-in bends 3110 at the ends of guide rails 3106 for tolerance of misalignment between the internal conveyor systems of adjacent modules.

Also included in this example are rack position sensors and rack pick up location sensors. Rack position sensor pairs 3112, 3114, 3116 and 3118 are optical emitter/detector pairs in which an optical emitter is located on a guide rail and the detector of the pair is located at the corresponding location on the opposite guide rail. As a rack travels along the conveyor system, the presence or absence of optical communication between the rack position sensor pairs indicates the position of the rack within the internal conveyor system. System 3100 further includes rack pick up location sensor pair 3120.

Figure 32:
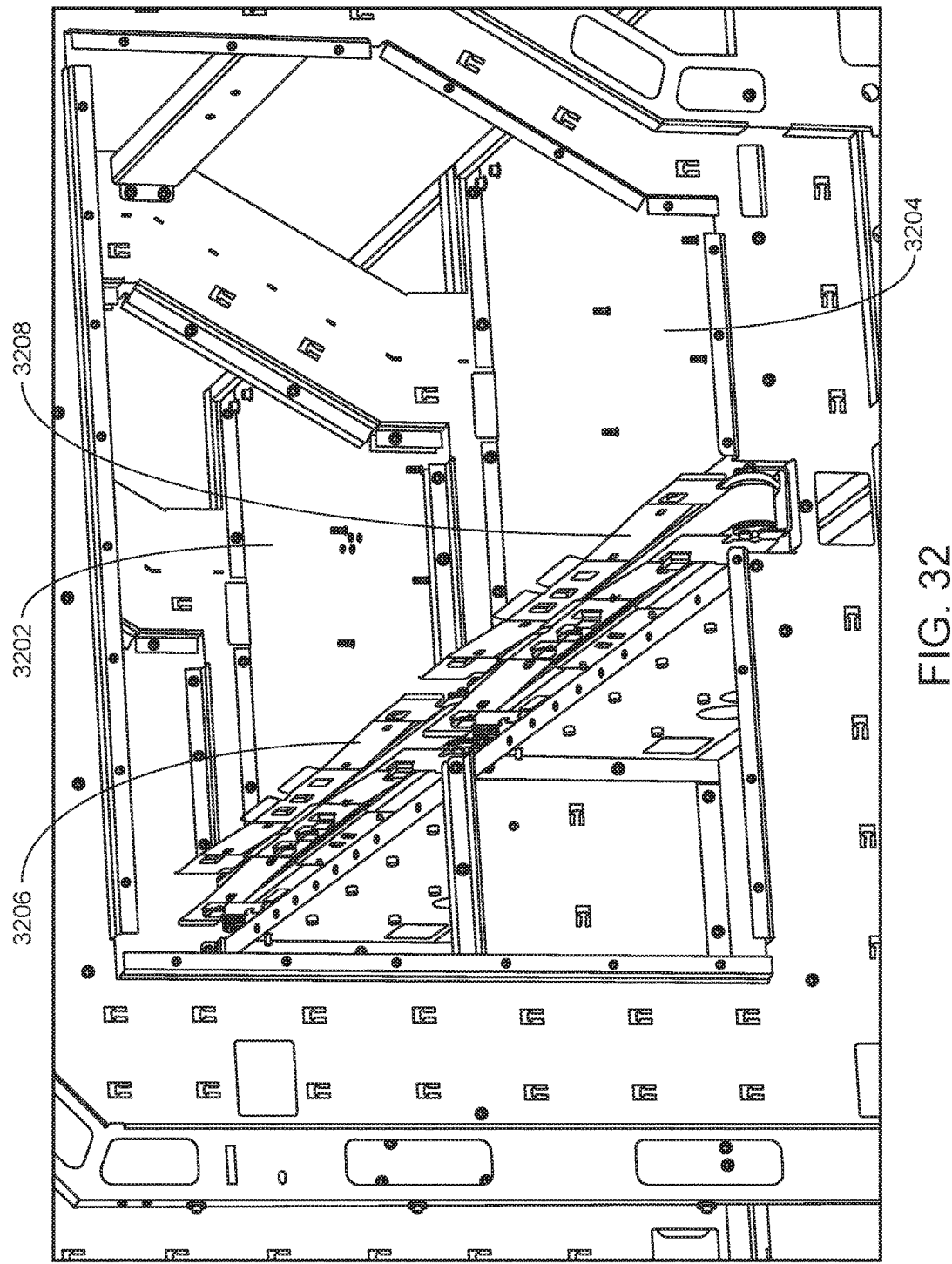
FIG. 32 shows aligned internal conveyor systems of adjacent modules according to one embodiment.

Aligned internal conveyor systems of adjacent modules according to one embodiment are shown in FIG. 32. Shown is the chassis of module 3202 and the chassis of adjacent module 3204, which modules include aligned internal container conveyor systems 3206 and 3208, respectively, for transport of container racks between the modules. In certain aspects, both modules 3202 and 3204 are automated hematology analysis systems. In other aspects, module 3202 is an automated hematology analysis system and module 3204 is a slide maker stainer (optionally with digital morphology imaging capability).

Figure 33:
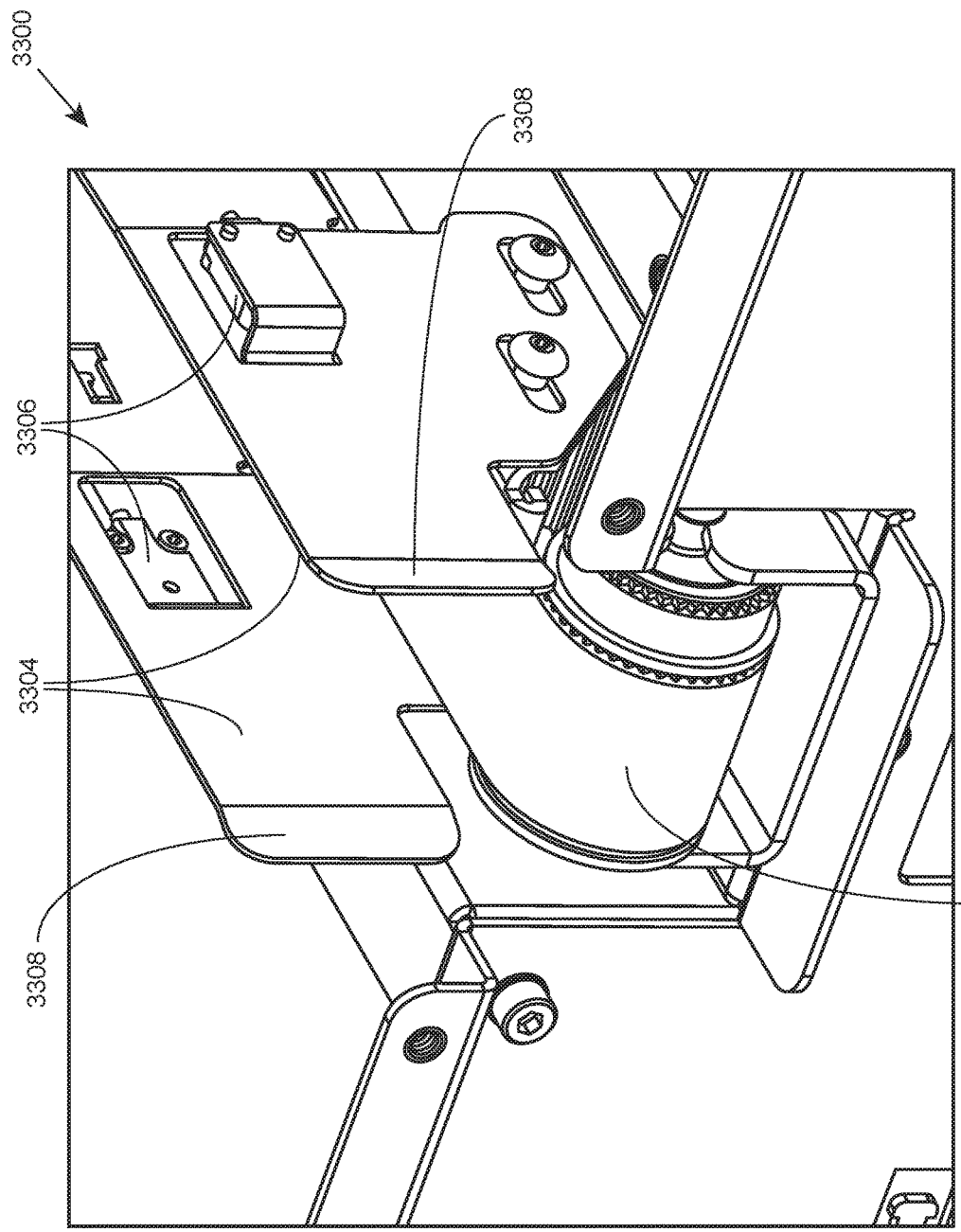
FIG. 33 shows the end of an internal conveyor system according to one embodiment.

An end of an internal conveyor system according to one embodiment is illustrated in FIG. 33. Internal conveyor system 3300 has conveyor belt 3302, guide rails 3304, rack position sensor pairs (e.g., rack position sensor pair 3306), and lead-in bends 3308 at the ends of guide rails 3304 for tolerance of misalignment with an internal conveyor systems of an adjacent module.

Figure 34:
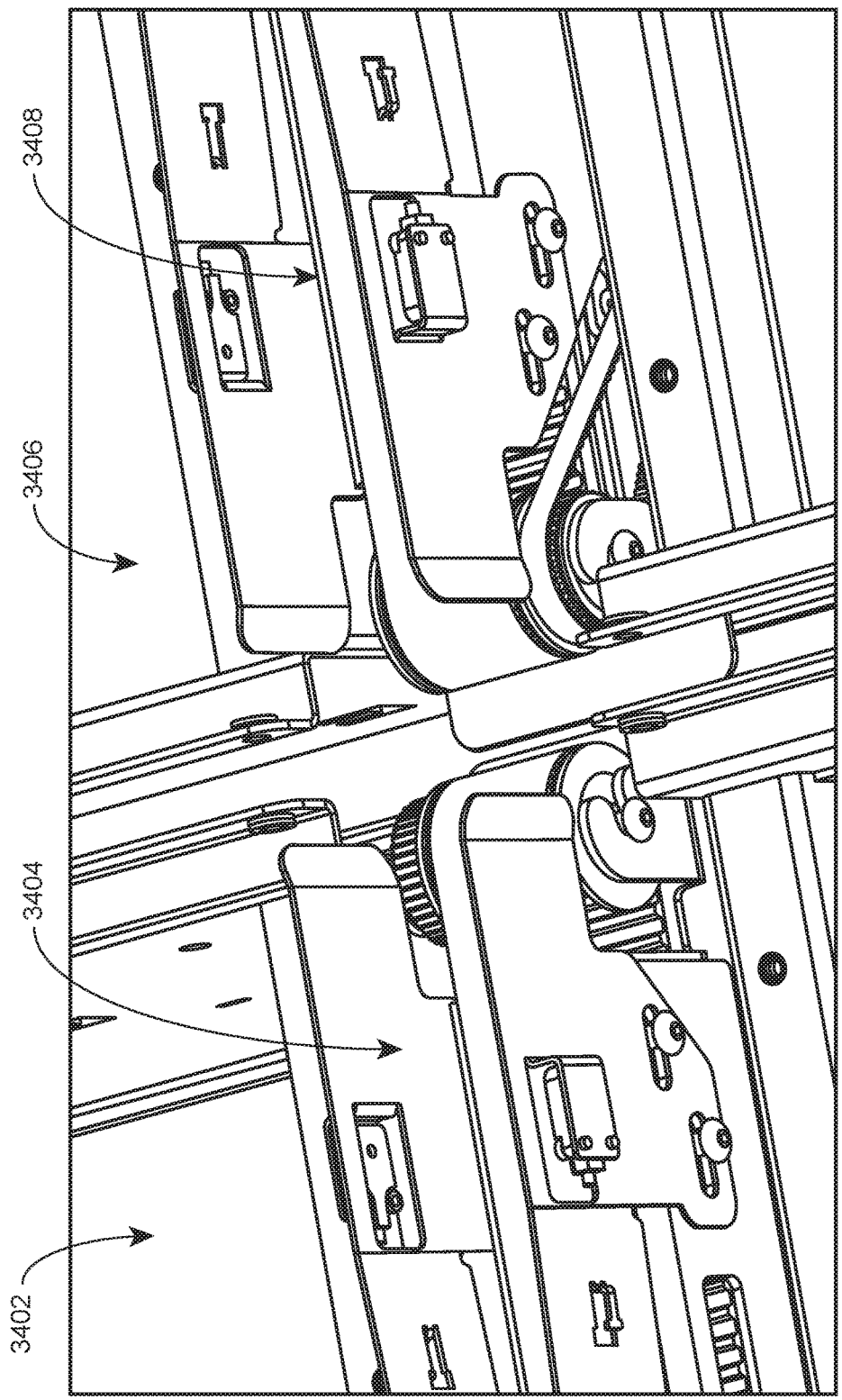
FIG. 34 shows the ends of internal conveyor systems of adjacent modules according to one embodiment.

The ends of internal conveyor systems of adjacent modules are illustrated in FIG. 34. Module 3402 includes internal conveyor system 3404 and module 3406 includes internal conveyor system 3408. In this example, conveyor systems 3404 and 3408 exhibit slight misalignment, but the integrated system is adapted for rack transfer between modules in the presence of such misalignment, e.g., due to the presence of lead-in bends at the ends of the guide rails, and optionally chamfered leading edges of the racks themselves.

Figure 35:
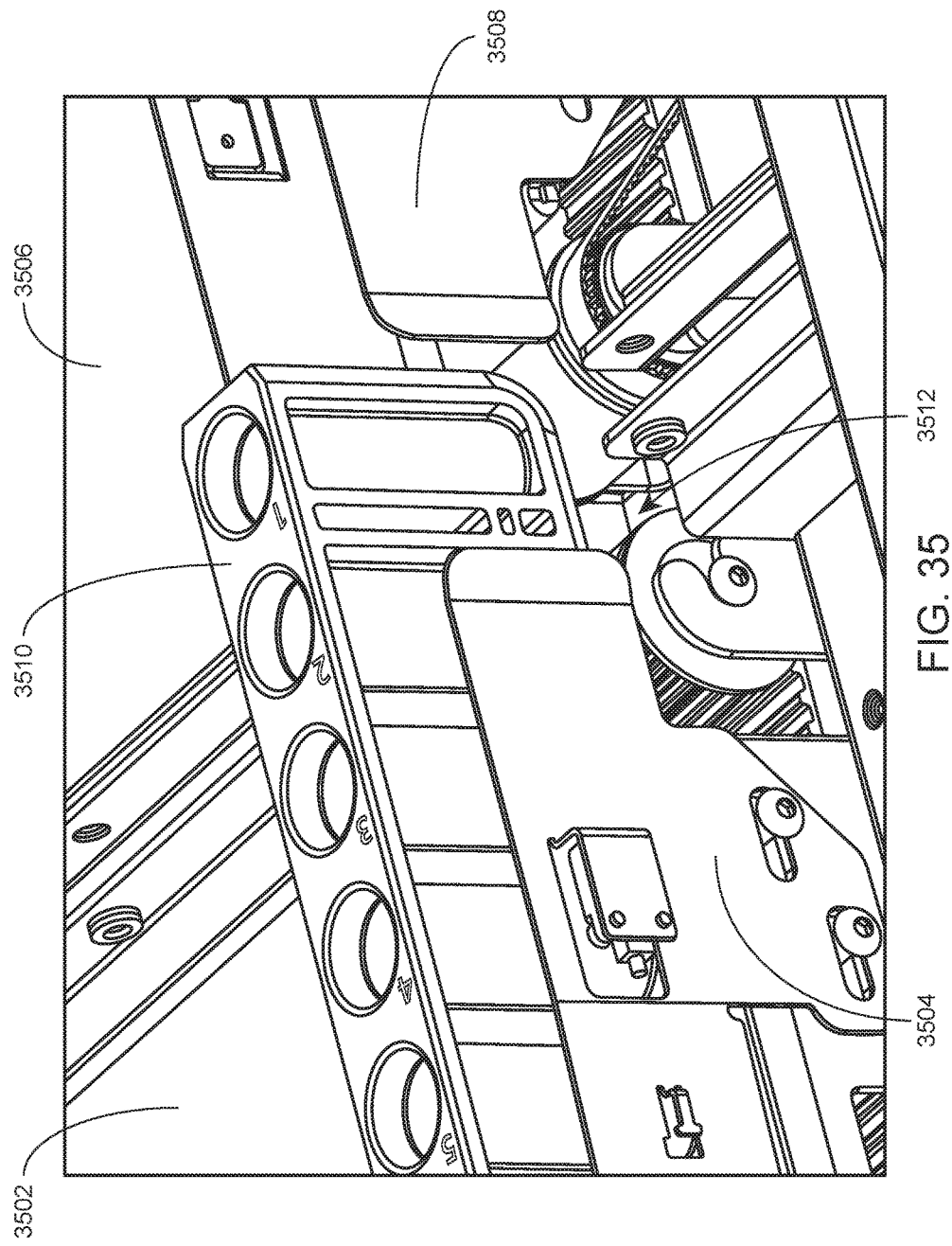
FIG. 35 shows a rack being transported between first and second modules of an integrated system via aligned internal conveyor systems of the first and second modules according to an embodiment of the present disclosure.

Illustrated in FIG. 35 is a rack being transported between first and second modules of an integrated system via aligned internal conveyor systems of the first and second modules according to an embodiment of the present disclosure. Shown is first module 3502 having internal conveyor system 3504 and first module 3506 having internal conveyor system 3508. Rack 3510 travels across gap 3512 between conveyor belts of internal conveyor system 3504 and internal conveyor system 3508.

FIG. 36 is an illustration of a top view of a rack being transported between first and second modules of an integrated system via aligned internal conveyor systems of the first and second modules according to an embodiment of the present disclosure. Shown is internal conveyor system 3602 of a first module and internal conveyor system 3604 of an adjacent second module. Despite slight misalignment between the internal conveyor systems of the adjacent modules, the integrated system is adapted to transport rack 3606 between the modules.

Figure 38:
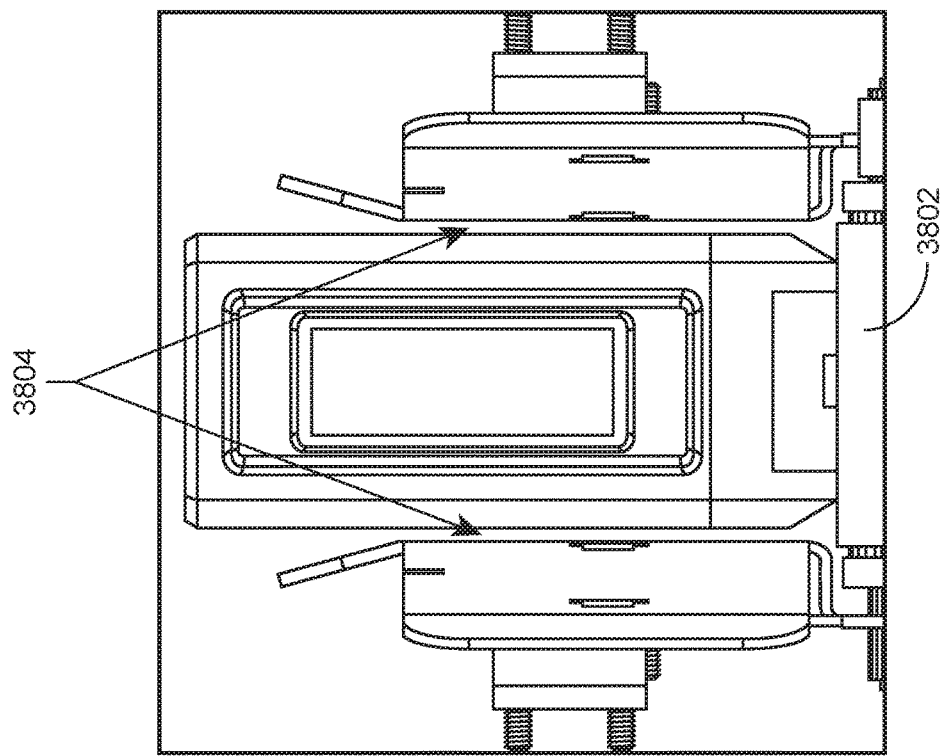
FIG. 38 shows a rack positioned in an internal conveyor system according to one embodiment.
Figure 37:
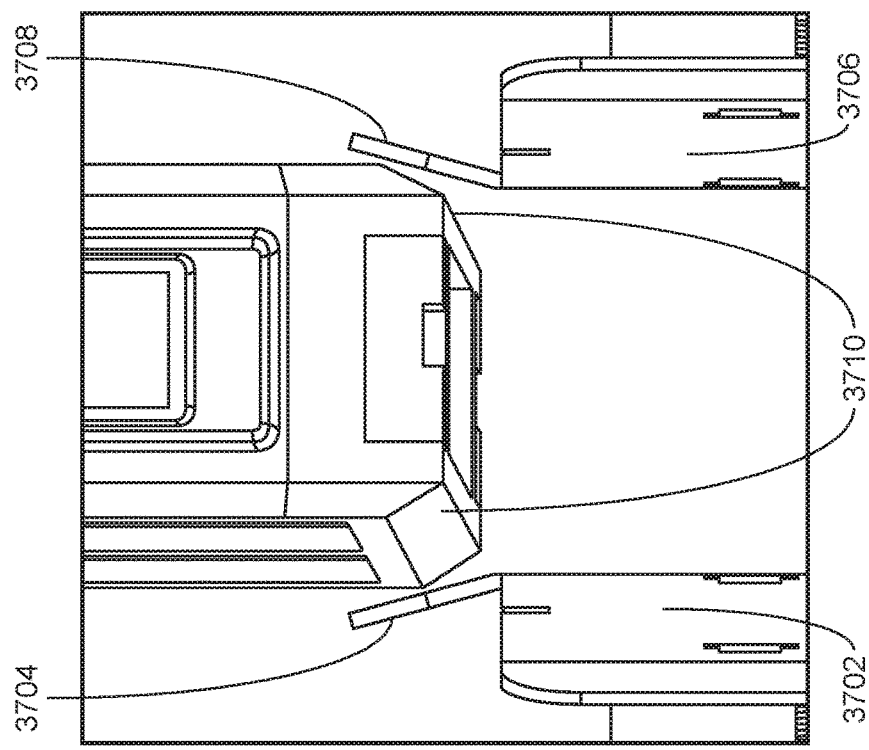
FIG. 37 shows an internal conveyor system that includes guide rails having lead-in bends according to one embodiment.

Illustrated in FIG. 37 is an internal conveyor system that includes guide rail 3702 having lead-in bend 3704 and guide rail 3706 having lead-in bend 3708. The lead-in bends guide the tube rack into the conveyor upon loading of the rack into the conveyor system by the robotic gripper. Guiding of the tube rack in this example is further facilitated by the presence of chamfered edges 3710 along the sides of the base of the rack. A rack positioned in the internal conveyor system of FIG. 37 is illustrated in FIG. 38. The rack is on conveyor belt 3802 with gaps 3804 between the sides of the rack and the guide rails of the system.

FIG. 39 is an illustration of a of a central portion of a rack according to an embodiment of the present disclosure. The rack includes circle feature 3902 in the rack that is complemented by a half-circle feature in the guide rails of the internal conveyor system. The circle feature may be used for use in aligning the tube/rack robot gripper to the rack conveyor chassis.

Figure 40:
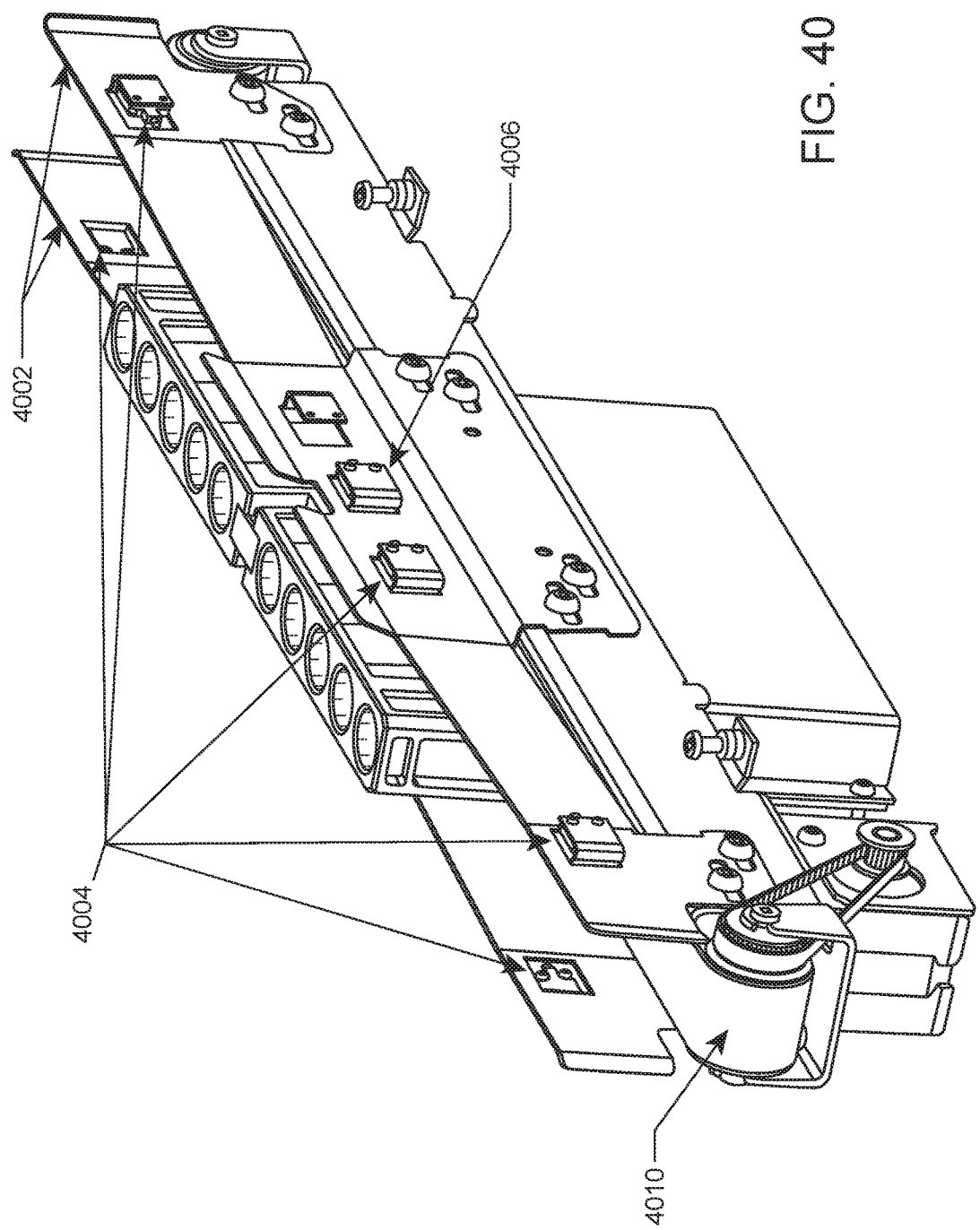
FIG. 40 shows an internal conveyor system that includes guide rails having rack position sensor pairs and a rack pick up location sensor pair.

Illustrated in FIG. 40 is an internal conveyor system that includes guide rails 4002 having rack position sensor pairs 4004 and rack pick up location sensor pair 4006. Rack 4008 is on conveyor belt 4010 and located at the central position of the internal conveyor system.

Figure 41:
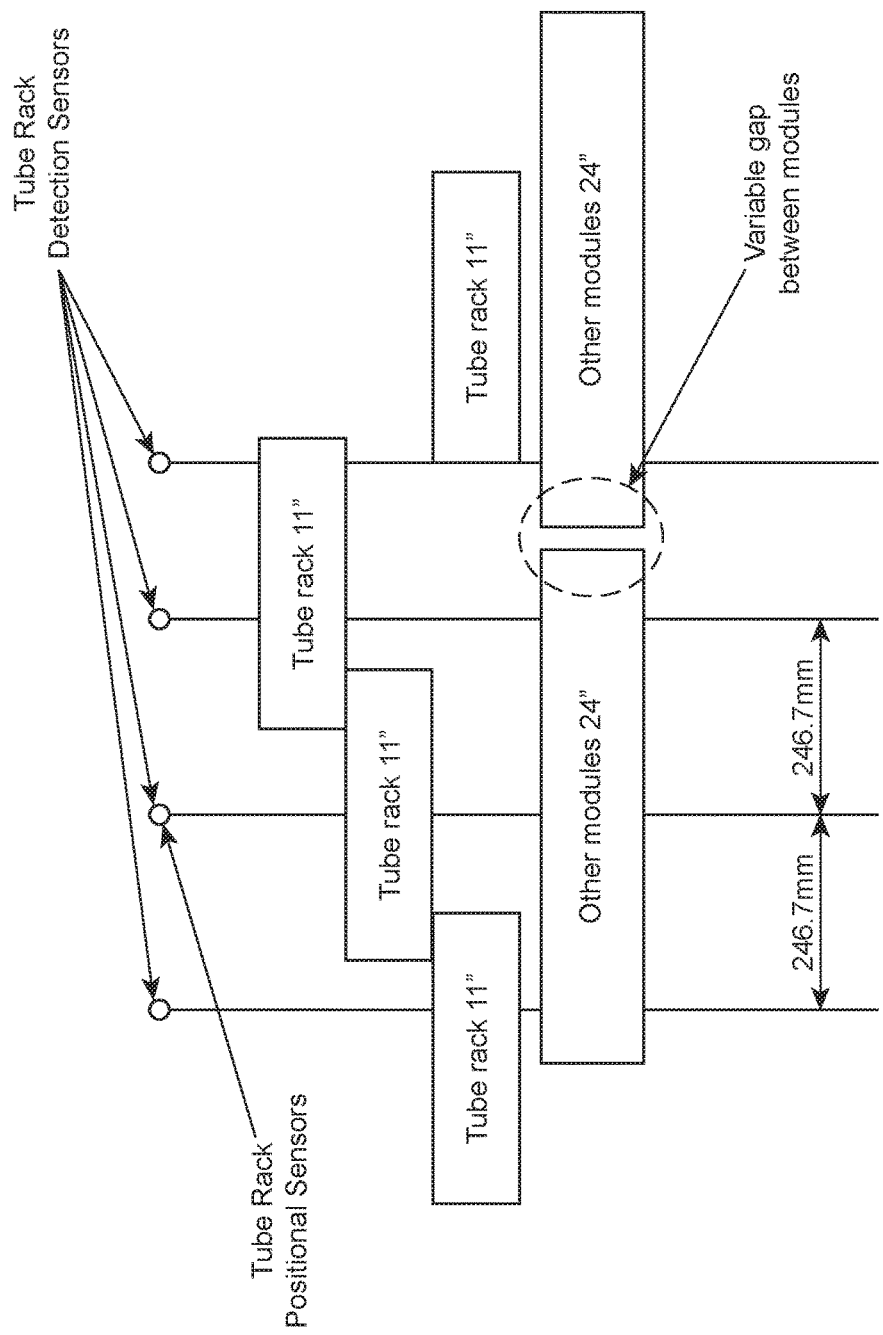
FIG. 41 shows an example configuration and scheme for optical sensor-based determination of rack position within an integrated analysis system.

An example configuration and scheme for optical sensor-based determination of rack position within an integrated analysis system that includes first and second modules is schematically illustrated in FIG. 41. In this example, the rack includes a sensing window in the center of the rack (see, e.g., sensing window 4608 in FIG. 46), such that the location of the rack within the system may be determined based on whether rack position sensor pairs are blocked by a rack or in optical communication (e.g., via the sensing window or due to the absence of a rack).

The internal container conveyor systems of the present disclosure may be included in a variety of different system types. Non-limiting examples of system types in which the internal container conveyor systems find use include hematology analysis systems, slide preparation systems (e.g., slide maker stainer systems), cell morphology imaging systems, slide preparation and cell morphology imaging systems, erythrocyte sedimentation rate (ESR) analysis systems, blood coagulation analysis systems, real-time nucleic acid amplification systems, immunoassay systems, and clinical chemistry systems.

According to certain embodiments, at least one of the containers is a sample container, and the integrated analysis system is adapted to transport the at least one sample container from the first module to the second module based on an analysis of the sample in the first module. In certain aspects, the integrated analysis system includes an automated hematology analysis system module and a slide maker stainer system module. In addition to being physically integrated, such an integrated system may include intellectual integration. For example, a hematology analysis result obtained for a particular sample in an automated hematology analysis system module may be communicated to the slide maker stainer module. In certain aspects, the result is an abnormal result (e.g., relating to one or any combination of RBC, PLT, HGB and WBC, as well as their related parameters such as MCV, MPV, WBC diff, NRBC, and RETC) which is flagged by the automated hematology analysis system. Upon transport of that sample via internal conveyor systems to the slide maker stainer for slide preparation (and optionally, digital morphology imaging analysis), the slide maker stainer may implement a particular slide smear preparation protocol, staining protocol, morphology analysis protocol, or combination thereof, based on the communicated hematology analysis result. An example workflow in which a downstream By way of example, if an automated hematology analysis system module determines that a sample exhibits a low white blood cell (WBC) concentration, this result may be communicated to the slide maker stainer system module. Upon transport of that sample to the slide maker stainer system module, the slide maker stainer system module may—based on the communicated low WBC concentration result—prepare two or more smears for that sample, where the default number of smears may be, e.g., 1 smear. A single smear from such low concentration samples may not include sufficient WBC or PLT images for analysis. In this way, the result obtained in the automated hematology analysis system module and communicated to the slide maker stainer system module is utilized to ensure that a sufficient number of smears are prepared for subsequent analysis.

This same concept applies to other low concentration results, such as low platelet (PLT) concentration results, low cell counts for non-blood body fluid samples, low nucleated red blood cell (NRBC) concentration results, and the like. NRBCs, for example, are a strong indicator for patient health and recovery status. Traditional analyzers often choose not to report NRBC results if a small/suspect NRBC population is identified (e.g., <1% NR/W). In an intellectually integrated system according to aspects of the present, after "learning" the suspect NRBC information from the automated hematology analysis system module, the slide maker stainer system module can prepare more slides than normal, instruct the digital morphology imaging subsystem to review more nucleated cells, or both, in order to confirm whether NRBCs are present in the sample.

A further example of intellectual integration is in the context of high basophil concentration. Basophils are relatively difficult to stain. A "standard" staining process may produce sub-optimal cell images if the sample contains high % BA. In such cases, after communication of a high basophil result from the automated hematology analysis system module, the slide maker stainer system module can adjust (e.g., extend) the stain duration for the sample to ensure sufficient staining/coloration of a smear.

As another example of intellectual integration, analyzers may experience more difficulty when handling abnormal WBC subpopulations. Therefore, it may be more valuable for the slide maker stainer system module to conduct a more focused review on these cells. In such cases, after receiving flagged information from the automated hematology analysis system module, the slide maker stainer system module perform extended imaging on a specific cell type—based on the flagged result—after a standard number of WBC images (e.g., 120 images) are captured.

An additional example of intellectual integration is in the context of platelet (PLT) clumps. PLT clumps are most likely to be "concentrated" at the end of a smear. The automated hematology analysis system module can flag PLT clumps with reasonable specificity and sensitivity. The flagged information can be passed to the slide maker stainer system module, which would allow the digital morphology imaging subsystem to take additional images around the PLT clump-rich location (e.g., end of smear). PLT clump diagnosis will benefit from such analyzer-morphology integration.

Intellectual integration allows efficient workflow for a downstream slide maker stainer system module. Instead of applying a standard workflow for all patient samples, the information generated from the upstream automated hematology analysis system module may be used for customized adjustment when preparing and reading slides for a given sample.

Slide Maker Stainer Systems

Aspects of the present disclosure include automated slide maker stainer systems. Such systems create smears (e.g., blood smears, body fluid smears, and the like) suitable for review by medical technologists and clinical pathologists, in an automated manner. According to certain embodiments, a slide maker stainer system of the present disclosure includes a digital morphology subsystem that generates and stores digital images of cells in a smear and performs, e.g., pre-classification of White Blood Cell (WBC) 5 part differentials, Red Blood Cell (RBC) morphologies, and/or the like. A slide maker stainer system may be provided as part of an integrated analysis system (see, e.g., FIG. 1) or may be provide as a separate system (see, e.g., FIG. 2).

Figure 63:
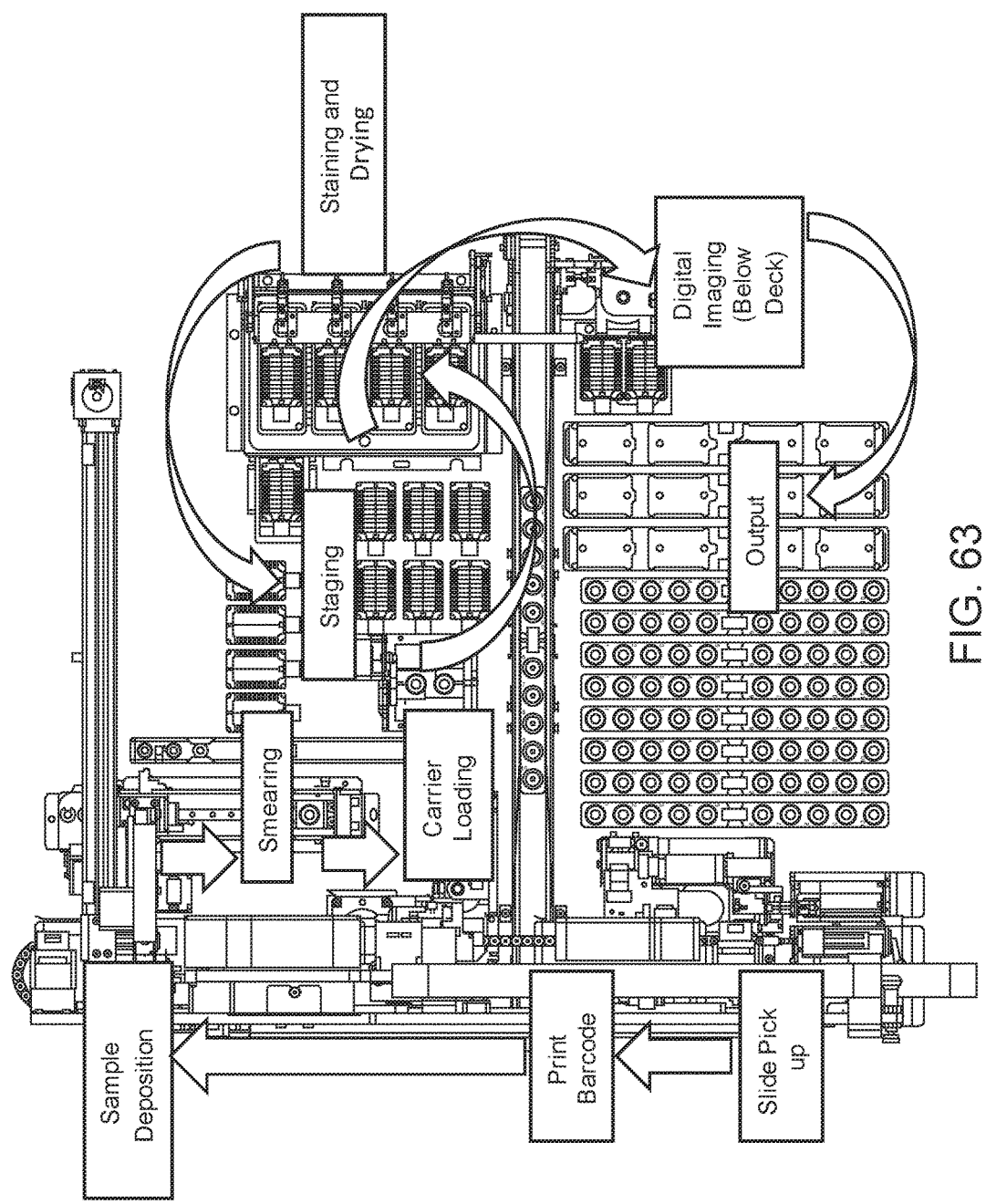
FIG. 63 shows a configuration and associated functionalities of a slide maker stainer according to an embodiment of the present disclosure.

An example workflow for an automated slide maker stainer system according to an embodiment of the present disclosure will now be described. A blank slide present in a slide caddy in a front loading area of the system is transported to a slide printer that prints a traceable barcode and/or human readable notation on a printable area of the slide. An aspiration/dispense subsystem applies a drop of sample (e.g., a drop of blood or body fluid) to the slide. A smearing device smears the drop of sample into a monolayer suitable for morphological assessment. The resulting smear (that is, a slide having the smear thereon) is loaded into a slide carrier and dried. A slide carrier containing one or more smears is then transferred to a slide staining subsystem that fixes, stains, washes and dries slides in the slide carrier. If the system includes a digital morphology subsystem, the stained and dried slides may be transferred to the digital morphology subsystem for digital morphology analysis. An example configuration of a slide maker stainer for carrying out the above-described workflow is shown in FIG. 63.

Figure 18:
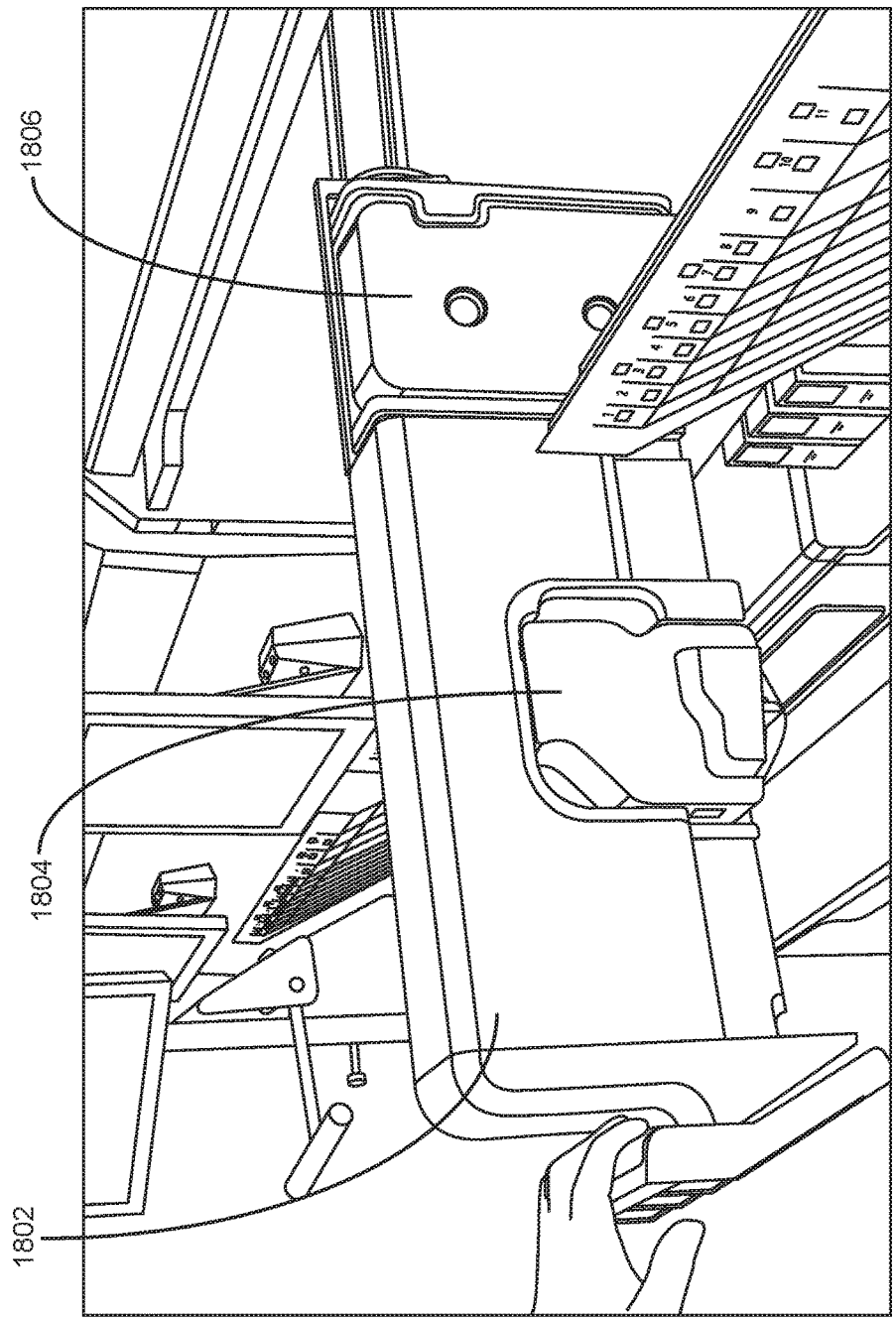
FIG. 18 shows a shelf of a slide maker stainer according to an embodiment of the present disclosure. The shelf includes a sealed slide printer cartridge and a sealed smear blade cartridge.

According to certain embodiments, the slide printer includes a printer cartridge that contains a printer ribbon, and the cartridge is a sealed unit designed to be replaced by a user of the slide make stainer system. Similarly, the smearing device may include a smear blade cartridge which includes smear blades (e.g., PET smear blades) and is a sealed unit designed to be user replaceable once all of the smear blades have been used. According to certain embodiments, a sealed slide printer cartridge and a sealed smear blade cartridge are provided in shelf that pulls out of the system to facilitate replacement of the cartridges as needed by the user. One such embodiment is shown in FIG. 18. As shown, shelf 1802 includes slide printer cartridge 1804 and smear blade cartridge 1806, which shelf may be pulled out by a user for easy access to, and replacement of, the cartridges.

In certain aspects, the smear blade cartridge includes an input reel, a roll bar, a take-up reel, and a smearing tape having a plurality of cut-outs formed therein. The smearing tape is initially wound within the input reel and coupled to the take-up reel such that the smearing tape can be drawn from the input reel into the take-up reel. The smearing tape is wrapped around the roll bar, between the input reel and the take-up reel, such that each of the plurality of cut-outs creates a blade that extends from the smearing tape to expose a smear surface as the smearing tape is drawn into the take-up reel. Details regarding smear tape cartridges that find use in the slide maker stainers of the present disclosure may be found in U.S. Pat. No. 9,011,773.

According to certain embodiments, a slide maker stainer of the present disclosure includes a blood smear drying device. In certain aspects, the blood smear drying device includes a chamber, a slide holder adapted to hold slides in a stacked configuration having a stacking direction, and a vacuum device operably coupled to the chamber and adapted to evacuate the chamber in a direction parallel to the stacking direction. The vacuum device may be adapted to produce a vacuum in the chamber of from 0.25 to 0.75 atmospheres (atm). For example, the vacuum device may be adapted to produce a vacuum in the chamber of 0.5 atm. The blood smear drying device may further include a heater adapted to heat the chamber. An example of a heater that finds use in the blood smearing devices of the present disclosure is an infra-red (IR) heater. In certain aspects, the heater radiates heat in a direction orthogonal to the stacking direction.

One of the challenges for the automated preparation of blood smears is drying the smear made on the glass slide quickly without damaging the cells. A typical time required to dry a single smear slide in ambient conditions is about 3-4 minutes. When the slides are stacked (e.g., in a slide carrier), the drying time is significantly longer (e.g., 10-12 minutes). The present inventors have found that the conventional method of using forced air over the smear causes damage to cells of the smear and disturbs the distribution of the cells, and that blood cells are damaged when heated to temperature above 35° C. As such, convection heat transfer and conventional heating has undesirable consequences when trying to reduce the drying time. The present inventors have found that utilizing low pressure (e.g., a vacuum) when drying blood smears reduces drying time and does not cause cell damage or affect the distribution of cells in the smear, e.g., because there is no or minimal air flow over the smears. In addition, the present inventors have found that implementation of a vacuum results in rapid drying even in high humidity and/or low temperature environments. Traditional drying approaches are inadequate at high humidity, as the drying time is longer and creates artifacts in the case of stacked slides. Moreover, when using a traditional drying strategy to dry stacked slides, moisture accumulated on an upper slide often drips on the slide beneath the upper slide.

The slide holder may be adapted to hold any desired number of stacked slides. For example, the slide holder may be adapted to hold from 1 to 50 slides, e.g., from 2 to 40 slides, from 3 to 30 slides, from 4 to 25 slides, from 5 to 20 slides, or from 5 to 15 slides (e.g., 10 slides). In certain aspects, the slide holder is adapted to hold 2 or more, 5 or more, 10 or more, 20 or more, 30 or more, 40 or more, or 50 or more slides.

Figure 64:
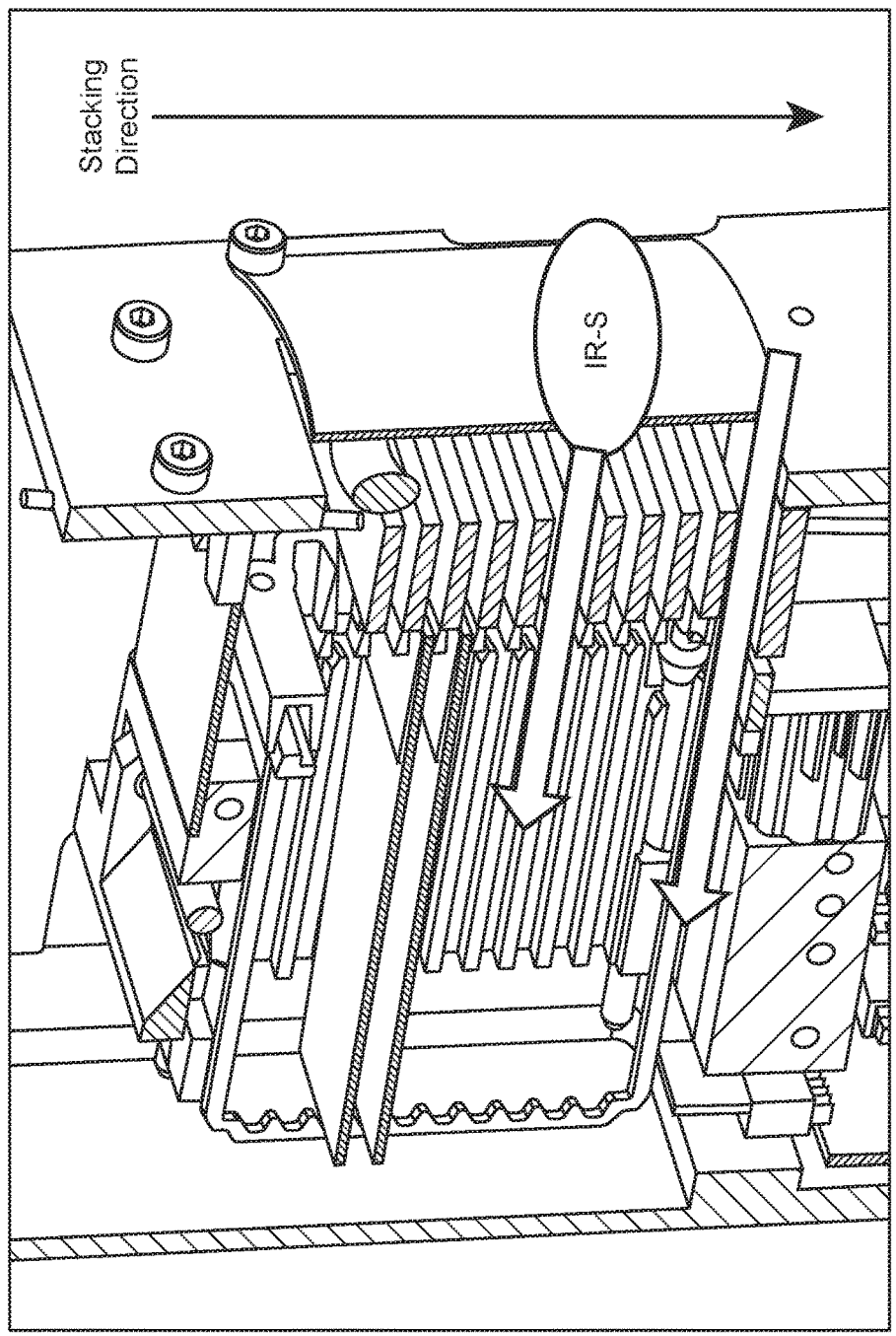
FIG. 64 shows a smear drying device according to an embodiment of the present disclosure.

A blood smear drying device according to one embodiment is schematically illustrated in FIG. 64. In this example, slides are held in a horizontal orientation, such that the stacking direction is vertical (that is, the horizontal slides are stacked vertically). The stacking direction is indicated by the vertical arrow to the right of the illustration. The device includes a vacuum device coupled to a chamber housing the vertically stacked slides, which vacuum device is adapted to evacuate the chamber in a direction parallel to the stacking direction. For example, the vacuum device may be beneath the chamber and coupled to the bottom of the chamber such that the chamber is evacuated from the bottom in the stacking direction. This example device includes an IR heater, which heater is disposed adjacent the slides and radiates heat toward the slides in a direction orthogonal to the stacking direction (that is, horizontally in the example configuration of the device shown in FIG. 64).

The present inventors have found that, in embodiments in which the blood smear drying device includes a heater configured as described above, the drying device is able to selectively heat the blood smear—that is, more energy may be selectively provided to the blood plasma as compared to the blood cells, e.g., red blood cells and white blood cells. As a result, the evaporation rate is increased.

Methods which may be implemented using the above-described blood smear drying device are also provided. According to certain embodiments, provided is a method of drying blood smears present on slides. The methods include positioning slides including liquid ("undried") blood smears in a slide holder adapted to hold slides in a stacked configuration having a stacking direction, and producing a vacuum in a chamber including the slide holder. Producing the vacuum (e.g., a vacuum of from 0.25 to 0.75 atm, such as 0.5 atm) includes evacuating the chamber in a direction parallel to the stacking direction. The method may further include heating the chamber while producing a vacuum in the chamber. The heating may include radiating heat toward the slides in a direction orthogonal to the stacking direction. In certain aspects, the heating is performed using an infra-red (IR) heater.

Figure 19:
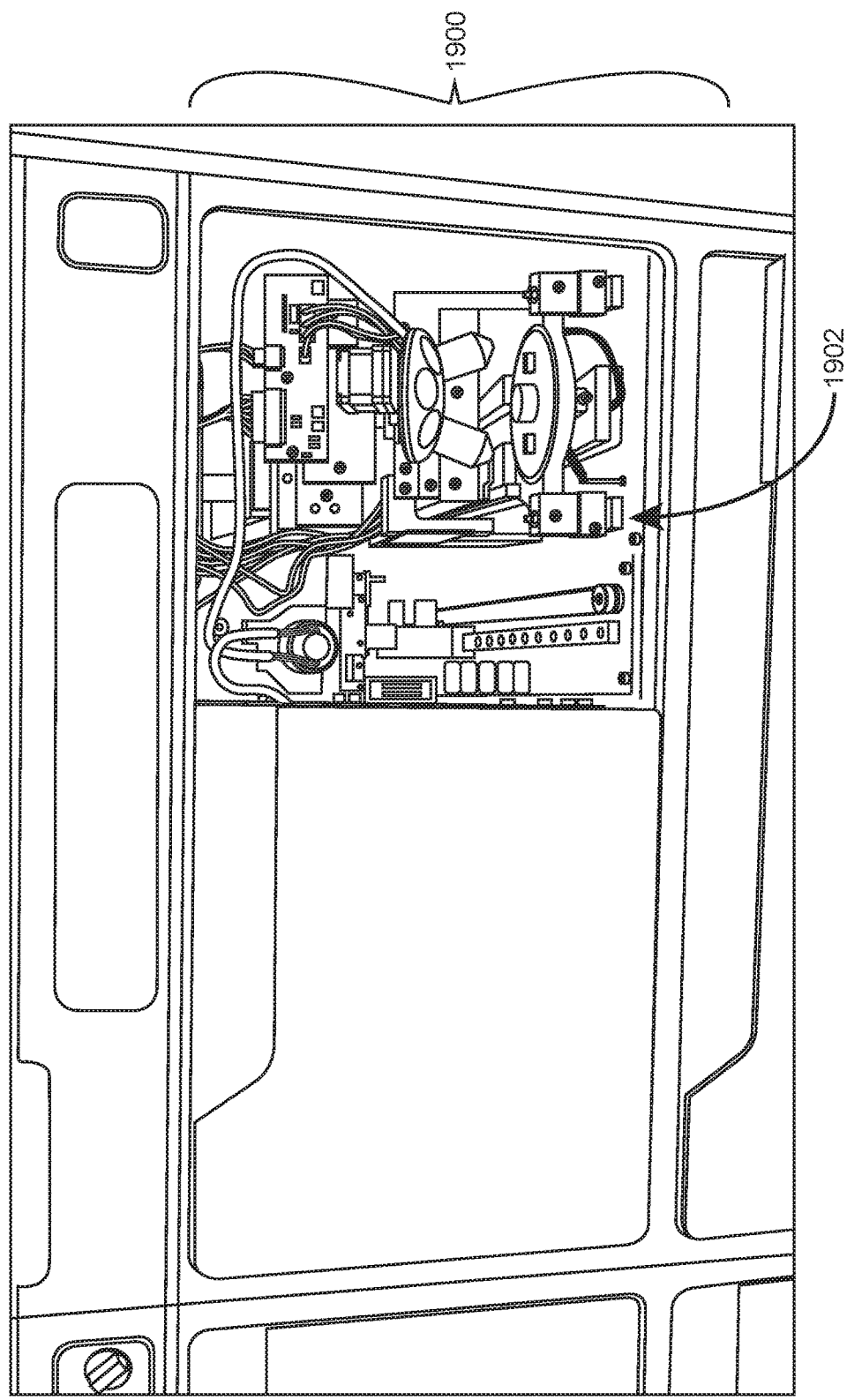
FIG. 19 shows a slide maker stainer system that includes a digital morphology subsystem according to an embodiment of the present disclosure.
Figure 20:
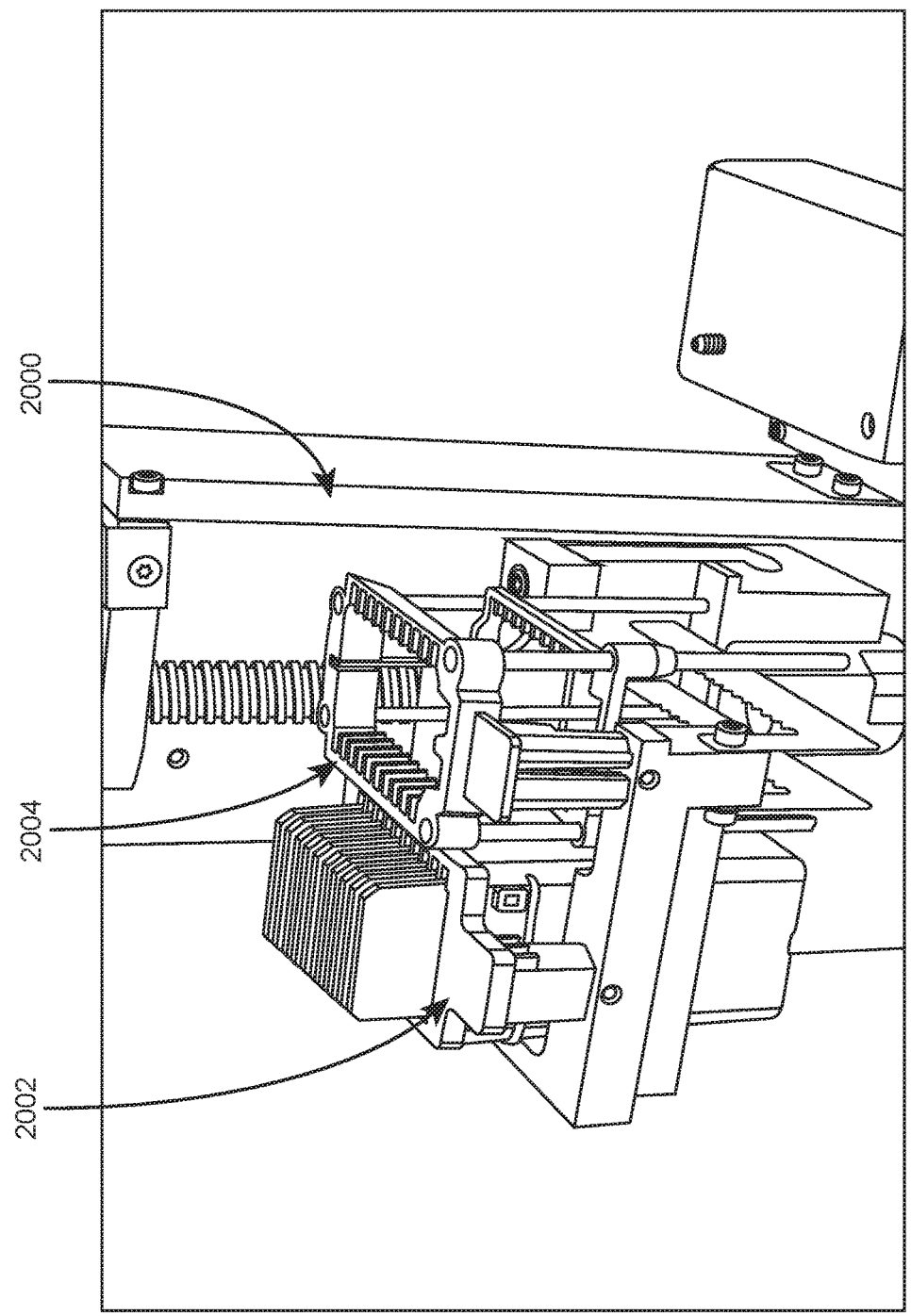
FIG. 20 shows a slide carrier elevator and slide carriers of a slide maker stainer according to an embodiment of the present disclosure.
Figure 21:
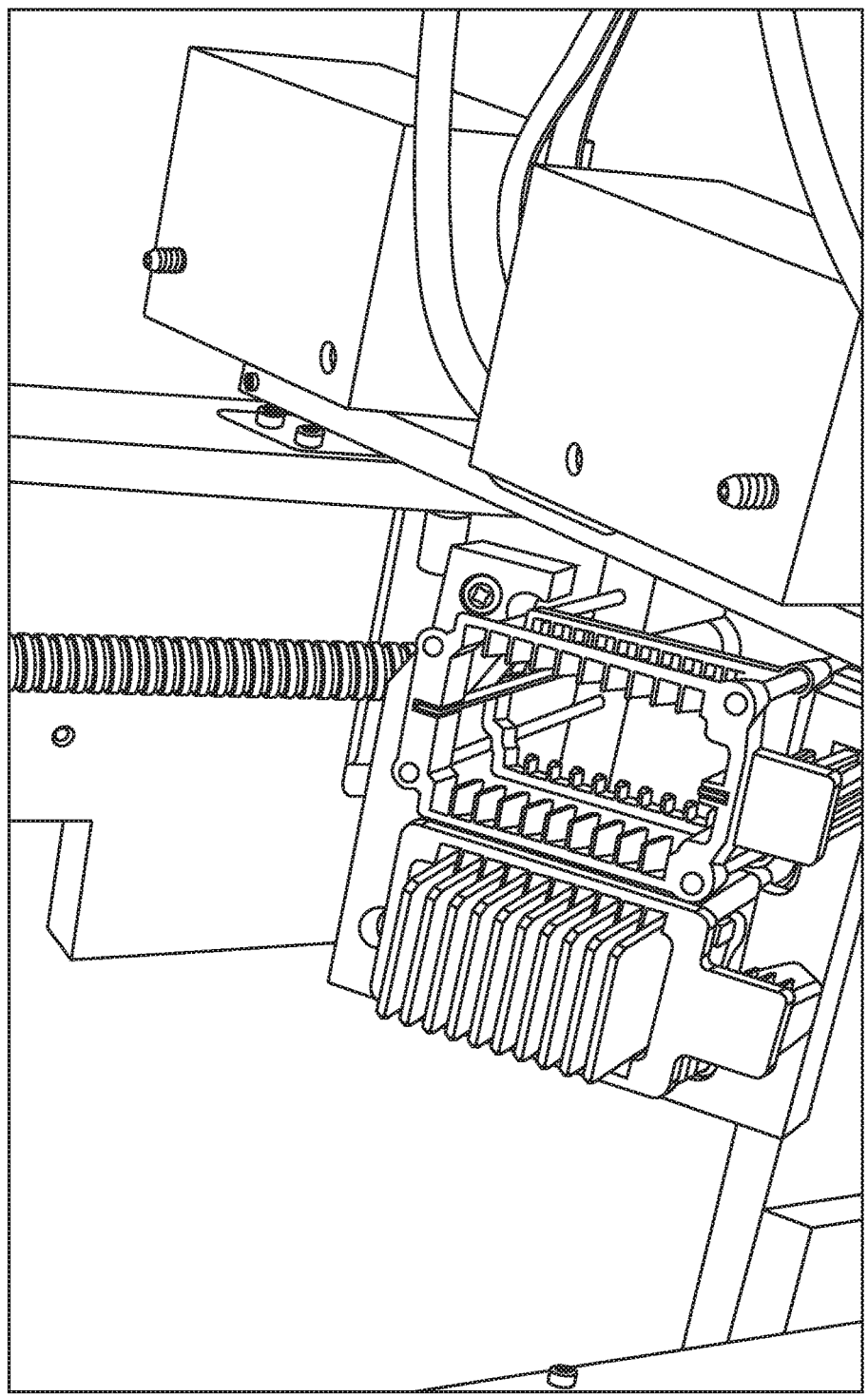
FIG. 21 shows rotation of slide carriers by a slide carrier elevator as the elevator lowers the slide carriers to a lower compartment of a slide maker stainer according to an embodiment of the present disclosure.
Figure 22:
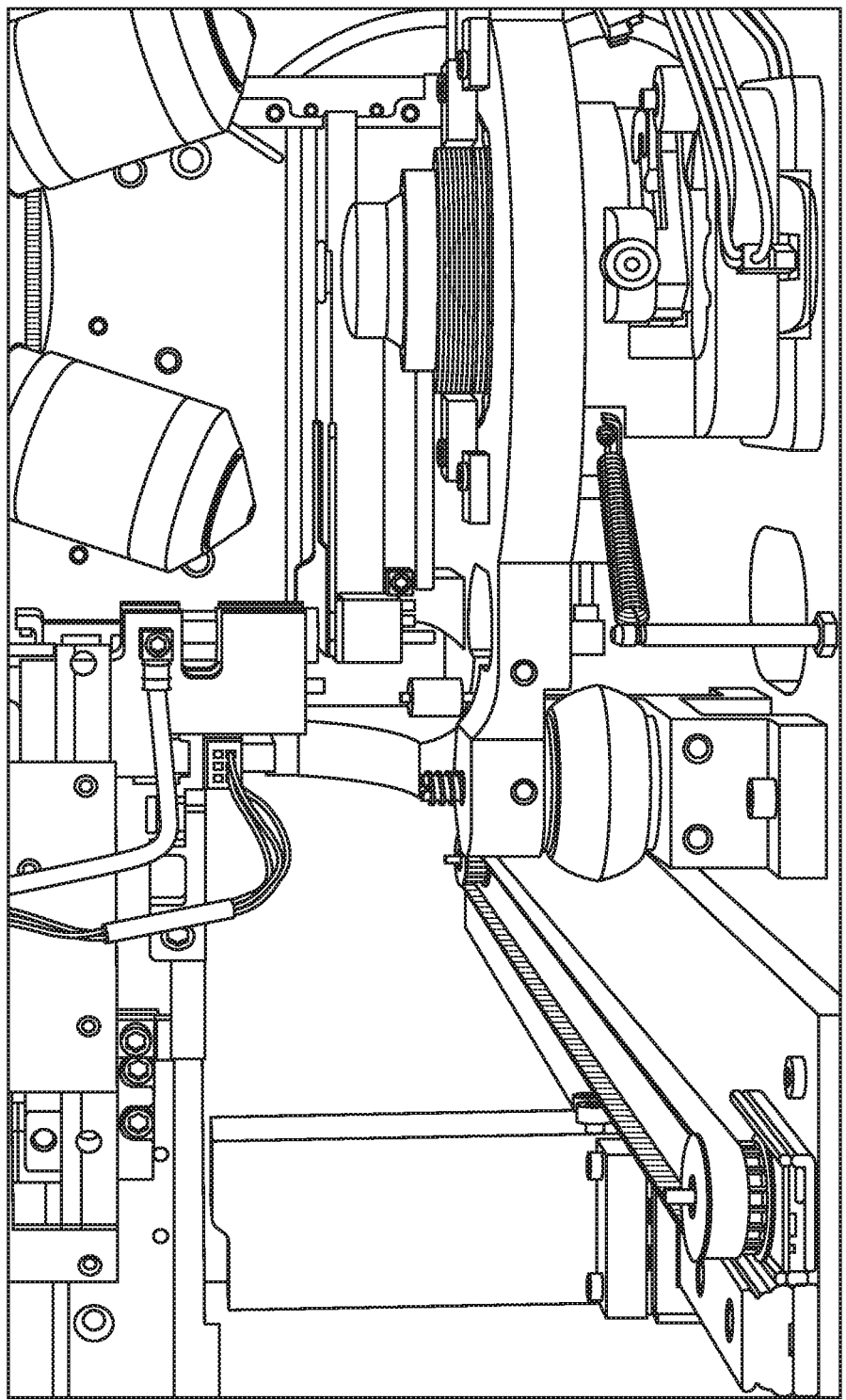
FIG. 22 shows a slide being placed on the stage of a digital microscope of a digital morphology subsystem of a slide maker stainer system, which slide was retrieved from a slide carrier present in a slide carrier elevator of the subsystem.

In certain aspects, the slide maker stainer system includes a digital morphology subsystem. The subsystem includes a digital microscope. The subsystem may further include a slide loader, an oil application system (e.g., for applying to the smear for high magnification morphology analysis), vibration isolation components, an oily slide carrier, and the like. In certain aspects, when the slide maker stainer system includes a digital morphology subsystem, the digital morphology subsystem is located in a lower compartment of the system beneath the processing deck. This example configuration is shown in FIG. 19, which shows lower compartment 1900 of a slide maker stainer system that includes digital morphology subsystem 1902. When configured in this way, the digital morphology subsystem may include a slide carrier elevator that lowers slide carriers containing slides from an upper processing deck to the digital microscope of the subsystem in the lower compartment. An example elevator is shown in FIG. 20. Shown is upper portion 2000 of slide carrier elevator which is holding oily slide carrier 2002 and slide carrier 2004, such that slides present in the slide carriers are initially held in a vertical orientation. In this embodiment, as the slide carriers are lowered by the elevator to the lower compartment of the slide maker stainer system for digital morphology analysis, the elevator rotates the slide carriers such that the slides present in the slide carriers are in a horizontal orientation when they reach the lower compartment. This horizontal orientation facilitates the removal of slides from the slide carriers and placement of the slides in the horizontal orientation on a stage of the digital microscope. Rotation of the slide carriers by the elevator as the elevator lowers the slide carriers to the lower compartment is shown in FIG. 21. FIG. 22 shows a slide being placed on the stage of a digital microscope of a digital morphology subsystem, which slide was retrieved from a horizontally-oriented slide carrier present in a slide carrier elevator of the subsystem.

In certain aspects, when the slide maker stainer system includes a digital morphology subsystem, the subsystem may include a digital microscope that includes an objective lens, an image sensor, and a tube lens positioned between the objective lens and the image sensor, the tube lens having a magnification value less than 1×. According to certain embodiments, the tube lens has a magnification value of from 0.3× to 0.7×, such as from 0.4× to 0.6× (e.g., 0.5×).

In high throughput digital microscopy applications requiring a high imaging resolution, a fundamental limitation comes from a trade-off between a field of view (FoV) and optical resolution of the objective lens. Designing and manufacturing an objective lens with high resolving power requires correction of numerous aberrations using multiple components and results in a decreased field of view as the resolution increases towards its physical limits imposed by the light wavelength. The present inventors have found that a digital optical microscope having both high resolution and wide field of view may be achieved by inclusion of a tube lens (e.g., a tube lens having a magnification value of 0.5×). A resolution value of any objective lens used in combination with a 0.5× tube lens is preserved while its respective FoV is expanded 2 times, without deterioration of image quality. The design concept was verified by measuring resolution of 20×/N.A.=0.5 and 100×/N.A.=1.3 objectives using micro resolution grids and FoV using a micro ruler. It was confirmed that measured resolution values match theoretical resolution values for these objectives while their FoV are expanded twice. Moreover, flatness of the field is preserved over an increased size of the expanded FoV.

Associated methods that utilize such a digital microscope that includes a tube lens as described above are also provided. In certain aspects, provided is a method including placing a microscope slide having cells disposed thereon on a stage of a digital microscope. The digital microscope includes an objective lens, an image sensor, and a tube lens positioned between the objective lens and the image sensor, the tube lens having a magnification value less than 1× (e.g., from 0.3× to 0.7×, such as from 0.4× to 0.6× (e.g., 0.5×)). The method further includes acquiring digital images of the cells using the digital microscope.

Figure 17:
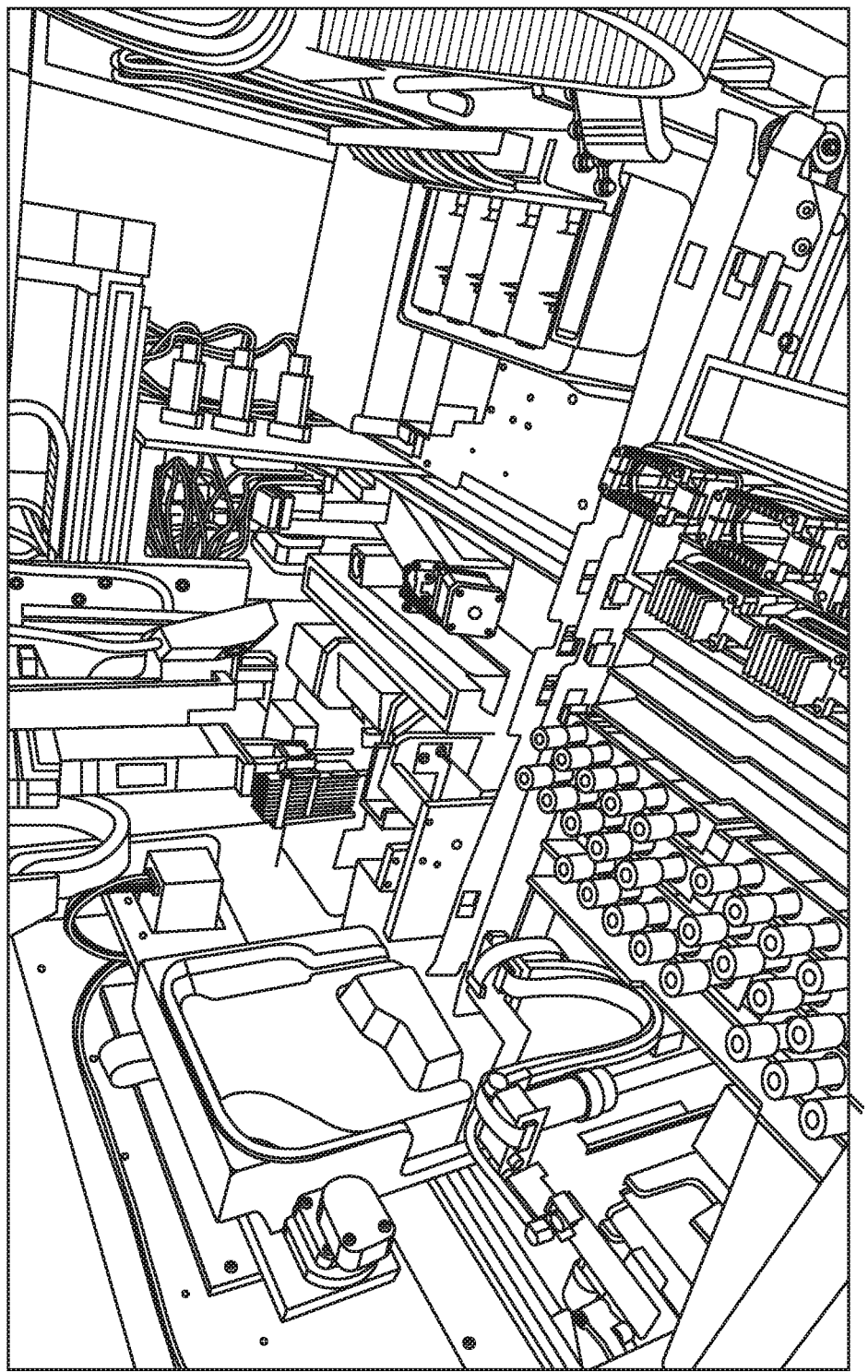
FIG. 17 shows an internal view of a slide maker stainer system according to an embodiment of the present disclosure.
Figure 62:
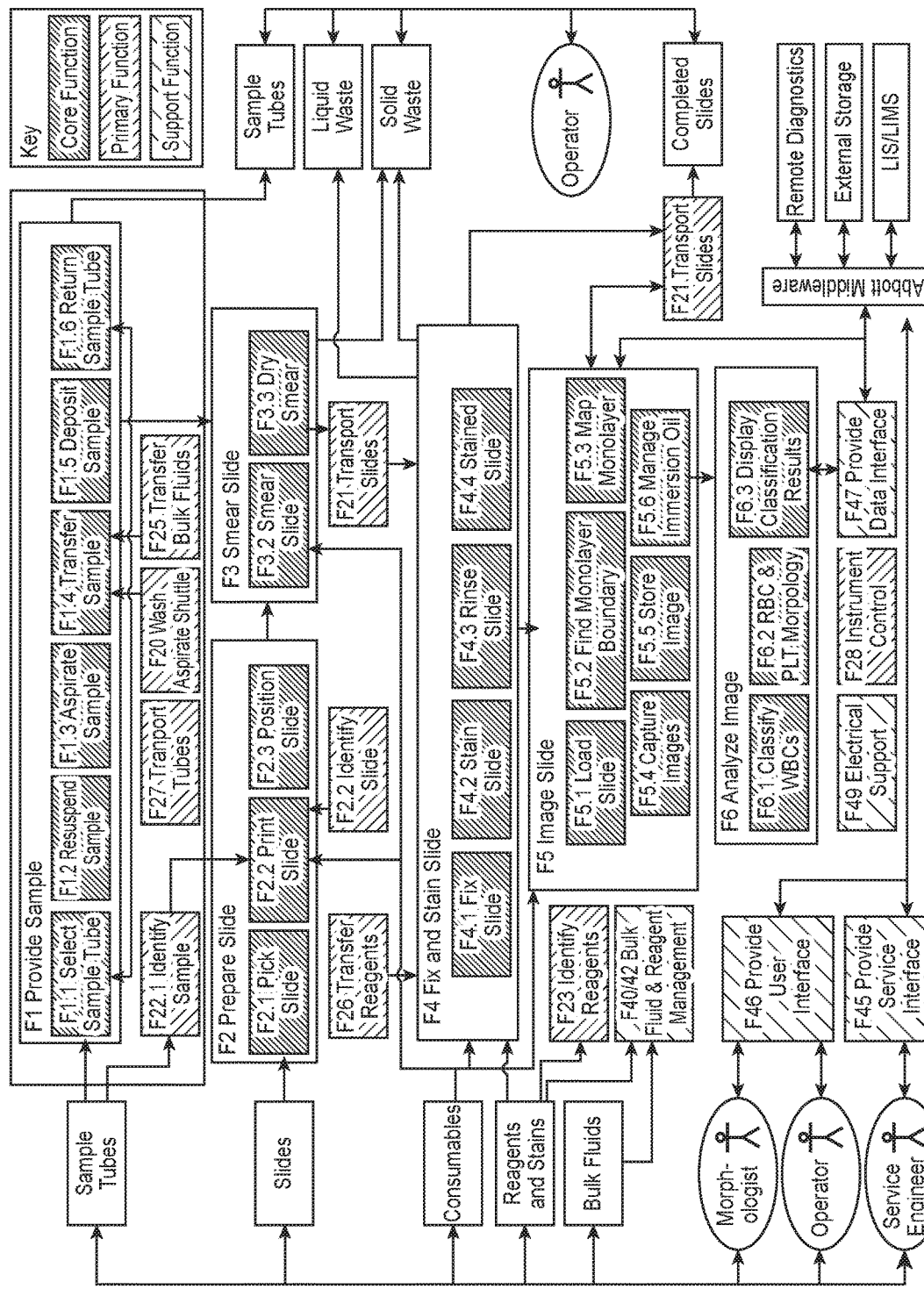
FIG. 62 shows the functional architecture of a slide maker stainer according to one embodiment of the present disclosure.

FIG. 17 shows an internal view of a slide maker stainer system according to an embodiment of the present disclosure. In this example, the system includes (inter alia): a front loading area; a slide printer, aspiration/dispense subsystem, and smearing device on the left side of the system; and a fixing and staining station on the right side of the system. FIG. 62 shows the functional architecture of a slide maker stainer according to one embodiment of the present disclosure.

Figure 55:
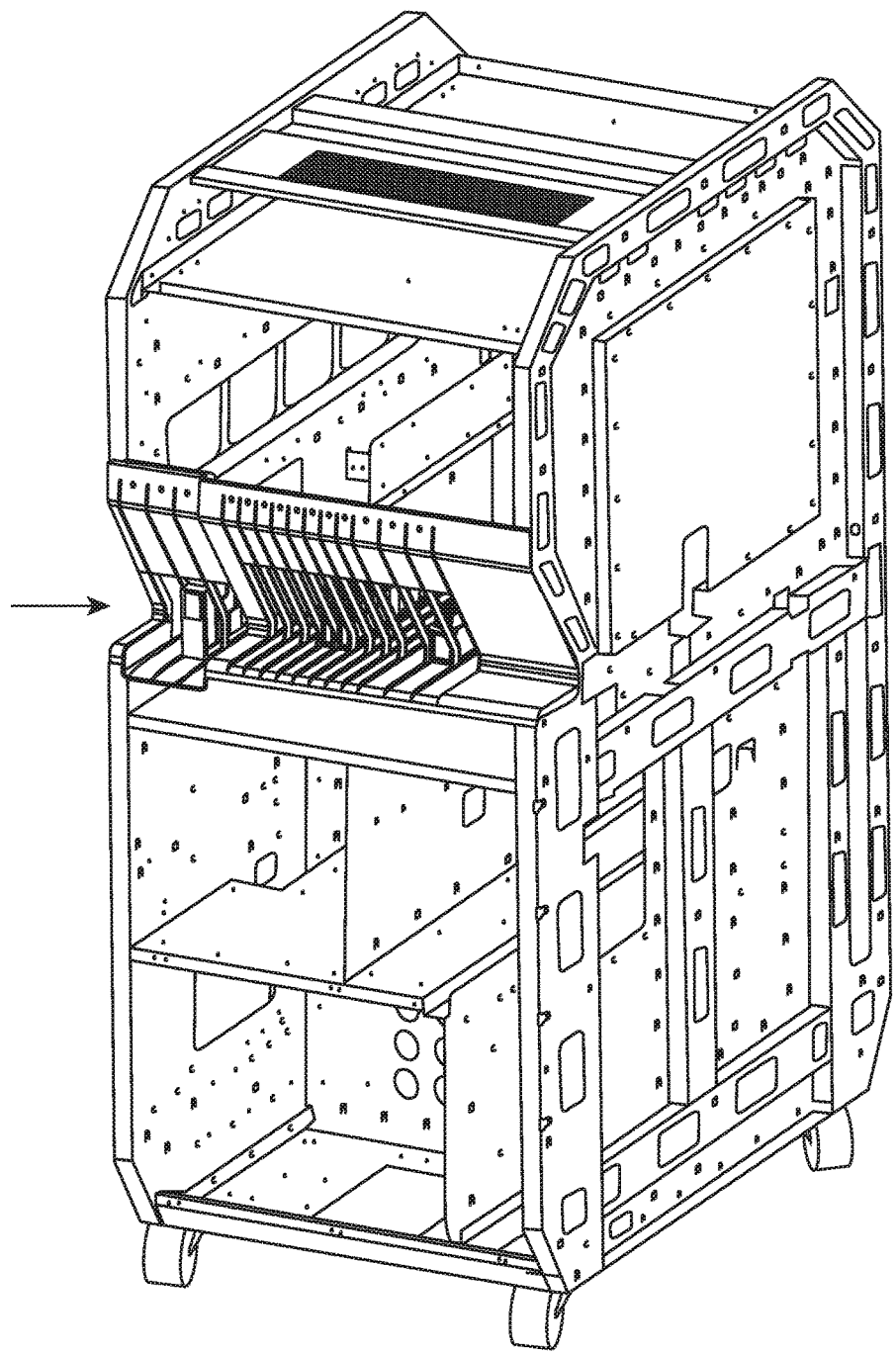
FIG. 55 shows a chassis of a slide maker stainer system according to an embodiment of the present disclosure.

A chassis of a slide maker stainer system according to an embodiment of the present disclosure is illustrated in FIG. 55. Front loading area of the system is indicated by the arrow.

Figure 25:
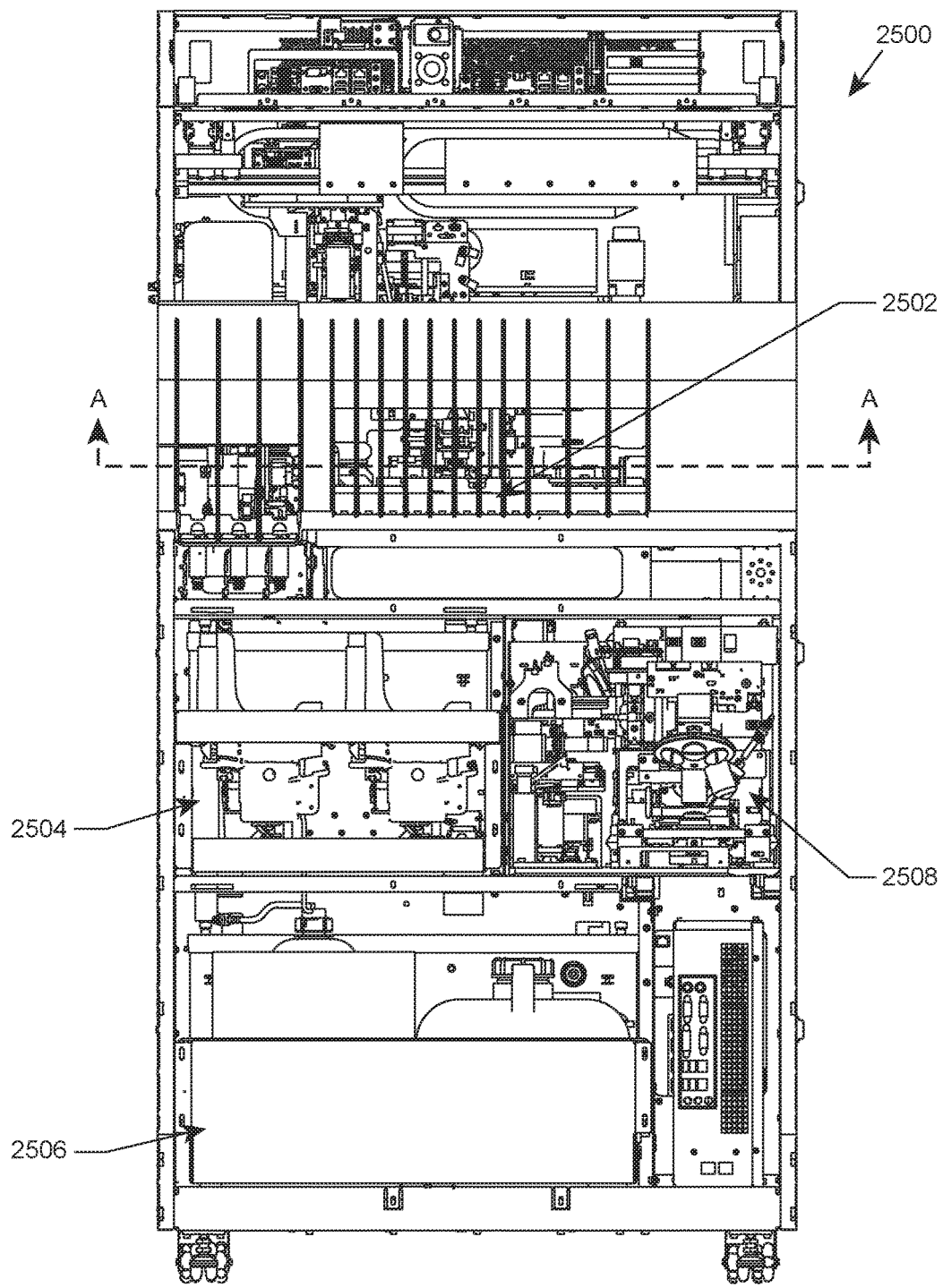
FIG. 25 shows a front view of an automated slide maker stainer system according to an embodiment of the present disclosure.

A front view of an automated slide maker stainer system according to an embodiment of the present disclosure is illustrated in FIG. 25. System 2500 includes (inter alia) front loading area 2502, fluidics subsystem 2504, buffer and waste drawer 2506, and digital morphology subsystem 2508.

Figure 26:
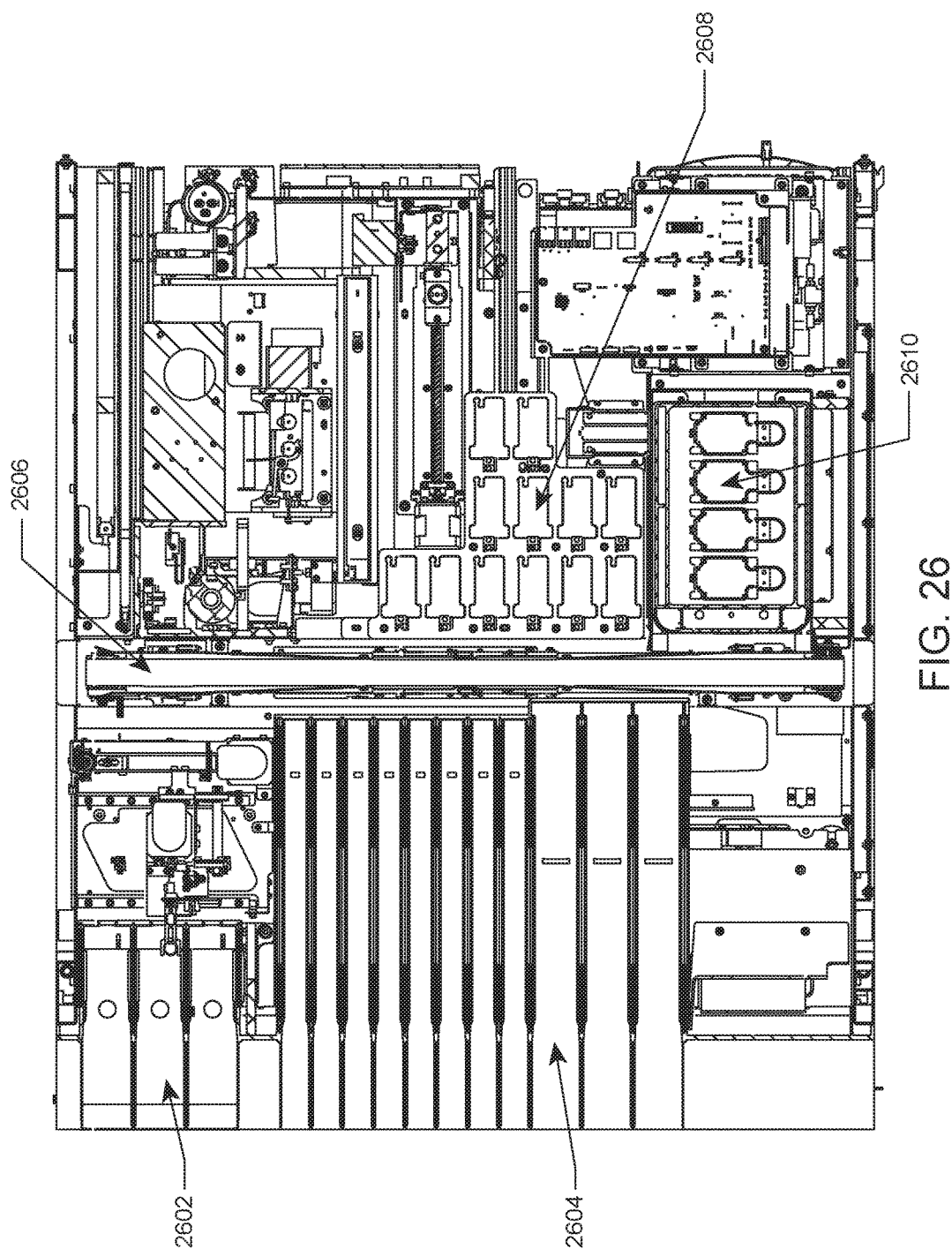
FIG. 26 shows a top view of a level of an automated slide maker stainer system according to an embodiment of the present disclosure.

A top view of the automated slide maker stainer system of FIG. 25 at the level indicated by "A" in FIG. 25 is illustrated in FIG. 26. This level includes a front loading area having lanes for slide input caddies (e.g., slide input caddy lane 2602), lanes for sample tube racks, and lanes for slide input/output racks (e.g., slide input/output rack lane 2604). Disposed between the front loading area and the sample processing area is internal conveyor system 2606. Staging area 2608 is adapted to store slides present in slide carriers queued for subsequent processing and/or digital morphology imaging analysis. Baths 2610 for fixing, staining, washing and drying smears are also included.

Figure 27:
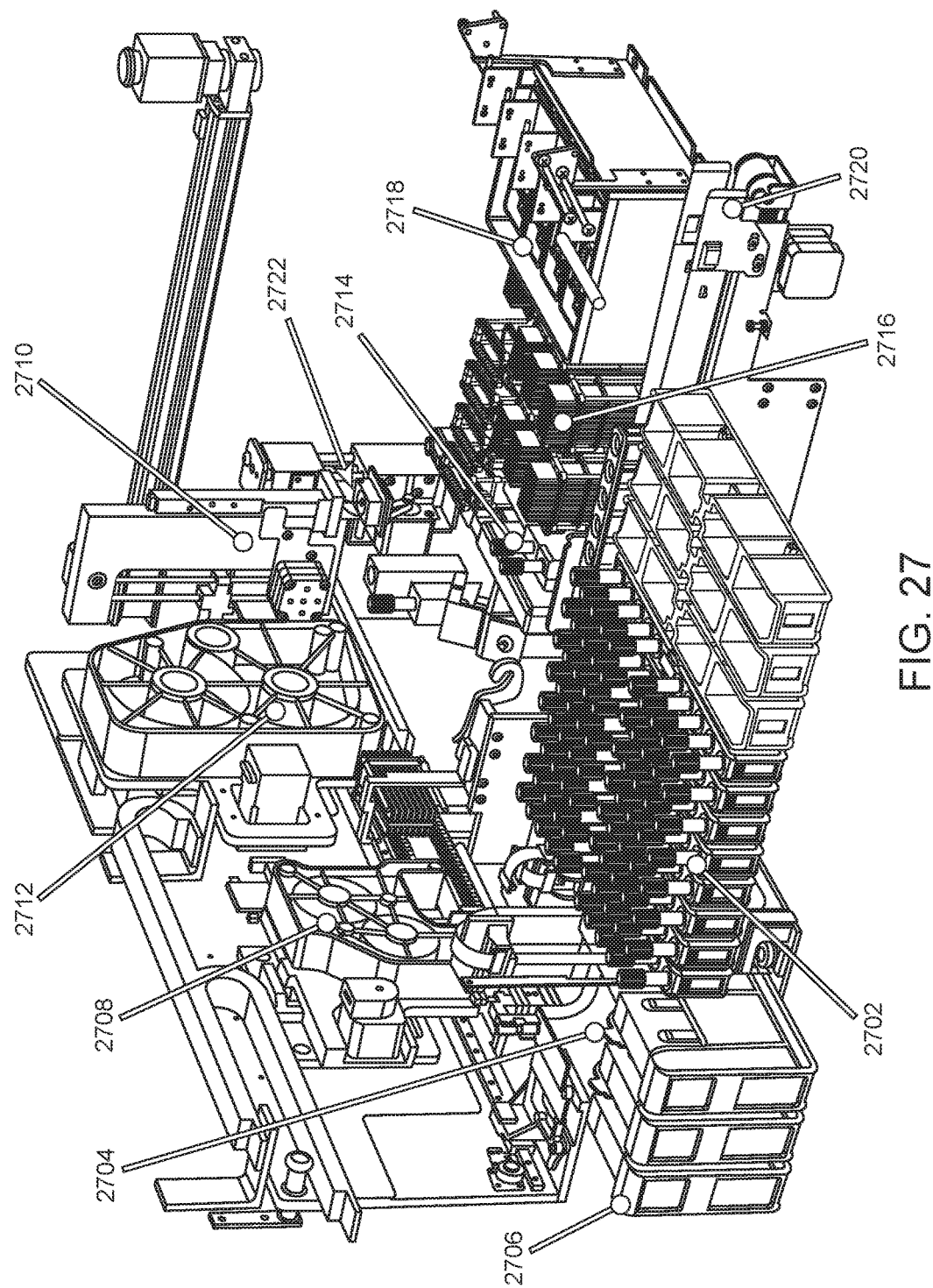
FIG. 27 shows a configuration of components of an automated slide maker stainer system according to one embodiment.

FIG. 27 shows an example configuration of components of an automated slide maker stainer system according to an embodiment of the present disclosure. In this example, the system includes front loading area 2702, slide picker 2704 for retrieving slides from slide input caddies 2706. The slide picker inputs the slides into slide printer 2708 for printing of identifying information on a printable area of the slides. After printing, the slides are moved to aspiration/dispense module 2710 where sample is applied to a slide, and then subsequently smeared by smear blade cassette 2712. This system also includes resuspension module 2714 (e.g., inversion mixer) for resuspending blood or body fluid samples, staging area 2716, and fixing/staining/washing area 2718. The system includes internal conveyor system 2720. also shown is cap piercer module 2722 adapted to pierce the caps of closed tube sample tubes for aspiration of samples from the tubes.

Figure 28:
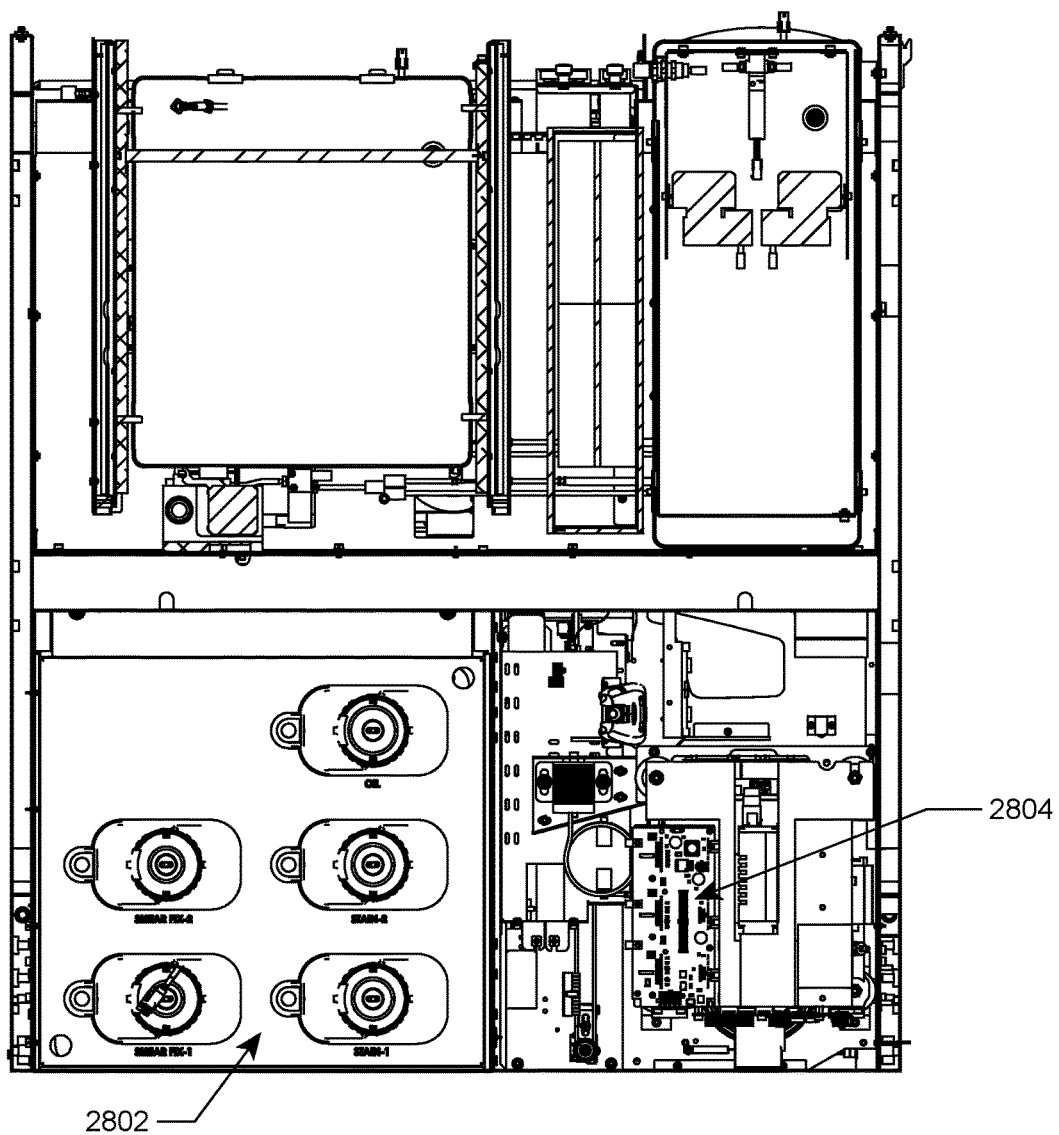
FIG. 28 shows a level of an automated slide maker stainer system according to one embodiment. The level shown in this example includes a reagent drawer and a digital morphology imaging subsystem.

FIG. 28 is an illustration of level of an automated slide maker stainer system according to one embodiment. The level shown in this example includes reagent drawer 2802 and digital morphology imaging subsystem 2804.

Local User Interface

The automated hematology analysis systems and slide maker stainer systems of the present disclosure may include a local user interface (LUI). In certain aspects, the LUI includes a touchscreen display (e.g., a touchscreen LCD display) and associated computer hardware for displaying a graphical user interface to the customer. The LUI display may be mounted in a location accessible by the user, and in certain aspects, is mounted above the front loading area of the system.

The display may enable the user to locally view patient results and assess the status of the instrument. The LUI may be capable of displaying barcode information, provide specimen ID tracking and entry, display instrument status, lane status, reagent status, QC status, fault conditions, and the like.

LUIs according to an embodiment of the present disclosure are shown, e.g., in FIG. 1, where each module of the integrated analysis system includes a LUI mounted above the front loading area of each module.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

What is claimed is:

1. A system, comprising:
a first module comprising a sample analysis component and a first internal container rack conveyor system;
a second module comprising a second internal container rack conveyor system, wherein the first and second modules are positioned adjacent to each other such that the first and the second internal container conveyor systems are aligned to transport containers from the first module to the second module;
a container rack positioned within the first or the second internal container rack conveyer system, wherein the container rack comprises one or more sensing windows; and
a tracking system that detects the location of the container rack within the first or the second internal container conveyor system, the tracking system disposed along the length of the internal container conveyor systems and comprising a plurality of pairs of optical emitters and optical detectors, each pair comprising an optical emitter and an optical detector situated on the opposite sides of the container conveyor system in a manner that the one or more sensing windows of the container rack permit optical communication between one or more optical emitters with the corresponding one or more optical detectors, and wherein the tracking system detects the location of the container rack within the first or the second internal container conveyor system based on the location of the one or more optical emitters that are in communication with the corresponding one or more optical detectors through the one or more sensing windows of the container rack,
wherein optical communication between the one or more optical emitters and the corresponding one or more optical detectors is blocked when the one or more sensing windows are not aligned with the one or more optical emitters and the corresponding one or more optical detectors.

2. The system of claim 1, wherein the first and second internal container conveyor systems are aligned to transport containers from the second module to the first module.

3. The system of claim 1, wherein the first and second modules are connected to each other via screws.

4. The system of claim 1, wherein the first and second internal container conveyor systems each comprise a conveyor belt.

5. The system of claim 1, wherein the first and second internal container conveyor systems are aligned to transport containers selected from: sample containers, reagent containers, quality control material containers, and combinations thereof.

6. The system of claim 5, wherein at least one of the containers is a sample container, and wherein the system is aligned to transport the one sample container from the first module to the second module based on an analysis of the sample in the first module.

7. The system of claim 1, wherein each of the first and second modules are independently selected from the group consisting of: a hematology analysis system, a slide preparation system, a cell morphology imaging system, a slide preparation and cell morphology imaging system, a erythrocyte sedimentation rate (ESR) analysis system, a blood coagulation analysis system, a real-time nucleic acid amplification system, an immunoassay system, and a clinical chemistry system.

8. The system of claim 1, further comprising a third module comprising a third internal container conveyor system, wherein the third module is positioned adjacent the second module such that the internal container conveyor systems of the second and third modules are aligned and adapted to transport containers from the second module to the third module.

9. The system of claim 8, wherein the internal container conveyor systems of the second and third modules are aligned to transport containers from the third module to the second module.

10. The system of claim 8, wherein the third module is selected from the group consisting of: a hematology analysis system, a slide preparation system, a cell morphology imaging system, a slide preparation and cell morphology imaging system, a erythrocyte sedimentation rate (ESR) analysis system, a blood coagulation analysis system, a real-time nucleic acid amplification system, an immunoassay system, and a clinical chemistry system.

11. The system of claim 1, wherein the container rack further comprises one or more ID barcode labels.

12. The system of claim 1, wherein the system further comprises a digital imaging barcode camera.

13. The system of claim 1, wherein the one or more optical emitters is an infrared LED emitter.

14. The system of claim 1, wherein the tracking system is configured to detect the location of the container rack in the presence or absence of optical communication between the one or more optical emitters and the corresponding one or more optical detectors.

15. The system of claim 1, wherein the container rack is transported across a gap between the first internal conveyor system and the second internal conveyor system.

* * * * *